United States Patent
Kakegawa et al.

(10) Patent No.: US 7,222,050 B2
(45) Date of Patent: May 22, 2007

(54) APPARATUS FOR DETERMINING OVERHEATING OF MOTOR, METHOD FOR DETERMINING OVERHEATING OF MOTOR, COMPUTER-READABLE MEDIUM, MOTOR CONTROL APPARATUS, MOTOR CONTROL METHOD, AND PRINTING APPARATUS

(75) Inventors: Tomoyoshi Kakegawa, Nagano (JP); Tetsuji Takeishi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 11/181,195

(22) Filed: Jul. 13, 2005

(65) Prior Publication Data

US 2006/0033461 A1 Feb. 16, 2006

(30) Foreign Application Priority Data

Jul. 13, 2004 (JP) ............................. 2004-206354
Jul. 13, 2004 (JP) ............................. 2004-206355

(51) Int. Cl.
*G05B 19/42* (2006.01)
(52) U.S. Cl. ................... 702/183; 318/568.1; 318/434; 318/783; 361/23; 361/24
(58) Field of Classification Search ............... 702/183; 318/434, 783, 568.1; 361/23, 24
See application file for complete search history.

(56) References Cited

U.S. PATENT DOCUMENTS

| 4,160,940 | A | * | 7/1979 | Wolf | 318/803 |
| 4,837,490 | A | * | 6/1989 | Neko | 318/568.1 |
| 4,884,162 | A | * | 11/1989 | Ito et al. | 361/23 |
| 5,594,603 | A | * | 1/1997 | Mori et al. | 360/78.04 |
| 6,566,835 | B1 | * | 5/2003 | Yoshida et al. | 318/569 |
| 6,583,527 | B2 | * | 6/2003 | Takedomi et al. | 310/68 C |
| 6,992,448 | B2 | * | 1/2006 | Fujimoto et al. | 318/254 |
| 2004/0201359 | A1 | * | 10/2004 | Kumar | 318/783 |

FOREIGN PATENT DOCUMENTS

JP 2002-186285 6/2002

* cited by examiner

*Primary Examiner*—Carol S. W. Tsai
(74) *Attorney, Agent, or Firm*—John J. Penny, Jr.; Edwards Angell Palmer & Dodge LLP

(57) ABSTRACT

A temperature condition of a motor is estimated more accurately based on a drive amount of the motor. An apparatus for determining overheating of a motor, includes: an information obtaining section that obtains information about a drive amount of a motor and information about a stop time etc. between drive operations of the motor; a calculating section that executes a calculation of calculating an integrated value by successively adding up the drive amount of the motor based on the information about the drive amount obtained by the information obtaining section, and a calculation of subtracting, from the integrated value, a subtraction value corresponding to the stop time etc. that is obtained based on the information about the stop time etc. obtained by the information obtaining section; and a determining section that determines that the motor is in an overheated state when the subtracted integrated value obtained by the calculating section reaches a predetermined value.

29 Claims, 28 Drawing Sheets

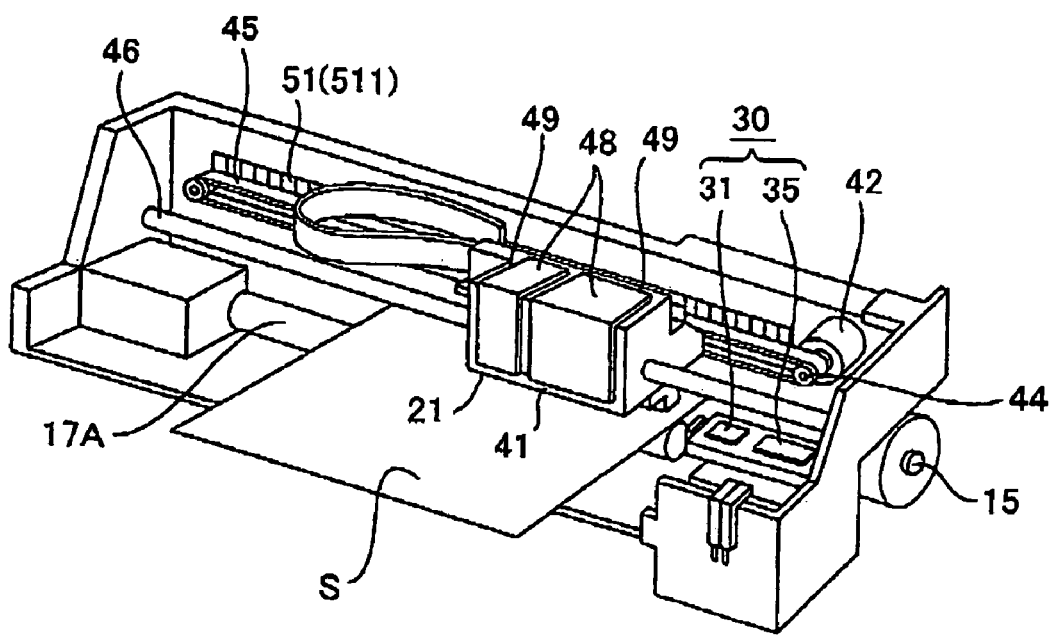
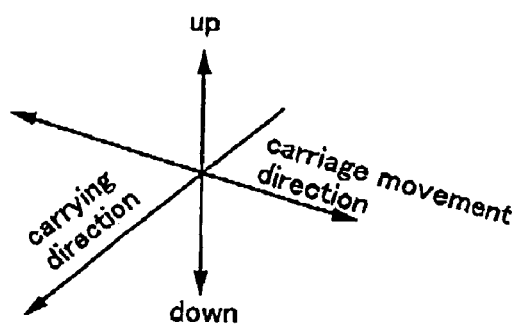
Fig.2

| number of times of drive | drive amount PFstep (number of steps) | integrated value Psum |
|---|---|---|
| 1 | 200 | 200 |
| 2 | 150 | 350 |
| 3 | 250 | 600 |
| 4 | 100 | 700 |
| 5 | 50 | 750 |
| 6 | 300 | 1050 |
| 7 | 200 | 1250 |
| ⋮ | ⋮ | ⋮ |
| N | 150 | 11000 |

Fig.14

(normal time)

(during heat restriction control)

Psub table

| drive mode | drive amount PFstep (number of steps) | motor stop time Tm [ms] | | |
|---|---|---|---|---|
| | | Tm<100 | 100≦Tm<140 | 140≦Tm |
| PS0 | 250 or more | 197 | 200 | 205 |
| PS1 | 200 or more to less than 250 | 142 | 146 | 156 |
| PS2 | 150 or more to less than 200 | 82 | 90 | 109 |
| PS3 | 100 or more to less than 150 | 0 | 29 | 69 |
| PS4 | 50 or more to less than 100 | 11 | 22 | 37 |
| PS5 | 25 or more to less than 50 | 9 | 13 | 19 |
| PS6 | 1 or more to less than 25 | 0 | 0 | 0 |

Fig.20 number of sheets until limit temperature is reached

| drive mode | drive amount PFstep (number of steps) | motor stop time Tm [ms] | | |
|---|---|---|---|---|
| | | Tm<100 | 100≦Tm<140 | 140≦Tm |
| PS0 | 250 or more | 480sheets | 492sheets | 546sheets |
| PS1 | 200 or more to less than 250 | 350sheets | 370sheets | 460sheets |
| PS2 | 150 or more to less than 200 | 220sheets | 248sheets | 374sheets |
| PS3 | 100 or more to less than 150 | 100sheets | 140sheets | 320sheets |
| PS4 | 50 or more to less than 100 | 130sheets | 178sheets | 394sheets |
| PS5 | 25 or more to less than 50 | 160sheets | 216sheets | 468sheets |
| PS6 | 1 or more to less than 25 | 180sheets | 240sheets | 510sheets |

Fig.23

Psub table

| drive mode | drive amount PFstep (number of steps) | carriage motor drive amount CRm [steps] | | |
|---|---|---|---|---|
| | | CRm<1114 | 1114≦CRm<1894 | 1894≦CRm |
| PS0 | 250 or more | 197 | 200 | 205 |
| PS1 | 200 or more to less than 250 | 142 | 146 | 156 |
| PS2 | 150 or more to less than 200 | 82 | 90 | 109 |
| PS3 | 100 or more to less than 150 | 0 | 29 | 69 |
| PS4 | 50 or more to less than 100 | 11 | 22 | 37 |
| PS5 | 25 or more to less than 50 | 9 | 13 | 19 |
| PS6 | 1 or more to less than 25 | 0 | 0 | 0 | number of sheets until limit temperature is reached

| drive mode | drive amount PFstep (number of steps) | carriage motor drive amount CRm [number of steps] | | |
|---|---|---|---|---|
| | | CRm<1114 | 1114≦CRm<1894 | 1894≦CRm |
| PS0 | 250 or more | 480sheets | 492sheets | 546sheets |
| PS1 | 200 or more to less than 250 | 350sheets | 370sheets | 460sheets |
| PS2 | 150 or more to less than 200 | 220sheets | 248sheets | 374sheets |
| PS3 | 100 or more to less than 150 | 100sheets | 140sheets | 320sheets |
| PS4 | 50 or more to less than 100 | 130sheets | 178sheets | 394sheets |
| PS5 | 25 or more to less than 50 | 160sheets | 216sheets | 468sheets |
| PS6 | 1 or more to less than 25 | 180sheets | 240sheets | 510sheets |

Fig.32

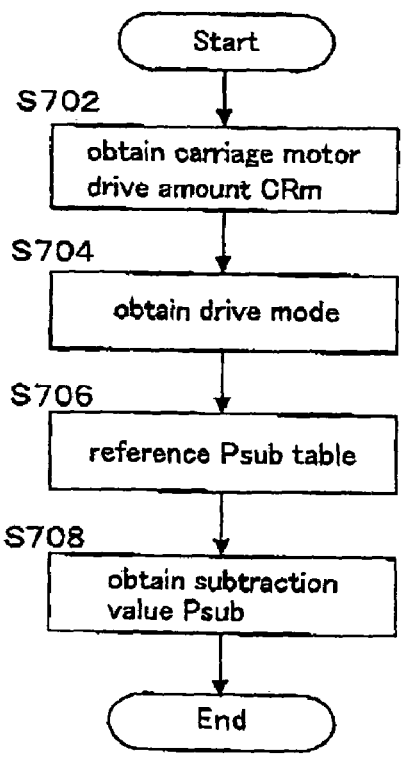

Fig.33

APPARATUS FOR DETERMINING OVERHEATING OF MOTOR, METHOD FOR DETERMINING OVERHEATING OF MOTOR, COMPUTER-READABLE MEDIUM, MOTOR CONTROL APPARATUS, MOTOR CONTROL METHOD, AND PRINTING APPARATUS

CROSS-REFERENCE TO RELATED APPLICATIONS

The present application claims priority upon Japanese Patent Application No. 2004-206354 and Japanese Patent Application No. 2004-206355 filed on Jul. 13, 2004, which are herein incorporated by reference.

BACKGROUND OF THE INVENTION

1. Field of the Invention

The present invention relates to apparatuses for determining motor overheating, methods for determining motor overheating, computer-readable media, motor control apparatuses, motor control methods, and printing apparatuses.

2. Description of the Related Art

Various types of motors are installed in printing apparatuses such as inkjet printers, including carry motors for carrying media such as paper to be printed and motors for moving printing sections which are for printing on media such as paper. When these motors are driven continuously, they may sometimes rise in temperature due to generation of heat and go into a high temperature condition. Since there is a risk of faults such as coil burnout when the motor is in a high temperature condition, printing apparatuses are provided with monitoring devices to ensure that the motor does not go into a high temperature condition.

One such monitoring device (see JP 2002-186285A) is a device that monitors the motor temperature based on the amount of drive of the motor. This device successively adds the amount of drive of the motor and examines whether or not the motor is in a high temperature condition by checking whether or not the integrated value has reached a predetermined value. In other words, the temperature of the motor is inferred from the amount of drive of the motor by focusing on the relationship between the amount of drive of the motor and the heat produced by the motor. A determination is made that the motor is in a high temperature condition when the integrated value of the amount of drive of the motor reaches the predetermined value, and a transition is made to heat restriction control to restrict motor heating by suppressing motor drive. By transitioning to this control, driving of the motor is continued while preventing the temperature of the motor from rising further. It should be noted that it is proposed that when the motor has not been driven for a short while, the integrated value of the amount of drive of the motor should be gradually reduced, and when the motor has not been driven for a long time, the integrated value of the amount of drive of the motor should be reset to zero.

By monitoring the motor temperature condition based on the amount of drive of the motor, it is possible to obviate various sensors such as temperature sensors so that it is possible to achieve monitoring without increasing the number of components and without incurring much cost.

However, devices that monitor motor temperature conditions based on the amount of drive of the motor have the following problems. That is, the integrated value is reduced corresponding to the motor temperature condition by, for example, gradually reducing the amount of drive of the motor when the motor has not been driven for a short while, or by resetting the integrated value of the amount of drive of the motor to zero when the motor has not been driven for a long time. However, there has been no measure in place for when the motor is stopped for an extremely short time, for example, when the drive of the motor is stopped for an extremely short period of around one second, such as several tens to several hundreds of milliseconds. For this reason, sometimes the motor is judged to be in a high temperature condition and heat restriction control is activated despite the motor not being in a high temperature condition. This has sometimes caused problems of extra time being required for printing and printing speeds being reduced.

SUMMARY OF THE INVENTION

The present invention was arrived at in light of the foregoing issues, and it is an object thereof to calculate, more accurately, motor temperature conditions based on the amount of drive of the motor.

A primary aspect of the present invention is an apparatus for determining motor overheating such as the following.

An apparatus for determining overheating of a motor, includes:

an information obtaining section that obtains information about a drive amount of a motor and information about a stop time between drive operations of the motor;

a calculating section that executes a calculation of calculating an integrated value by successively adding up the drive amount of the motor based on the information about the drive amount obtained by the information obtaining section, and a calculation of subtracting, from the integrated value, a subtraction value corresponding to the stop time that is obtained based on the information about the stop time obtained by the information obtaining section; and a determining section that determines that the motor is in an overheated state when the subtracted integrated value obtained by the calculating section reaches a predetermined value.

Furthermore, another primary aspect of the present invention is a method for determining motor overheating such as the following.

A method for determining overheating of a motor, includes:

a step of obtaining information about a drive amount of a motor;

a step of obtaining information about a stop time between drive operations of the motor;

a step of calculating an integrated value by successively adding up the drive amount of the motor based on the information about the drive amount that has been obtained;

a step of subtracting, from the integrated value, a subtraction value corresponding to the stop time that is obtained based on the information about the stop time obtained by the information obtaining section; and a step of determining that the motor is in an overheated state when the subtracted integrated value obtained by the calculating section reaches a predetermined value.

Furthermore, another primary aspect of the present invention is a computer-readable medium such as the following.

A computer-readable medium for causing an apparatus for determining overheating of a motor to operate, includes:

a code for obtaining information about a drive amount of a motor;

a code for obtaining information about a stop time between drive operations of the motor;

a code for calculating an integrated value by successively adding up the drive amount of the motor based on the information about the drive amount that has been obtained;

a code for subtracting, from the integrated value, a subtraction value corresponding to the stop time that is obtained based on the information about the stop time obtained by the information obtaining section; and a code for determining that the motor is in an overheated state when the subtracted integrated value obtained by the calculating section reaches a predetermined value.

Furthermore, another primary aspect of the present invention is a motor control apparatus such as the following.

A motor control apparatus includes:

an information obtaining section that obtains information about a stop time between drive operations of a motor;

a calculating section that executes a calculation of calculating an integrated value by successively adding up a drive amount of the motor, and a calculation of subtracting, from the integrated value, a subtraction value corresponding to the stop time that is obtained based on the information about the stop time obtained by the information obtaining section;

a determining section that determines that the motor is in an overheated state when the subtracted integrated value obtained by the calculating section reaches a predetermined value; and a controller that controls driving of the motor and that restricts the driving of the motor when it is determined by the determining section that the motor is in an overheated state.

Furthermore, another primary aspect of the present invention is a motor control method such as the following.

A motor control method includes:

a step of calculating an integrated value by successively adding up a drive amount of a motor;

a step of obtaining information about a stop time between drive operations of the motor;

a step of subtracting, from the integrated value, a subtraction value corresponding to the stop time that is obtained based on the information about the stop time that has been obtained;

a step of determining that the motor is in an overheated state when the integrated value after subtraction reaches a predetermined value; and a step of restricting driving of the motor when it is determined that the motor is in an overheated state.

Furthermore, another primary aspect of the present invention is a printing apparatus such as the following.

A printing apparatus includes:

a printing section that prints on a medium;

a motor;

an information obtaining section that obtains information about a drive amount of the motor and information about a stop time between drive operations of the motor;

a calculating section that executes a calculation of calculating an integrated value by successively adding up the drive amount of the motor based on the information about the drive amount obtained by the information obtaining section, and a calculation of subtracting, from the integrated value, a subtraction value corresponding to the stop time that is obtained based on the information about the stop time obtained by the information obtaining section; and a determining section that determines that the motor is in an overheated state when the subtracted integrated value obtained by the calculating section reaches a predetermined value.

Furthermore, another primary aspect of the present invention is an apparatus for determining motor overheating such as the following.

An apparatus for determining overheating of a motor, includes:

an information obtaining section that obtains information about a drive amount of a determination-target motor targeted for determination and information about a drive amount of an other motor that is driven in alternation with the determination-target motor;

a calculating section that executes a calculation of calculating an integrated value by successively adding up the drive amount of the determination-target motor based on the information about the drive amount of the determination-target motor obtained by the information obtaining section, and a calculation of subtracting, from the integrated value, a subtraction value corresponding to the drive amount of the other motor that is obtained based on the information about the drive amount of the other motor obtained by the information obtaining section; and a determining section that determines that the determination-target motor is in an overheated state when the subtracted integrated value obtained by the calculating section reaches a predetermined value.

Furthermore, another primary aspect of the present invention is a method for determining motor overheating such as the following.

A method for determining overheating of a motor, includes:

a step of obtaining information about a drive amount of a determination-target motor targeted for determination;

a step of obtaining information about a drive amount of an other motor that is driven in alternation with the determination-target motor;

a step of calculating an integrated value by successively adding up the drive amount of the determination-target motor based on the information about the drive amount of the determination-target motor that has been obtained;

a step of subtracting, from the integrated value, a subtraction value corresponding to the drive amount of the other motor that is obtained based on the information about the drive amount of the other motor that has been obtained; and a step of determining that the determination-target motor is in an overheated state when the integrated value after subtraction reaches a predetermined value.

Furthermore, another primary aspect of the present invention is a computer-readable medium such as the following.

A computer-readable medium for causing an apparatus for determining overheating of a motor to operate, includes:

a code for obtaining information about a drive amount of a determination-target motor targeted for determination;

a code for obtaining information about a drive amount of an other motor that is driven in alternation with the determination-target motor;

a code for calculating an integrated value by successively adding up the drive amount of the determination-target motor based on the information about the drive amount of the determination-target motor that has been obtained;

a code for subtracting, from the integrated value, a subtraction value corresponding to the drive amount of the other motor that is obtained based on the information about the drive amount of the other motor that has been obtained; and a code for determining that the determination-target motor is in an overheated state when the integrated value after subtraction reaches a predetermined value.

Furthermore, another primary aspect of the present invention is a motor control apparatus such as the following.

A motor control apparatus includes:

an information obtaining section that obtains information about a drive amount of a control-target motor targeted for control and information about a drive amount of an other motor that is driven in alternation with the control-target motor;

a calculating section that executes a calculation of calculating an integrated value by successively adding up the drive amount of the control-target motor based on the information about the drive amount of the control-target motor obtained by the information obtaining section, and a calculation of subtracting, from the integrated value, a subtraction value corresponding to the drive amount of the other motor that is obtained based on the information about the drive amount of the other motor obtained by the information obtaining section;

a determining section that determines that the control-target motor is in an overheated state when the subtracted integrated value obtained by the calculating section reaches a predetermined value; and a controller that controls driving of the control-target motor and that restricts the driving of the control-target motor when it is determined by the determining section that the control-target motor is in an overheated state.

Furthermore, another primary aspect of the present invention is a motor control method such as the following.

A motor control method includes:

a step of obtaining information about a drive amount of a control-target motor targeted for control;

a step of obtaining information about a drive amount of an other motor that is driven in alternation with the control-target motor;

a step of calculating an integrated value by successively adding up the drive amount of the control-target motor based on the information about the drive amount of the control-target motor that has been obtained;

a step of subtracting, from the integrated value, a subtraction value corresponding to the drive amount of the other motor that is obtained based on the information about the drive amount of the other motor that has been obtained;

a step of determining that the control-target motor is in an overheated state when the integrated value after subtraction reaches a predetermined value; and a step of restricting driving of the control-target motor when it is determined that the control-target motor is in an overheated state.

Furthermore, another primary aspect of the present invention is a printing apparatus such as the following.

A printing apparatus includes:

a printing section that prints on a medium;

two motors that are driven in alternation;

an information obtaining section that respectively obtains information about a drive amount of each of the motors;

a calculating section that executes a calculation of calculating an integrated value by successively adding up the drive amount of one of the motors based on the information about the drive amount of the one motor obtained by the information obtaining section, and a calculation of subtracting, from the integrated value, a subtraction value corresponding to the drive amount of the other of the motors that is obtained based on the information about the drive amount of the other motor obtained by the information obtaining section; and a determining section that determines that the one motor is in an overheated state when the subtracted integrated value obtained by the calculating section reaches a predetermined value.

BRIEF DESCRIPTION OF THE DRAWINGS

For a more complete understanding of the present invention and the advantages thereof, reference is now made to the following description taken in conjunction with the accompanying drawings.

FIG. 2 is a perspective view for describing an internal configuration of the printing apparatus.

FIG. 14 is a diagram that shows an example of addition by a controller.

FIG. 20 is a diagram that shows an example of a table for obtaining the subtraction value Psub.

FIG. 23 is a table in which the number of sheets until the limit temperature is reached is set separately for motor drive modes and stop times.

FIG. 32 is a table in which the number of sheets until the limit temperature is reached is set separately for motor drive modes and stop times.

FIG. 33 is a flowchart illustrating an example of a procedure for obtaining the subtraction value.

DETAILED DESCRIPTION OF PREFERRED EMBODIMENTS

Figure 1:
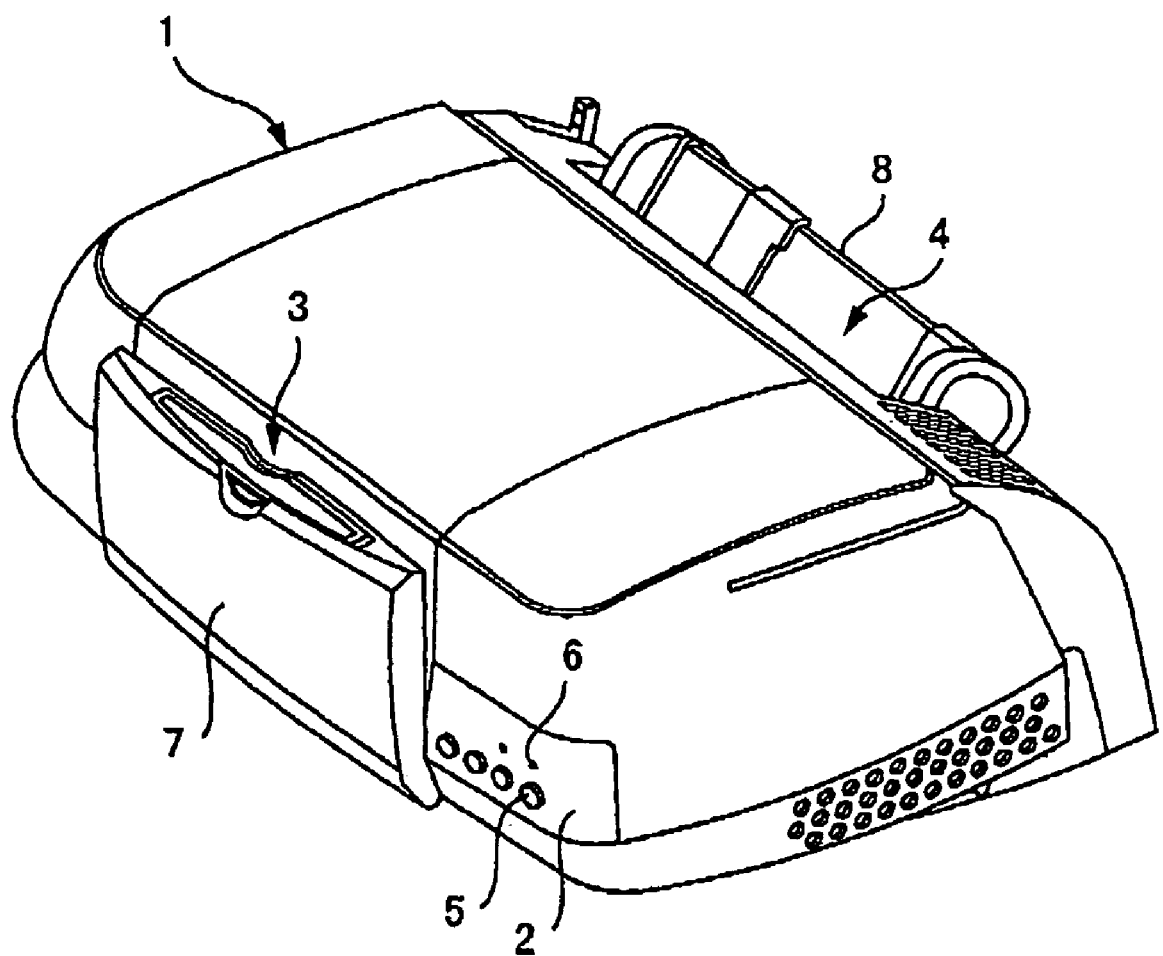
FIG. 1 is a perspective view of an embodiment of a printing apparatus.

At least the following matters will be made clear by the present specification and the description of the accompanying drawings.

An apparatus for determining overheating of a motor, includes:

an information obtaining section that obtains information about a drive amount of a motor and information about a stop time between drive operations of the motor;

a calculating section that executes a calculation of calculating an integrated value by successively adding up the drive amount of the motor based on the information about the drive amount obtained by the information obtaining section, and a calculation of subtracting, from the integrated value, a subtraction value corresponding to the stop time that is obtained based on the information about the stop time obtained by the information obtaining section; and a determining section that determines that the motor is in an overheated state when the subtracted integrated value obtained by the calculating section reaches a predetermined value.

With this apparatus for determining motor overheating, in addition to performing a calculation of calculating an integrated value by successively adding a drive amount of the motor based on information relating to the drive amount of a motor, a calculation is performed of subtracting a subtraction value, which corresponds to the stop time that has been obtained based on information relating to the stop time of the motor, from the integrated value, and therefore the temperature condition of the motor can be estimated more accurately.

In the apparatus for determining motor overheating, it is preferable that the apparatus further comprises a timer for measuring the stop time between the drive operations of the motor.

If a timer is provided with the apparatus for determining motor overheating, the stop time of the motor can be measured easily.

In the apparatus for determining motor overheating, it is preferable that the information about the drive amount of the motor is obtained by the information obtaining section every time the motor is driven.

With the apparatus for determining motor overheating, if information relating to the drive amount of the motor is successively obtained each time the motor is driven, the motor temperature condition can be estimated more accurately.

In the apparatus for determining motor overheating, it is preferable that the information about the drive amount of the motor is obtained by the information obtaining section before the motor is driven based on that drive amount.

With the apparatus for determining motor overheating, if information relating to the drive amount of the motor is obtained before the motor is driven according to that drive amount, the motor temperature condition can be estimated before the motor is driven.

In the apparatus for determining motor overheating, it is preferable that the calculating section executes a calculation of subtracting a predetermined value from the integrated value every time a predetermined time passes from when driving of the motor is stopped.

If this calculation is executed with the apparatus for determining motor overheating, the temperature condition of the motor can be estimated more accurately.

In the apparatus for determining motor overheating, it is preferable that, when it is determined by the determining section that the motor is in an overheated state, driving of the motor is restricted.

If the drive of the motor is restricted with the apparatus for determining motor overheating, it is possible to suppress temperature rises of the motor while driving the motor.

In the apparatus for determining motor overheating, it is preferable that the apparatus further comprises a table in which the stop time between the drive operations of the motor and the subtraction value are correlated.

If such a table is provided with the apparatus for determining motor overheating, a subtraction value corresponding to the motor stop time can be obtained easily.

In the apparatus for determining motor overheating, it is preferable that the information obtaining section obtains information about a drive mode of the motor; and the subtraction value is obtained based on the information about the drive mode and the information about the stop time which have been obtained by the information obtaining section.

With this apparatus for determining motor overheating, it is possible to obtain a subtraction value corresponding to the drive mode by obtaining information relating to the drive mode of the motor and obtaining the subtraction value based on this information relating to the drive mode.

In the apparatus for determining motor overheating, it is preferable that, depending on the drive mode, at least either one of a rate of acceleration when the motor is accelerating, a velocity during constant-speed operation of the motor, and a rate of acceleration when the motor is decelerating, is different.

With the apparatus for determining motor overheating, an appropriate subtraction value can be obtained when the motor is varied depending on the drive mode.

Furthermore, the following method for determining motor overheating can also be achieved.

A method for determining overheating of a motor, includes;

a step of obtaining information about a drive amount of a motor;

a step of obtaining information about a stop time between drive operations of the motor;

a step of calculating an integrated value by successively adding up the drive amount of the motor based on the information about the drive amount that has been obtained;

a step of subtracting, from the integrated value, a subtraction value corresponding to the stop time that is obtained based on the information about the stop time obtained by the information obtaining section; and a step of determining that the motor is in an overheated state when the subtracted integrated value obtained by the calculating section reaches a predetermined value.

With this method for determining motor overheating, in addition to calculating an integrated value by successively adding a drive amount of the motor based on information relating to the drive amount of the motor, a subtraction value, which corresponds to the stop time that has been obtained based on information relating to the stop time of the motor, is subtracted from the integrated value, and therefore the motor temperature condition can be estimated more accurately.

It is also possible to achieve a computer-readable medium such as the following.

A computer-readable medium for causing an apparatus for determining overheating of a motor to operate, includes:

a code for obtaining information about a drive amount of a motor;

a code for obtaining information about a stop time between drive operations of the motor;

a code for calculating an integrated value by successively adding up the drive amount of the motor based on the information about the drive amount that has been obtained;

a code for subtracting, from the integrated value, a subtraction value corresponding to the stop time that is obtained based on the information about the stop time obtained by the information obtaining section; and a code for determining that the motor is in an overheated state when the subtracted integrated value obtained by the calculating section reaches a predetermined value.

With this computer-readable medium, in addition to calculating an integrated value by successively adding a drive amount of the motor based on information relating to the drive amount of the motor, a subtraction value, which corresponds to the stop time that has been obtained based on information relating to the stop time of the motor, is subtracted from the integrated value, and therefore the motor temperature condition can be estimated more accurately.

It is also possible to achieve a motor control apparatus such as the following, including:

an information obtaining section that obtains information about a stop time between drive operations of a motor;

a calculating section that executes a calculation of calculating an integrated value by successively adding up a drive amount of the motor, and a calculation of subtracting, from the integrated value, a subtraction value corresponding to the stop time that is obtained based on the information about the stop time obtained by the information obtaining section;

a determining section that determines that the motor is in an overheated state when the subtracted integrated value obtained by the calculating section reaches a predetermined value; and a controller that controls driving of the motor and that restricts the driving of the motor when it is determined by the determining section that the motor is in an overheated state With this motor control apparatus, in addition to a calculation in which an integrated value is calculated by successively adding a drive amount of the motor based on information relating to the drive amount of the motor, a calculation is performed in which a subtraction value, which corresponds to the stop time that has been obtained based on information relating to the stop time of the motor, is subtracted from the integrated value, and therefore the motor temperature condition can be estimated more accurately. Moreover, by restricting the drive of the motor when it is determined that the motor is in an overheated state, the motor can be prevented from going into a high-temperature state.

It is also possible to achieve a motor control method such as the following.

A motor control method includes:

a step of calculating an integrated value by successively adding up a drive amount of a motor;

a step of obtaining information about a stop time between drive operations of the motor;

a step of subtracting, from the integrated value, a subtraction value corresponding to the stop time that is obtained based on the information about the stop time that has been obtained;

a step of determining that the motor is in an overheated state when the integrated value after subtraction reaches a predetermined value; and a step of restricting driving of the motor when it is determined that the motor is in an overheated state.

With this motor control method, in addition to calculating an integrated value by successively adding a drive amount of the motor based on information relating to the drive amount of the motor, a subtraction value, which corresponds to the stop time that has been obtained based on information relating to the stop time of the motor, is subtracted from the integrated value, and therefore the motor temperature condition can be estimated more accurately. Moreover, by restricting the drive of the motor when it is determined that the motor is in an overheated state, the motor can be prevented from going into a high-temperature state.

It is also possible to achieve a printing apparatus such as the following.

A printing apparatus includes:

a printing section that prints on a medium;

a motor;

an information obtaining section that obtains information about a drive amount of the motor and information about a stop time between drive operations of the motor;

a calculating section that executes a calculation of calculating an integrated value by successively adding up the drive amount of the motor based on the information about the drive amount obtained by the information obtaining section, and a calculation of subtracting, from the integrated value, a subtraction value corresponding to the stop time that is obtained based on the information about the stop time obtained by the information obtaining section; and a determining section that determines that the motor is in an overheated state when the subtracted integrated value obtained by the calculating section reaches a predetermined value.

With this printing apparatus, in addition to a calculation in which an integrated value is calculated by successively adding a drive amount of the motor based on information relating to the drive amount of the motor, a calculation is performed in which a subtraction value, which corresponds to the stop time that has been obtained based on information relating to the stop time of the motor, is subtracted from the integrated value, and therefore the motor temperature condition can be estimated more accurately.

In the printing apparatus, it is preferable that the motor is a motor for carrying the medium to be printed by the printing section, or a motor for moving, relatively with respect to the medium, the printing section that prints on the medium.

With this printing apparatus, the temperature condition of such motors can be estimated more accurately.

Furthermore, the following apparatus for determining motor overheating can also be achieved.

An apparatus for determining overheating of a motor, includes an information obtaining section that obtains information about a drive amount of a determination-target motor targeted for determination and information about a drive amount of an other motor that is driven in alternation with the determination-target motor;

a calculating section that executes a calculation of calculating an integrated value by successively adding up the drive amount of the determination-target motor based on the information about the drive amount of the determination-target motor obtained by the information obtaining section, and a calculation of subtracting, from the integrated value, a subtraction value corresponding to the drive amount of the other motor that is obtained based on the information about the drive amount of the other motor obtained by the information obtaining section; and a determining section that determines that the determination-target motor is in an overheated state when the subtracted integrated value obtained by the calculating section reaches a predetermined value.

With this apparatus for determining motor overheating, in addition to a calculation in which an integrated value is calculated by successively adding a drive amount of a determination-target motor, a calculation is performed in which a subtraction value, which corresponds to the drive amount of the other motor obtained based on information relating to the drive amount of the other motor that is driven in alternation with the motor targeted for determination, is subtracted from the integrated value, and therefore the motor temperature condition can be estimated more accurately.

In the apparatus for determining motor overheating, it is preferable that the information about the drive amount of the determination-target motor is obtained by the information obtaining section every time the determination-target motor is driven.

With this apparatus for determining motor overheating, if information relating to a drive amount of the motor targeted for determination is successively obtained for each drive of the determination-target motor, the temperature condition of the motor targeted for determination can be estimated more exactly.

In the apparatus for determining motor overheating, it is preferable that the information about the drive amount of the determination-target motor is obtained by the information obtaining section before the determination-target motor is driven based on that drive amount.

With this apparatus for determining motor overheating, if information relating to a drive amount of the motor targeted for determination is obtained before the determination-target motor is driven according to that drive amount, the temperature condition of the motor targeted for determination can be estimated before driving.

In the apparatus for determining motor overheating, it is preferable that the calculating section executes a calculation of subtracting a predetermined value from the integrated value every time a predetermined time passes from when driving of the determination-target motor is stopped.

If this calculation is carried out with this apparatus for determining motor overheating, the temperature condition of the motor targeted for determination can be estimated more accurately.

In the apparatus for determining motor overheating, it is preferable that, when it is determined by the determining section that the determination-target motor is in an overheated state, driving of the determination-target motor is restricted.

If driving of the motor targeted for determination is restricted in this manner in the apparatus for determining motor overheating, it is possible to suppress temperature rises of the motor targeted for determination while driving the determination-target motor.

In the apparatus for determining motor overheating, it is preferable that the apparatus further comprises a table in which the drive amount of the other motor and the subtraction value are correlated.

If such a table is provided with the apparatus for determining motor overheating, a subtraction value can be obtained easily.

In the apparatus for determining motor overheating, it is preferable that the information obtaining section obtains information about a drive mode of the determination-target motor; and the subtraction value is obtained based on the information about the drive mode and the information about the drive amount of the other motor which have been obtained by the information obtaining section.

With this apparatus for determining motor overheating, it is possible to obtain a subtraction value corresponding to the drive mode by obtaining information relating to the drive mode of the motor targeted for determination and obtaining the subtraction value based on this information relating to the drive mode.

In the apparatus for determining motor overheating, it is preferable that, depending on the drive mode, at least either one of a rate of acceleration when the determination-target motor is accelerating, a velocity during constant-speed operation of the determination-target motor, and a rate of acceleration when the determination-target motor is decelerating, is different.

With this apparatus for determining motor overheating, an appropriate subtraction value can be obtained when the motor is varied depending on the drive mode.

Furthermore, the following method for determining motor overheating can also be achieved.

A method for determining overheating of a motor, includes:

a step of obtaining information about a drive amount of a determination-target motor targeted for determination;

a step of obtaining information about a drive amount of an other motor that is driven in alternation with the determination-target motor;

a step of calculating an integrated value by successively adding up the drive amount of the determination-target motor based on the information about the drive amount of the determination-target motor that has been obtained;

a step of subtracting, from the integrated value, a subtraction value corresponding to the drive amount of the other motor that is obtained based on the information about the drive amount of the other motor that has been obtained; and a step of determining that the determination-target motor is in an overheated state when the integrated value after subtraction reaches a predetermined value.

With this method for determining motor overheating, in addition to calculating an integrated value by successively adding a drive amount of the motor targeted for determination, a subtraction value, which corresponds to the drive amount of the other motor obtained based on obtained information relating to the drive amount of the other motor that is driven in alternation with the motor targeted for determination, is subtracted from the integrated value, and therefore the motor temperature condition can be estimated more accurately.

It is also possible to achieve a computer-readable medium such as the following.

A computer-readable medium for causing an apparatus for determining overheating of a motor to operate, includes:

a code for obtaining information about a drive amount of a determination-target motor targeted for determination;

a code for obtaining information about a drive amount of an other motor that is driven in alternation with the determination-target motor;

a code for calculating an integrated value by successively adding up the drive amount of the determination-target motor based on the information about the drive amount of the determination-target motor that has been obtained;

a code for subtracting, from the integrated value, a subtraction value corresponding to the drive amount of the other motor that is obtained based on the information about the drive amount of the other motor that has been obtained; and a code for determining that the determination-target motor is in an overheated state when the integrated value after subtraction reaches a predetermined value.

With this computer-readable medium, in addition to calculating an integrated value by successively adding a drive amount of the motor targeted for determination, a subtraction value, which corresponds to the drive amount of the other motor obtained based on information relating to the drive amount of the other motor that is driven in alternation with the motor targeted for determination, is subtracted from the integrated value, and therefore the motor temperature condition can be estimated more accurately.

It is also possible to achieve a motor control apparatus such as the following.

A motor control apparatus includes:

an information obtaining section that obtains information about a drive amount of a control-target motor targeted for control and information about a drive amount of an other motor that is driven in alternation with the control-target motor;

a calculating section that executes a calculation of calculating an integrated value by successively adding up the drive amount of the control-target motor based on the information about the drive amount of the control-target motor obtained by the information obtaining section, and a calculation of subtracting, from the integrated value, a subtraction value corresponding to the drive amount of the other motor that is obtained based on the information about the drive amount of the other motor obtained by the information obtaining section;

a determining section that determines that the control-target motor is in an overheated state when the subtracted integrated value obtained by the calculating section reaches a predetermined value; and a controller that controls driving of the control-target motor and that restricts the driving of the control-target motor when it is determined by the determining section that the control-target motor is in an overheated state.

With this motor control apparatus, in addition to calculating an integrated value by successively adding a drive amount of the motor targeted for determination, a calculation is executed in which a subtraction value, which corresponds to the drive amount of the other motor obtained based on information relating to the drive amount of the other motor that is driven in alternation with the motor targeted for determination, is subtracted from the integrated value, and therefore the motor temperature condition can be estimated more accurately. Moreover, by restricting the drive of the motor when it is determined that the motor is in an overheated state, the motor can be prevented from going into a high-temperature state.

It is also possible to achieve a motor control method such as the following.

A motor control method includes:

a step of obtaining information about a drive amount of a control-target motor targeted for control;

a step of obtaining information about a drive amount of an other motor that is driven in alternation with the control-target motor;

a step of calculating an integrated value by successively adding up the drive amount of the control-target motor based on the information about the drive amount of the control-target motor that has been obtained;

a step of subtracting, from the integrated value, a subtraction value corresponding to the drive amount of the other motor that is obtained based on the information about the drive amount of the other motor that has been obtained;

a step of determining that the control-target motor is in an overheated state when the integrated value after subtraction reaches a predetermined value; and a step of restricting driving of the control-target motor when it is determined that the control-target motor is in an overheated state.

With this motor control method, in addition to calculating an integrated value by successively adding a drive amount of the motor targeted for determination, a subtraction value, which corresponds to the drive amount of the other motor obtained based on information relating to the drive amount of the other motor that is driven in alternation with the motor targeted for determination, is subtracted from the integrated value, and therefore the motor temperature condition can be estimated more accurately. Moreover, by restricting the drive of the motor when it is determined that the motor is in an overheated state, the motor can be prevented from going into a high-temperature state.

It is also possible to achieve a printing apparatus such as the following, which includes a printing section that prints on a medium;

two motors that are driven in alternation;

an information obtaining section that respectively obtains information about a drive amount of each of the motors;

a calculating section that executes a calculation of calculating an integrated value by successively adding up the drive amount of one of the motors based on the information about the drive amount of the one motor obtained by the information obtaining section, and a calculation of subtracting, from the integrated value, a subtraction value corresponding to the drive amount of the other of the motors that is obtained based on the information about the drive amount of the other motor obtained by the information obtaining section; and a determining section that determines that the one motor is in an overheated state when the subtracted integrated value obtained by the calculating section reaches a predetermined value.

With this printing apparatus, in addition to calculating an integrated value by successively adding a drive amount of the motor targeted for determination, a calculation is executed in which a subtraction value, which corresponds to the drive amount of the other motor obtained based on information relating to the drive amount of the other motor that is driven in alternation with the motor targeted for determination, is subtracted from the integrated value, and therefore the motor temperature condition can be estimated more accurately.

In the printing apparatus, it is preferable that the motors are a motor for carrying the medium to be printed by the printing section, and a motor for moving, relatively with respect to the medium, the printing section that prints on the medium.

With this printing apparatus, the temperature condition of such motors can be estimated more accurately.

===Outline of Printing Apparatus===

An example involving installation in an inkjet printer (a printing apparatus) will be used for description of an apparatus for determining motor overheating. First, an outline of the inkjet printer (printing apparatus) is described.

Figure 3:
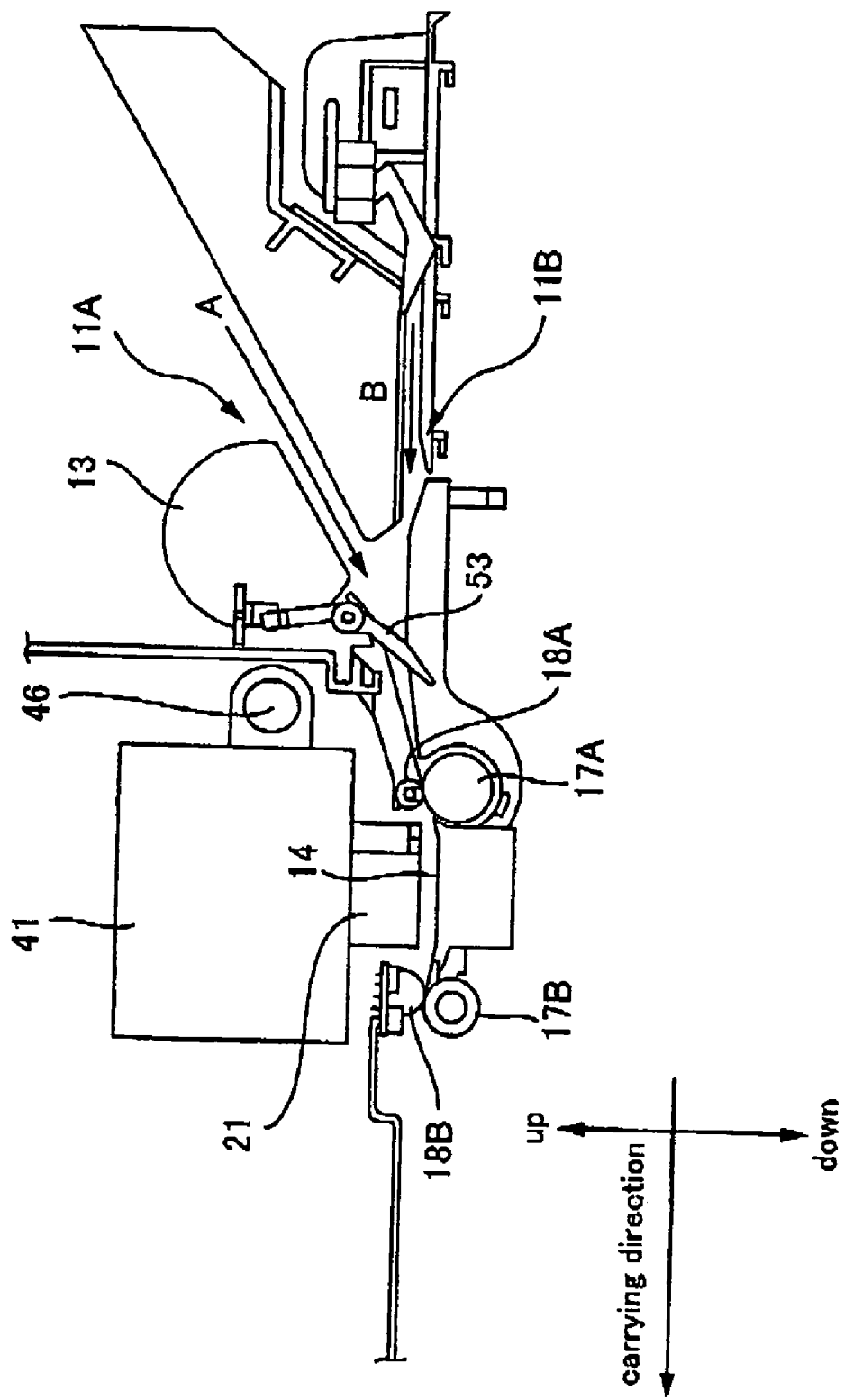
FIG. 3 is a cross sectional view of a carrying section of the printing apparatus.
Figure 4:
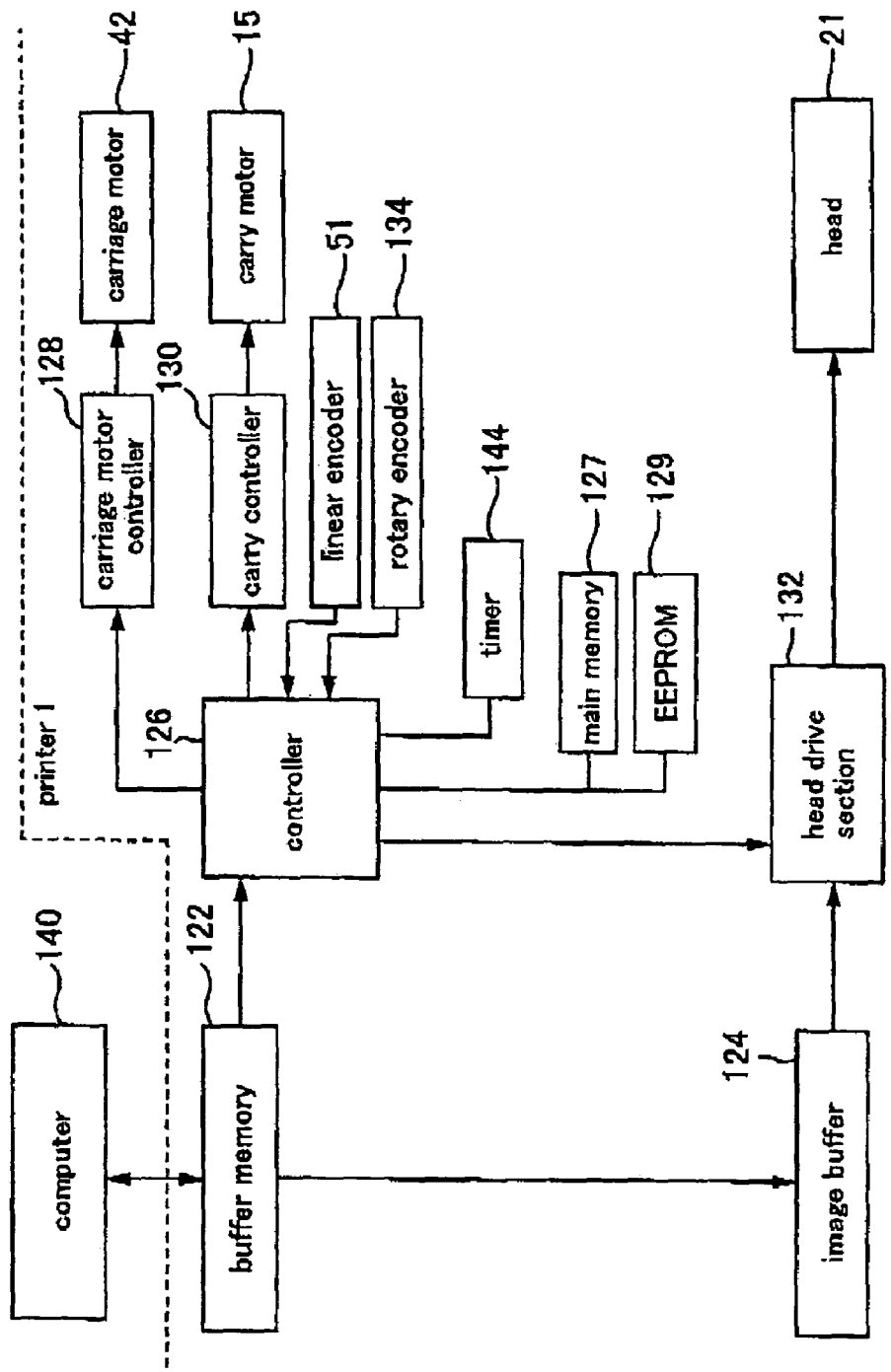
FIG. 4 is a block diagram showing a system configuration of the printing apparatus.

FIGS. 1 to 4 show an inkjet printer 1. FIG. 1 shows an exterior view of the inkjet printer 1. FIG. 2 shows an internal configuration of the inkjet printer 1. FIG. 3 shows a carrying section of the inkjet printer 1. FIG. 4 is a block diagram showing the system configuration of the inkjet printer 1.

As shown in FIG. 1, the inkjet printer 1 is provided with a structure in which a medium S such as print paper that is supplied from the rear side is discharged from the front side. A control panel 2 and a discharge section 3 are arranged at the front side portion and a paper supply section 4 is provided at the rear side portion. The control panel 2 is provided with various types of control buttons 5 and display lamps 6. The paper discharge section 3 is provided with a paper discharge tray 7 that blocks the paper discharge opening when the inkjet printer is not used. A paper supply tray 8 is arranged at the paper supply section 4 to hold cut paper (not shown). It should be noted that the inkjet printer 1 may be provided with a paper feed structure that is capable of being used in printing not only print paper in single sheets, such as cut paper, but also media that are continuous, such as roll paper.

As shown in FIG. 2, a carriage 41 is arranged inside the inkjet printer 1. The carriage 41 is arranged such that it can move relatively along a predetermined direction (the carriage movement direction in the drawing). A carriage motor 42, a pulley 44, a timing belt 45, and a guide rail 46 are provided in the vicinity of the carriage 41. The carriage motor 42 is constituted by a DC motor or the like and functions as a driving force for moving the carriage 41 relatively along the predetermined direction. Furthermore, the timing belt 45 is connected to the carriage motor 42 via the pulley 44 and a portion of it is also connected with the carriage 41, such that the carriage 41 is moved relatively along the predetermined direction by the rotation of the carriage motor 42. The guide rail 46 guides the carriage 41 along the predetermined direction.

In addition to these, also provided in the vicinity of the carriage 41 are a linear encoder 51 that detects a position of the carriage 41, a carry roller 17A for carrying a medium S along a direction perpendicular to the movement direction of the carriage 41, and a carry motor 15 that rotates the carry roller 17A.

On the other hand, ink cartridges 48 that store the various inks and a head 21 that carries out printing on the medium S are arranged at the carriage 41. The ink cartridges 48 store colored inks such as yellow (Y), magenta (M), cyan (C), and black (K) for example, and are mounted, in a removable manner, in a cartridge mounting section 49 provided in the carriage 41. Also, in this embodiment, the head 21 carries out printing by ejecting ink on the medium S. For this reason, a multitude of nozzles for ejecting ink are provided in the head 21. A detailed description of the ink ejecting mechanism of the head 21 is given later.

Additionally, a cleaning unit 30 for clearing clogging of the nozzles of the head 21 is arranged inside the inkjet printer 1. The cleaning unit 30 has a pump device 31 and a capping device 35. The pump device 31 sucks out ink from the nozzles in order to overcome clogging of the nozzles of the head 21 and is operated by a pump motor (not shown). The capping device 35 is for sealing the nozzles of the head 21 when printing is not being performed (for example during standby) so that the nozzles of the head 21 are kept from clogging.

The following is a description concerning the configuration of the carrying section of the inkjet printer 1. As shown in FIG. 3, the carrying section has a paper insert opening 11A and a roll paper insert opening 11B, a paper supply motor (not shown), a paper supply roller 13, a platen 14, a carry motor 15, a carry roller 17A and paper discharge rollers 17B, and free rollers 18A and free rollers 18B. Of these, the carry motor 15, the carry roller 17A and the paper discharge roller 17B constitute a carrying mechanism.

The paper insert opening 11A is where the medium S, which is a medium, is inserted. The paper supply motor (not shown) is a motor for carrying, into the inkjet printer 1, the medium S that has been inserted into the paper insert opening 11A, and is constituted by a pulse motor. The paper supply roller 13 is a roller for automatically carrying the medium S that has been inserted into the paper insert opening 11A into the inkjet printer 1 in the arrow direction A in the figure (in the arrow direction B in case of the roll paper), and is driven by the paper supply motor. The paper supply roller 13 has a transverse cross-sectional shape that is substantially the shape of the letter D. The peripheral length of a circumference section of the paper supply roller 13 is set longer than the carrying distance to the carry motor 15, so that using this circumference section, the medium S can be carried up to the carry motor 15.

The medium S that has been carried by the paper supply roller 13 abuts against a paper detection sensor 53. This paper detection sensor 53 is positioned between the paper supply roller 13 and the carry roller 17A, so that it detects a medium S that is supplied by the paper supply roller 13.

The medium S that is detected by the paper detection sensor 53 is carried to the platen 14. The platen 14 is a support means that supports the medium S during printing. The carry motor 15 is a motor for feeding paper, which is an example of the medium S, in the carrying direction and is constituted by a DC motor. The carry roller 17A is a roller for feeding the medium S that has been carried into the inkjet printer 1 by the paper supply roller 13 to a printable region, and is driven by the carry motor 15. The free rollers 18A are provided in a position that is in opposition to the carry roller 17A, and push the medium S toward the carry roller 17A by sandwiching the medium S between them and the carry roller 17A.

The paper discharge rollers 17B are rollers for discharging the medium S for which printing has finished to outside the inkjet printer 1. The paper discharge rollers 17B are driven by the carry motor 15 through a gear wheel that is not shown in the drawings. The free rollers 18B are provided in a position that is in opposition to the paper discharge rollers 17B, and push the medium S toward the paper discharge rollers 17B by sandwiching the medium S between them and the paper discharge rollers 17B.

<System Configuration>

The following is a description concerning the system configuration of the inkjet printer 1. As shown in FIG. 4, the inkjet printer 1 is provided with a buffer memory 122, an image buffer 124, a controller 126, a main memory 127, and an EEPROM 129. The buffer memory 122 receives and temporarily stores various data such as print data sent from a computer (computer device) 140. The image buffer 124 obtains the received print data from the buffer memory 122 and stores this data. Furthermore, the main memory 127 is constituted by a ROM or a RAM for example.

On the other hand, the controller 126 reads out a control program from the main memory 127 or the EEPROM 129 and carries out overall control of the inkjet printer 1 in accordance with the control program. The controller 126 of the present embodiment is provided with a carriage motor controller 128, a carry controller 130, a head drive section 132, a rotary encoder 134, and a linear encoder 51. The carriage motor controller 128 performs drive control of the carriage motor 42 for such aspects as rotational direction, number of rotations, torque and the like. Furthermore, the head drive section 132 performs drive control of the head 21. The carry controller 130 controls the various drive motors that are arranged in the carry system, such as the carry motor 15 that rotationally drives the carry roller 17A.

Print data that has been sent from the computer 140 is temporarily held in the buffer memory 122. Necessary information contained in the print data held here is read out by the controller 126. Based on the information that is read out, the controller 126 controls the carriage motor controller 128, the carry controller 130, and the head drive section 132 in accordance with a control program while referencing output from the linear encoder 51 and the rotary encoder 134.

Print data for a plurality of color components received by the buffer memory 122 is stored in the image buffer 124. The head drive section 132 obtains the print data for each of the color components from the image buffer 124 in accordance with control signals from the controller 126, and drives and controls the various color nozzles provided in the head 21 based on the print data.

Furthermore, a signal, which is output from the paper detection sensor 53 and that indicates whether or not the medium S is being detected, is input to the controller 126. This makes it possible for the controller 126 to distinguish whether or not the paper detection sensor 53 is detecting the medium S.

It should be noted that in addition to these, the inkjet printer 1 of the present embodiment is provided with a timer 144. The timer 144 starts time measuring in response to a command from the controller 126 and similarly stops time measuring in response to a command from the controller 126. The timer 144 transmits to the controller 126 the elapsed time that has been measured.

<Head>

Figure 5:
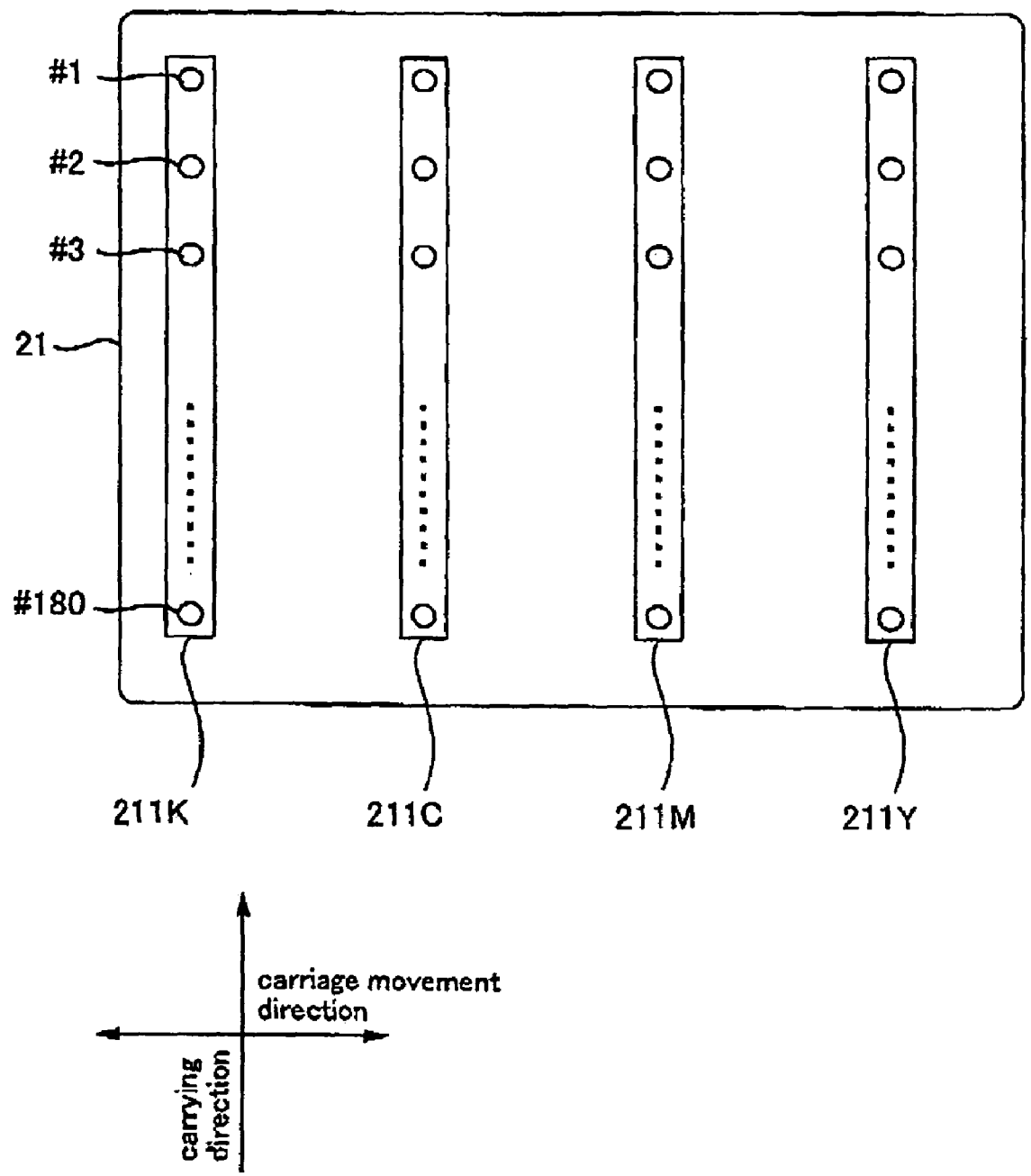
FIG. 5 is a plan view of an example of a head of the printing apparatus.

FIG. 5 shows the arrangement of ink nozzles on the bottom surface of the head 21. As shown in the diagram, nozzle groups 211Y, 211M, 211C, and 211K, which are each made from a plurality of nozzles #1 to #180 respectively for the colors of yellow (Y), magenta (M), cyan (C), and black (K), are provided in the lower surface section of the head 21.

The nozzles #1 to #180 of the nozzle groups 211Y, 211M, 211C, and 211K are arranged linearly in the carrying direction of the medium S. The nozzle groups 211Y, 211M, 211C, and 211K are positioned in parallel with spaces between the rows in the movement direction (carriage movement direction) of the head 21. The nozzles #1 to #180 are provided with piezo elements (not shown) as drive elements for ejecting droplets of ink.

When a voltage of a predetermined duration is applied between electrodes provided at both ends of the piezo element, the piezo element expands for the duration of voltage application and deforms a lateral wall of the ink channel. As a result, the volume of the ink channel is constricted by an amount according to the elongation of the piezo element, and ink corresponding to this amount of constriction becomes an ink droplet, which is ejected from the corresponding color nozzle #1 to #180.

===Printing Operation===

Figure 6:
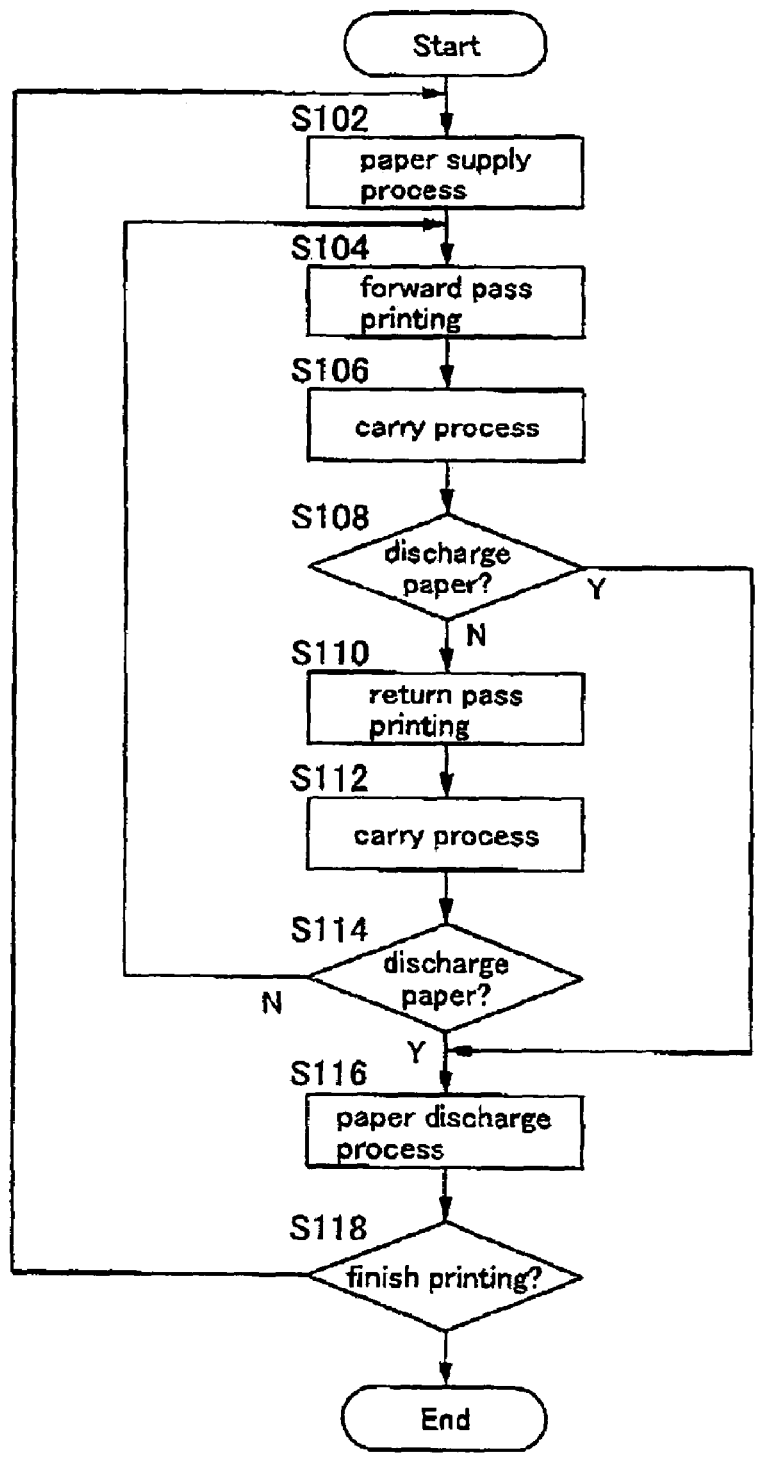
FIG. 6 is a flowchart illustrating an example of a printing process.

The following is a description of the printing operation of the above-described inkjet printer 1. Here, an example of "bidirectional printing" is explained. FIG. 6 is a flowchart illustrating an example of the process flow of the printing operation of the inkjet printer 1. The processes described below are carried out by letting the controller 126 read the program stored in the main memory 127 or EEPROM 129 and performing control in accordance with this program.

When the controller 126 receives the print data from the computer 140, then first, a paper supply process is carried out to perform printing in accordance with this print data (S102). In the paper supply process, a medium S to be printed is supplied into the inkjet printer 1 and carried to a print start position (also referred to as "indexed position"). The controller 126 rotates the paper supply roller 13 to feed the medium s to be printed up to the carry roller 17A. The controller 126 rotates the carry roller 17A to position the medium S that has been fed from the paper supply roller 13 at the print start position.

Next, the controller 126 carries out a printing process in which the medium S is printed while moving the carriage 41 relative to the medium S. Here, first, forward pass printing in which ink is ejected from the head 21 is performed while moving the carriage 41 in one direction along the guide rail 46 (S104). The controller 126 moves the carriage 41 by driving the carriage motor 42 using the carriage motor controller 128, and ejects ink by driving the head 21 in accordance with the print data. The ink ejected from the head 21 reaches the medium S, forming dots.

After printing in this manner, a carry process of carrying the medium S by a predetermined amount is carried out (S106). In this carry process, the controller 126 rotates the carry roller 17A by driving the carry motor 15 via the carry controller 130, and carries the medium S by a predetermined amount in the carrying direction relative to the head 21. With this carry process, the head 21 can print onto a region that is different from the region printed on before.

After carrying out the carry process in this manner, a paper discharge judgment is performed, which judges whether the paper should be discharged or not (S108). Here, a paper discharge process is carried out if there is no more data to be printed onto the medium S that is currently being printed (S116). On the other hand, if there is data left to be printed onto the medium S that is currently being printed, then no paper discharge process is carried out and return pass printing is executed (S110). In this return pass printing, printing is performed while moving the carriage 41 along the guide rail 46 in the opposite direction to the previous forward pass printing. Also here, the controller 126 moves the carriage 41 by rotatively driving the carriage motor 42 in a direction opposite from the previous direction via the carriage motor controller 128, ejects ink by driving the head 21 based on the print data and performs printing.

After return pass printing has been performed, a carry process is carried out (S112), and then a paper discharge judgment process is performed (S114). Here, if there is data left to be printed onto the medium s that is currently being printed, then no paper discharge process is carried out, the procedure returns to Step S104, and forward pass printing is executed again (S104). On the other hand, a paper discharge process is executed if there is no more data to be printed onto the medium S that is currently being printed (S116).

After the paper discharge process has been carried out, a print termination judgment is executed, in which it is judged whether or not printing should be terminated (S118). Here, based on the print data from the computer 140, it is checked whether or not there is a further medium S left to be printed. If there is a further medium S left to be printed, then the procedure returns to Step S102, the paper supply process is executed again, and printing begins. On the other hand, if no further medium S to be printed is left, then the printing process is terminated.

===Carry Motor Drive Control===

<Carry Controller Functions>

Drive control of the carry motor 15 is carried out by the carry controller 130. The carry controller 130 drives the carry motor 15 by predetermined drive amounts in accordance with a carry command from the controller 126. The carry motor 15 causes the carry roller 17A and the paper discharge rollers 17B to rotate in accordance with the commanded drive amounts. In this way, the carry roller 17A and the paper discharge rollers 17B rotate such that the medium S is carried by a predetermined carry amount. The amount that the medium S is carried is determined according to the rotation amount of the carry roller 17A. Consequently, if the rotation amount of the carry roller 17A can be detected then it is also possible to detect the carry amount of the medium S. Here, the rotary encoder 134 is provided in order to detect the rotation amount of the carry roller 17A.

<Rotary Encoder>

Figure 7:
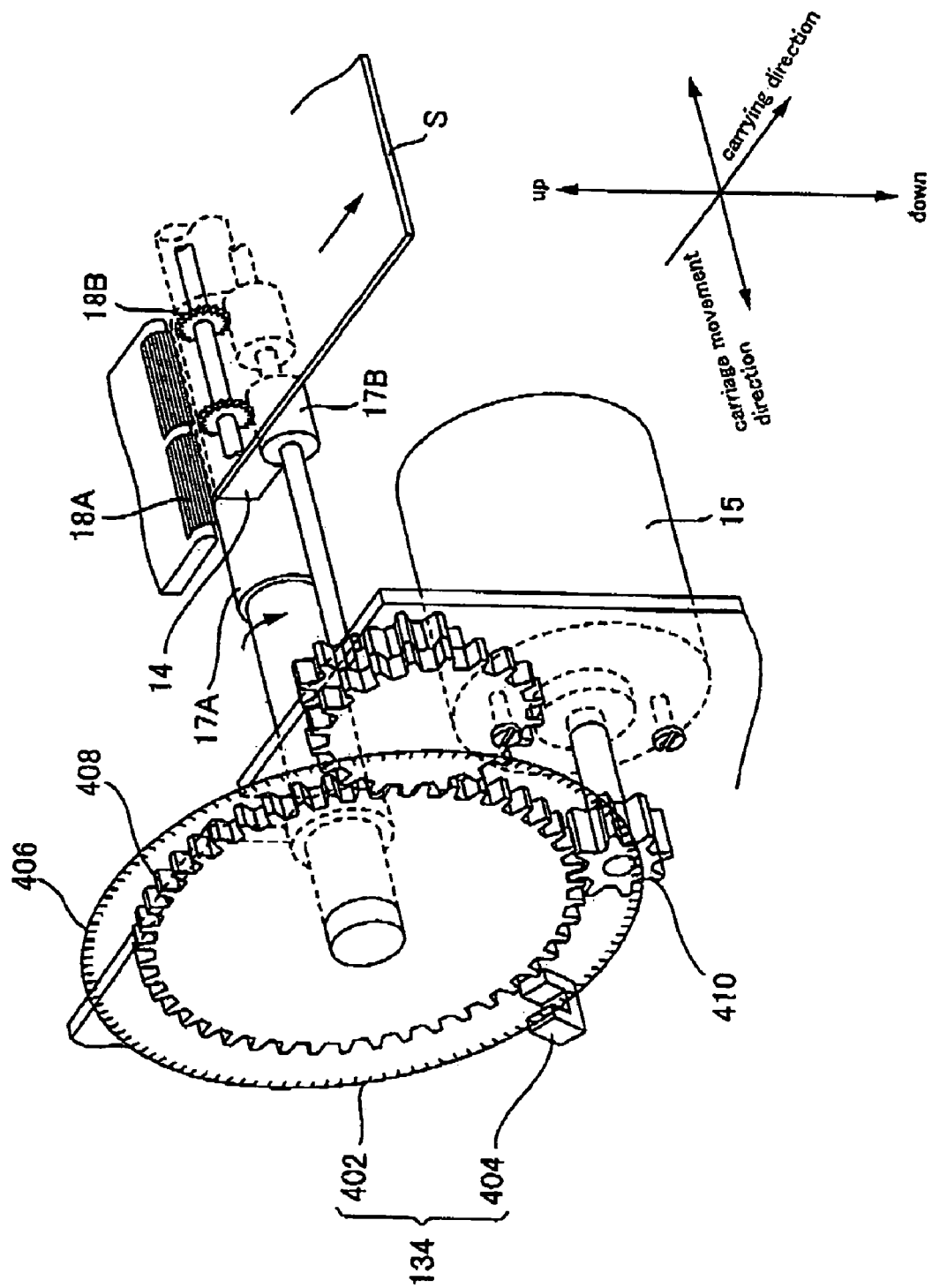
FIG. 7 is an explanatory diagram for describing an example of a rotary encoder.

FIG. 7 is an explanatory diagram for describing the structure of the rotary encoder 134. The rotary encoder 134 is provided with a rotary encoder code plate 402 and a detecting section 404.

As shown in the diagram, the rotary encoder code plate 402 is formed disk-shaped. A multitude of small slits 406 are formed at predetermined intervals in the outer periphery portion of the rotary encoder code plate 402. The rotary encoder code plate 402 is provided integrally with and adjacent to a gear wheel 408, which is provided integrally with an end portion of a shaft of the carry roller 17A that carries the medium S. The gear wheel 408 is connected to the carry motor 15 via a pinion 410 and rotates by the rotational drive of the carry motor 15 via the pinion 410. In this way, the carry roller 17A rotates by the rotational drive of the carry motor 15 such that the rotary encoder code plate 402 also rotates in synchronization with the gear wheel 408 and the carry roller 17A. On the other hand, the detecting section 404 is arranged adjacent to the rotary encoder code plate 402 and detects the rotation amount of the rotary encoder code plate 402.

<Detecting Section Structure>

Figure 8:
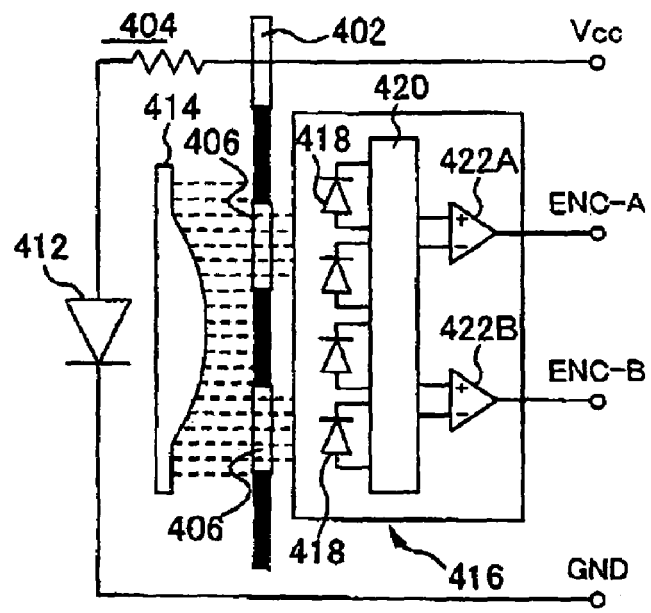
FIG. 8 is a configuration diagram showing a structure of a detecting section of the rotary encoder.

FIG. 8 shows in detail the structure of the detecting section 404 of the rotary encoder 134. The detecting section 404 is provided with a light-emitting diode 412, a collimating lens 414, and a detection processing section 416. The detection processing section 416 has a plurality (for instance, four) photodiodes 418, a signal processing circuit 420, and for example two comparators 422A and 422B.

The light-emitting diode 412 emits light when a voltage Vcc is applied to it via resistors on both sides. This light is focused into parallel light by the collimating lens 414 and passes through the rotary encoder code plate 402. The rotary encoder code plate 402 is provided with the slits 406 at a predetermined spacing (for example, 1/180 inch (one inch 2.54 cm)).

The parallel light that passes through the rotary encoder code plate 402 then passes through stationary slits (not shown) and is incident on the photodiodes 418, where it is converted into electrical signals. The electrical signals that are output from the four photodiodes 418 are subjected to signal processing in the signal processing circuit 420, and the signals that are output from the signal processing circuit 420 are compared in the comparators 422A and 422B, and the results of these comparisons are output as pulses. A pulse ENC-A and a pulse ENC-B that are output from the comparators 422A and 422B become the output signals of the rotary encoder 134.

Figure 9A:
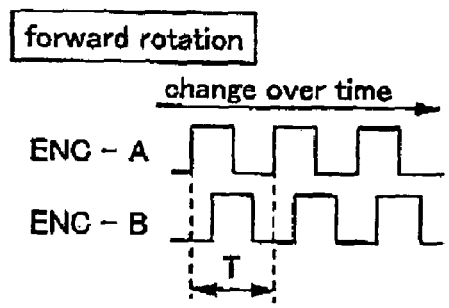
FIG. 9A is a timing chart showing output waveforms of the linear encoder during forward rotation.
Figure 9B:
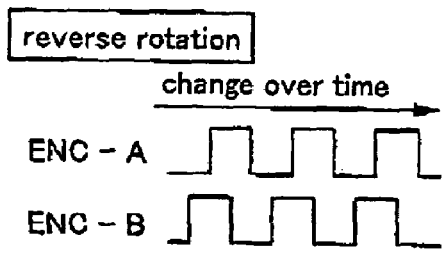
FIG. 9B is a timing chart showing output waveforms of the linear encoder during reverse rotation.

FIGS. 9A and 9B are timing charts of the waveforms of the two output signals of the rotary encoder 134 when the carry motor 15 is rotating forward, and when it is rotating in reverse. FIG. 9A is a timing chart of the waveforms of the output signals when the carry motor 15 is rotating forward. FIG. 9B is a timing chart of the waveforms of the output signals when the carry motor 15 is rotating in reverse.

As shown in FIGS. 9A and 9B, the phases of the pulse ENC-A and the pulse ENC-B are misaligned by 90 degrees both when the carry motor 15 is rotating forward and when it is rotating in reverse. When the carry motor 15 is rotating forward, that is, when the medium S is carried in the carrying direction as shown in FIG. 7, then the phase of the pulse ENC-A leads the phase of the pulse ENC-B by 90 degrees. On the other hand, when the carry motor 15 is rotating in reverse, that is, when the medium S is carried in the direction opposite the carrying direction, then the phase of the pulse ENC-A trails the phase of the pulse ENC-B by 90 degrees. A single cycle T of the pulses is the same as the time during which the carry roller 17A is rotated for an amount corresponding to the spacing of the slits 406 of the rotary encoder code plate 402 (for example, 1/1440 inch (1 inch equals 2.54 cm)).

Then, the rising edge and the rising edge of the output pulses ENC-A and ENC-B of the rotary encoder 134 are detected by the system controller 126, and by counting the number of detected edges, the rotational position of the carry motor 15 can be detected based on the number counted by the system controller 126 with respect to the calculation, when the carry motor 15 is rotating forward a "+1" is added for each detected edge, and when the carry motor 15 is rotating in reverse a "−1" is added for each detected edge. The period of the pulses ENC-A and ENC-B is equal to the time from when one slit 406 of the rotary encoder code plate 402 passes through the detecting section 404 to when the next slit 406 passes through the detecting section 404, and the phases of the pulse ENC-A and the pulse ENC-B are misaligned by 90 degrees. Accordingly, a count value of "1" of the calculation corresponds to ¼ of the spacing of the slits 406 of the rotary encoder code plate 402. Therefore, by multiplying the count value by ¼ of the spacing of the slits 406, the carry amount of the carry motor 15 from the rotational position corresponding to the count value "0" can be obtained based on this product. The resolution of the rotary encoder 134 at this time is ¼ of the spacing of the slits 406 of the rotary encoder code plate 402.

<Structure of Carry Controller>

Figure 10:
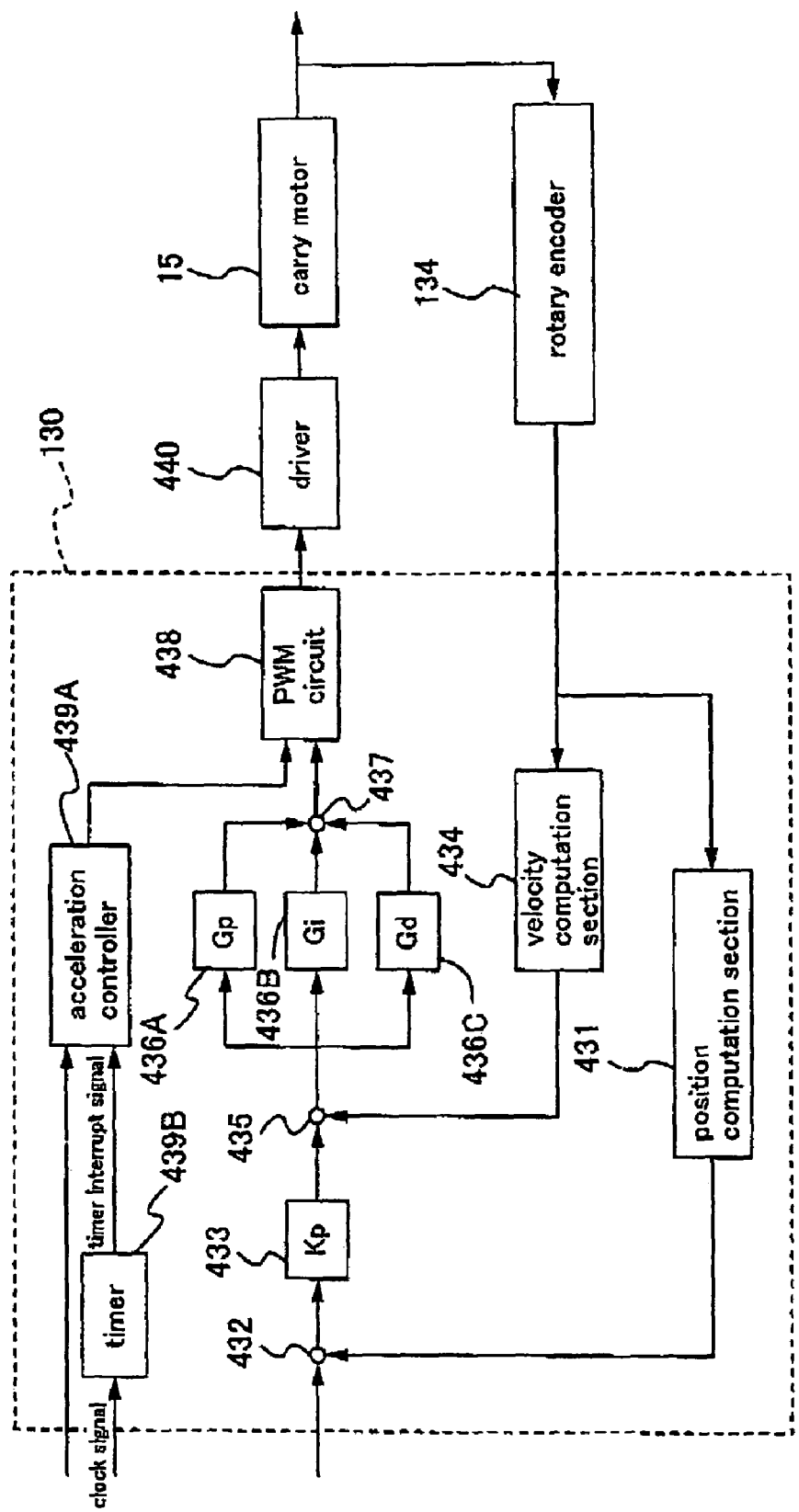
FIG. 10 is a block diagram of a carry controller.

FIG. 10 is a block diagram showing the circuit configuration of the carry controller 130. As shown in the figure, the carry controller 130 has a position computation section 431, a subtractor 432, a gain 433, a velocity computation section 434, a subtractor 435, a proportional element 436A, an integrating element 436B, a differential element 436C, an adder 437, a PWM circuit 438, an acceleration controller 439A, and a timer 439B.

The position computation section 431 detects the edges of the output pulses of the rotary encoder 134, counts that number of edges, and computes the rotation position of the carry motor 15 based on that count value. The position computation section 431 compares two pulsed signals and from this comparison, recognizes whether the carry motor 15 is rotating forward or in reverse, and when a single edge has been detected, performs the computations of incrementing or decrementing depending on whether the carry motor is rotating forward or in reverse.

The subtractor 432 computes the positional deviation between the target position sent from the controller 126 and the detection position that has been detected by the position computation section 431. The gain 433 multiplies the positional deviation that is output from the subtractor 432 by a gain Kp, and outputs the target velocity. The gain Kp is determined according to the positional deviation. It should be noted that a table showing the relationship between the value of the gain Kp and the positional deviation is stored in the main memory 127.

The velocity computation section 434 computes the rotation velocity of the carry motor 15 from the output pulses of the rotary encoder 134. That is, the velocity computation section 434 measures the length of the pulse period of the output pulses of the rotary encoder 134 and computes the rotation velocity of the carry motor 15 from this pulse period.

The subtractor 435 computes the velocity deviation between the target velocity that has been output from the gain 433 and the detection velocity that has been detected by the velocity computation section 434.

The proportional element 436A multiplies the velocity deviation by a constant Gp, and outputs this as the proportional component. The integrating element 436B integrates the values of the velocity deviation multiplied by a constant Gi, and outputs this as the integral component. The differential element 436C multiplies a constant Gd to the difference between the current velocity deviation and the immediately prior velocity deviation, and outputs this as the differential component. The computations of the proportional element 436A, the integrating element 436B, and the differential element 436C are performed for each period of the output pulse of the rotary encoder 134.

The signal values output from the proportional element 436A, the integrating element 436B, and the differential element 436C indicate a duty DX that corresponds to the respective computed results. Here, the duty DX for example indicates that the duty percentage is (100×DX/2000) %. In this case, it indicates a duty of 100% if DX=2000 and a duty of 50% if DX-1000.

The adder 437 sums up the output of the proportional element 436A, the output of the integrating element.436B, and the output of the differential element 436C. It sends the result of this addition to the PWM circuit 438 as a duty signal. The PWM circuit 438 generates a command signal that corresponds to the results of the addition by the adder 437. A driver 440 drives the carry motor 15 based on this command signal. The driver 440 is provided with a plurality of transistors, for example, and it applies a voltage to the carry motor 15 by turning these transistors on and off in accordance with the command signal from the PWM circuit 438.

The acceleration controller 439A and the timer 439B are used during acceleration control of the carry motor 15. The timer 439B generates a timer interrupt signal at predetermined time intervals based on the clock signal received from the controller 126. The acceleration controller 439A adds a predetermined duty DXP every time it receives a timer interrupt signal, and outputs a duty signal to the PWM circuit 438 as the results of this addition.

When driving the carry motor 15 such that it accelerates, the PWM circuit 438 outputs a command signal to the carry motor 15 based on the duty signal that is output from the acceleration controller 439A, thus controlling the carry motor 15. When driving the carry motor 15 at a constant speed or when decelerating the carry motor 15, the PWM circuit 438 outputs a command signal to the carry motor 15 that is based on the duty signal that is output from the adder 437, in order to perform PID control of the carry motor 15.

<Motor Driving Method>

Figure 11A:
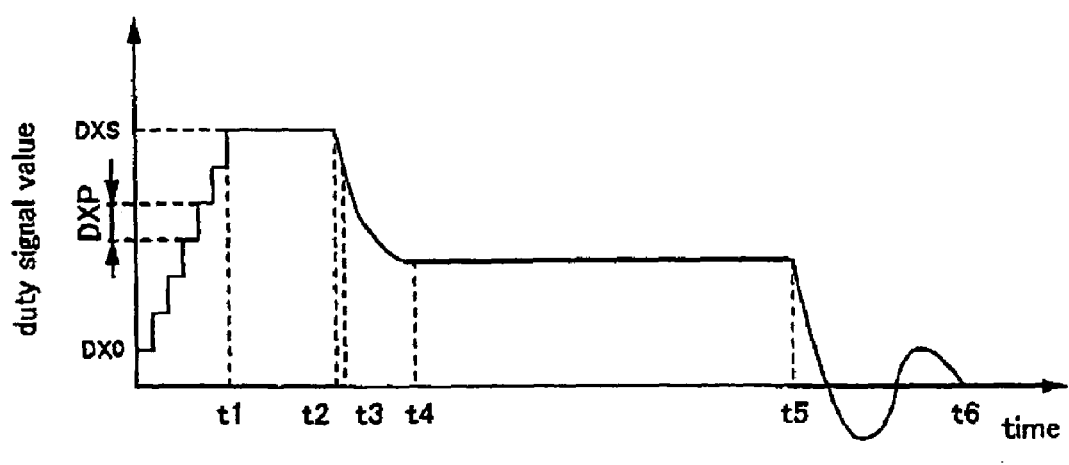
FIG. 11A is a graph plotting the change over time of the duty signal that is input to the PWM circuit.
Figure 11B:
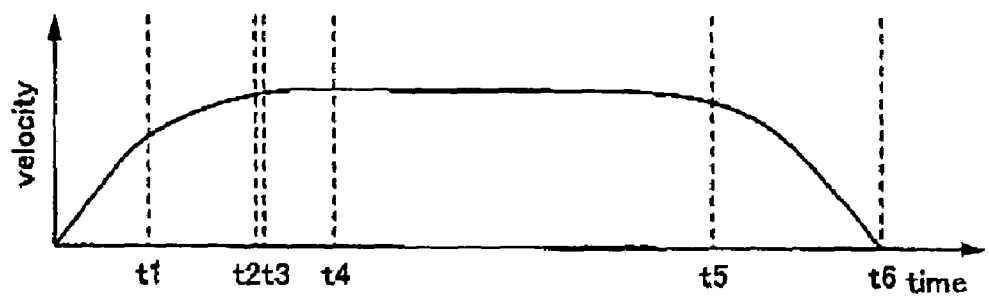
FIG. 11B is a graph plotting the change in velocity of the motor.

FIG. 11A is a graph plotting the change over time of the duty signal that is input to the PWM circuit 438. FIG. 11B is a graph plotting the change in velocity of the carry motor 15. Referring to these figures, the following is an explanation of the driving of the carry motor 15.

When the carry motor 15 is halted and an activation command signal for activating the carry motor 15 is sent from the controller 126 to the carry controller 130, an activation initial duty signal whose signal value is DX0 is sent from the acceleration controller 439A to the PWM circuit 438. The activation initial duty signal is sent from the controller 126 to the acceleration controller 439A together with the activation command signal. The activation initial duty signal is then converted into a command signal that corresponds to the signal value DX0 by the PWM circuit 438, and activation of the carry motor 15 is started.

After the carry controller 130 has received the activation command signal, a timer interrupt signal is generated by the timer 439B at predetermined intervals. Each time the acceleration controller 439A receives a timer interrupt signal it adds a predetermined duty DXP to the signal value DX0 of the activation initial duty signal and sends a duty signal whose signal value is this integrated duty to the PWM circuit 438. This duty signal is converted into a command signal corresponding to its signal value by the PWM circuit 438, and the rotation velocity of the carry motor 15 increases. Thus, the value of the duty signal sent to the PWM circuit 438 from the acceleration controller 439A rises in a stepwise manner.

The duty addition process of the acceleration controller 439A is performed until the integrated duty reaches a predetermined duty DXS. When the integrated duty becomes the predetermined value DXS at the time t1, the acceleration controller 439A stops addition and thereafter sends a duty signal whose signal value is a constant duty DXS to the PWM circuit 438.

Then, when the carry motor 15 rotates at a predetermined rotation velocity (see time t2), the acceleration controller 439A performs control to reduce the duty signal that is output to the PWM circuit 438 and thereby reduce the duty percentage of the voltage that is applied to the carry motor 15. At this time, the rotation velocity of the carry motor 15 still increases further. Then, at the time t3, the PWM circuit 438 selects the output of the adder 437 and PID control is performed. At the point that PID control is begun (t3), the integrated value of the integrating element 436B is set to an appropriate value, and the value output by the integrating element 436B becomes a predetermined value.

When PID control is started, the carry controller 130 multiplies the gain Kp to the positional deviation between the target rotation position and the actual rotation position obtained from the output of the rotary encoder 134 to calculate the target rotation velocity. The carry controller 130 uses the proportional element 436A, the integrating element 436B, and the differential element 436C to compute the proportional component, the integrated component, and the differential component based on the velocity deviation between this target rotation velocity and the actual rotation velocity obtained from the output of the rotary encoder 134, and performs control of the carry motor 15 based on the resulting sum of these computations. It should be noted that the proportional, integral, and differential computations are performed in synchronization with, for example, the rising edge of the output pulse ENC-A of the rotary encoder 134. Thus, the rotation velocity of the carry motor 15 is controlled so that it takes a desired rotation velocity at the time t4.

When the carry motor 15 approaches the target rotation position (time t5), the positional deviation becomes smaller and thus the target rotation velocity also becomes smaller. Thus, the velocity deviation, that is, the output of the subtractor 435, becomes negative, and the carry motor 15 decelerates and stops at the time t6.

===Carriage Motor Drive Control===

<Carriage Motor Controller Functions>

Drive control of the carriage motor 42 is carried out by the carriage motor controller 128. The carriage motor controller 128 drives the carriage motor 42 by predetermined drive amounts in accordance with a carriage movement command from the controller 126. The carriage motor 42 is driven by the predetermined drive amount that is commanded. The movement amount of the carriage 41 is determined according to the drive amount of the carriage motor 42. In the present embodiment, detection of the movement amount of the carriage 41 is carried out by the linear encoder 51. While monitoring the output from the linear encoder 51, the carriage motor controller 128 drives the carriage motor 42 by the predetermined drive amount that has been commanded, thus causing the carriage 41 to move by a predetermined distance.

It should be noted that, similar to the rotary encoder 134, the linear encoder 51 is provided with a linear encoder code plate 511 and a detecting section (not shown). As shown in FIG. 2, the linear encoder code plate 511 is attached to the frame inside inkjet printer 1. On the other hand, the detecting section (not shown) is attached to the carriage 41. The detecting section is provided with a structure substantially the same as the structure of the detecting section 404 of the rotary encoder 134 described in FIGS. 8 and 9. Namely, the detecting section outputs two different pulse signals corresponding to the rotation direction of the carriage motor 42, that is, the movement direction of the carriage 41. With the linear encoder code plate 511 and the detecting section (not shown), the current position of the carriage 41 can be detected.

<Carriage Motor Controller Structure>

Figure 12:
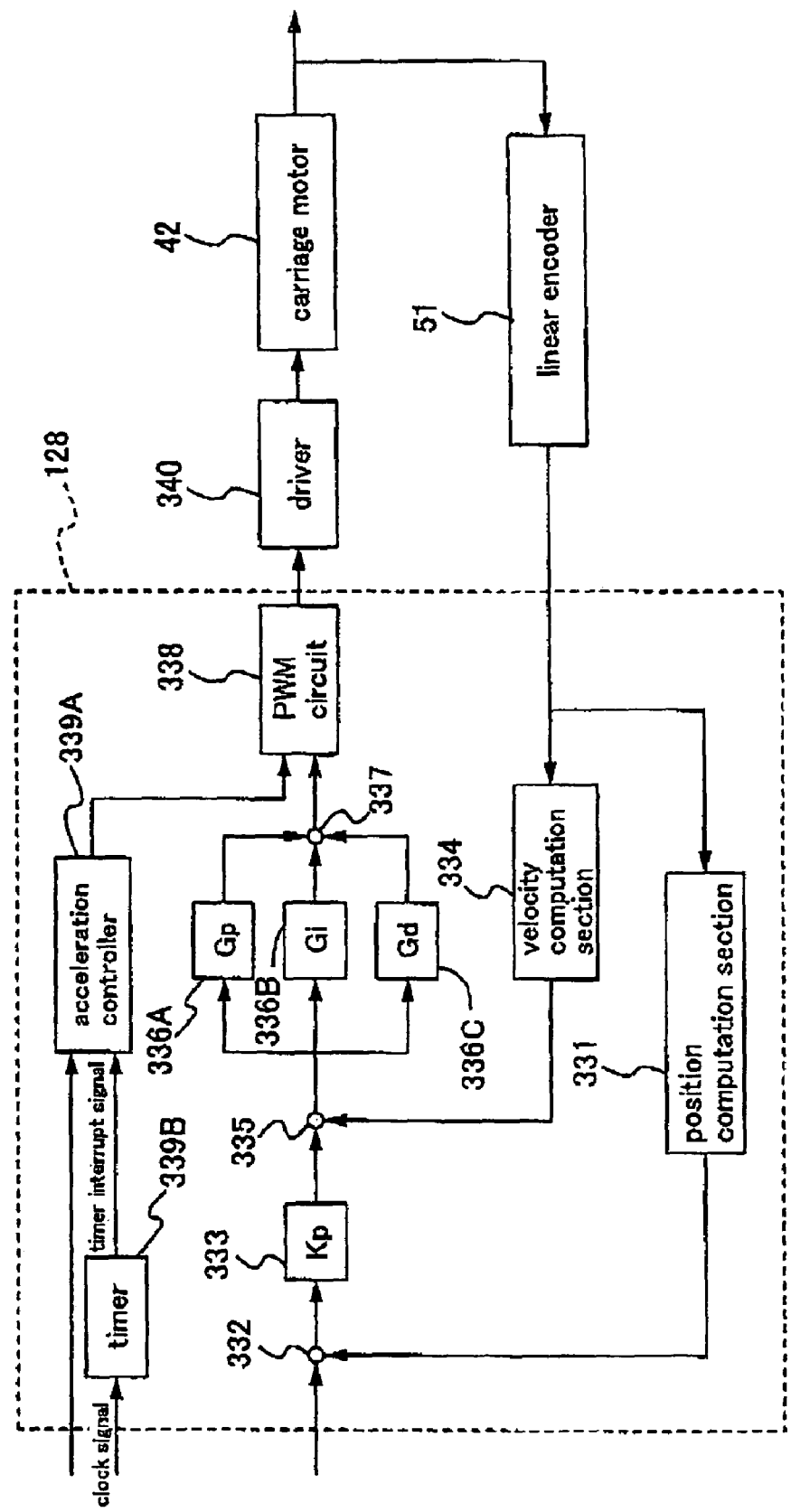
FIG. 12 is a block diagram of a carriage controller.

The configuration of the carriage motor controller 128 is described in detail next. FIG. 12 is a block diagram showing an example of the circuit configuration of the carriage motor controller 128. The carriage motor controller 128 has a structure substantially the same as the carry controller. That is to say, as shown in the diagram, the carriage motor controller 128 has a position computation section 331, a subtractor 332, a gain 333, a velocity computation section 334, a subtractor 335, a proportional element 336A, an integrating element 336B, a differential element 336C, an adder 337, a PWM circuit 338, an acceleration controller 339A, and a timer 339B.

The position computation section 331 detects the edges of the output pulses of the linear encoder 51, counts that number of edges, and computes the rotation position of the carriage motor 42 based on that count value. The position computation section 331 compares the two pulsed signals from the linear encoder 51 and from this comparison, recognizes whether the carriage motor 42 is rotating forward or in reverse, and when a single edge has been detected, performs the computations of incrementing or decrementing depending on whether the carriage motor 42 is rotating forward or in reverse.

The subtractor 332 computes the positional deviation between the target position sent from the controller 126 and the detection position that has been detected by the position computation section 331. The gain 333 multiplies the positional deviation that is output from the subtractor 332 by a gain Kp, and outputs the target velocity. The gain Kp is determined according to the positional deviation.

The velocity computation section 334 measures time of the pulse period of the output pulse of the linear encoder 51 and computes the rotation velocity of the carriage motor 42 based on this pulse period.

The subtractor 335 computes the velocity deviation between the target velocity that has been output from the gain 333 and the detection velocity that has been detected by the velocity computation section 334.

The proportional element 336A multiplies the velocity deviation by a constant Gp, and outputs this as the proportional component. The integrating element 336B integrates the values of the velocity deviation multiplied by a constant Gi, and outputs this as the integral component. The differential element 336C multiplies a constant Gd to the difference between the current velocity deviation and the immediately prior velocity deviation, and outputs this as the differential component. The computations of the proportional element 336A, the integrating element 336B, and the differential element 336C are performed per each period of the output pulse of the linear encoder 51.

The signal values output from the proportional element 336A, the integrating element 336B, and the differential element 336C indicate a duty DX that corresponds to the respective computed results.

The adder 337 sums up the output of the proportional element 336A, the output of the integrating element 336B, and the output of the differential element 336C. It sends the result of this addition to the PWM circuit 338 as a duty signal. The PWM circuit 338 generates a command signal that corresponds to the results of the addition by the adder 337. A driver 340 drives the carriage motor 42 based on this command signal. The driver 340 is provided with, for example, a plurality of transistors, and it applies voltage to the carriage motor 42 by turning these transistors on and off in accordance with the command signal from the PWM circuit 338.

Furthermore, the acceleration controller 339A and the timer 339B are used during acceleration control of the carriage motor 42. The timer 339B generates a timer interrupt signal at predetermined time intervals based on the clock signal received from the controller 126. The acceleration controller 339A adds a predetermined duty DXP every time it receives a timer interrupt signal, and outputs a duty signal to the PWM circuit 338 as the results of this addition.

When driving the carriage motor 42 such that it accelerates, the PWM circuit 338 outputs a command signal to the carriage motor 42 based on the duty signal that is output from the acceleration controller 339A, controlling the carriage motor 42. When driving the carriage motor 42 at a constant speed or when decelerating the carriage motor 42, the PWM circuit 338 outputs a command signal to the carriage motor 42 that is based on the duty signal that is output from the adder 337, in order to perform PID control on the carriage motor 42.

Here, the duty signal that is input to the PWM circuit 338 is a signal equivalent to the case of the carry controller 130 such as that shown in FIG. 11A for example. The change in velocity of the carriage motor 42 at this time is the same as for the carry controller 130 as shown in FIG. 11B. The carriage motor controller 128 controls the drive of the carriage motor 42 in the same manner as the carry controller 130 controls the drive of the carry motor 15.

===Determining Motor Overheating===

When the carry motor 15 is driven continuously, it may sometimes rise in temperature due to heating and go into a high temperature condition. When the carry motor 15 goes into a high temperature condition, there is a risk of malfunctioning such as a coil burnout for example. Accordingly, to prevent such malfunctions, the inkjet printer 1 of the present embodiment is provided with an apparatus for determining overheating that determines whether or not there is an overheating condition prior to the carry motor 15 going into a high temperature condition. It should be noted that the carry motor 15 corresponds to a "determination-target motor targeted for determination" in the present embodiment.

<Outline of Overheating Determination>

The apparatus for determining overheating successively adds the amount of drive of the carry motor 15 and determines whether or not the carry motor 15 is in an overheated state by checking whether or not the integrated value has reached a predetermined value. When it is determined by the apparatus for determining overheating that the carry motor 15 is in an overheated state, the carry motor 15 is subjected to heat restriction control. Heat restriction control refers to control that is carried out on the carry motor 15 as required and by which the carry motor 15 is made to standby for a cooling period in order to dissipate heat. Specifically, for each single time the carry motor 15 is driven, it is made to wait for an additional standby time. In this way, the temperature of the carry motor is can be made to drop slightly during the time until it is next driven, thus making it possible to prevent the temperature of the carry motor 15 from excessively rising when made to drive next. Thus, by performing heat restriction control in this manner, it is possible to inhibit temperature rises of the carry motor 15 while continuing to carryout the printing processes.

In the inkjet printer 1 of the present embodiment, the controller 126 obtains information relating to the drive amount of the carry motor 15, successively adds the drive amounts of the carry motor 15 to perform a calculation obtaining an integrated value, and checks whether or not the thus-obtained integrated value has reached a predetermined value. In other words, the controller 126 of the present embodiment corresponds to an information obtaining section, a calculating section, and a determining section.

<Actual Determination of Overheating>

Figure 13:
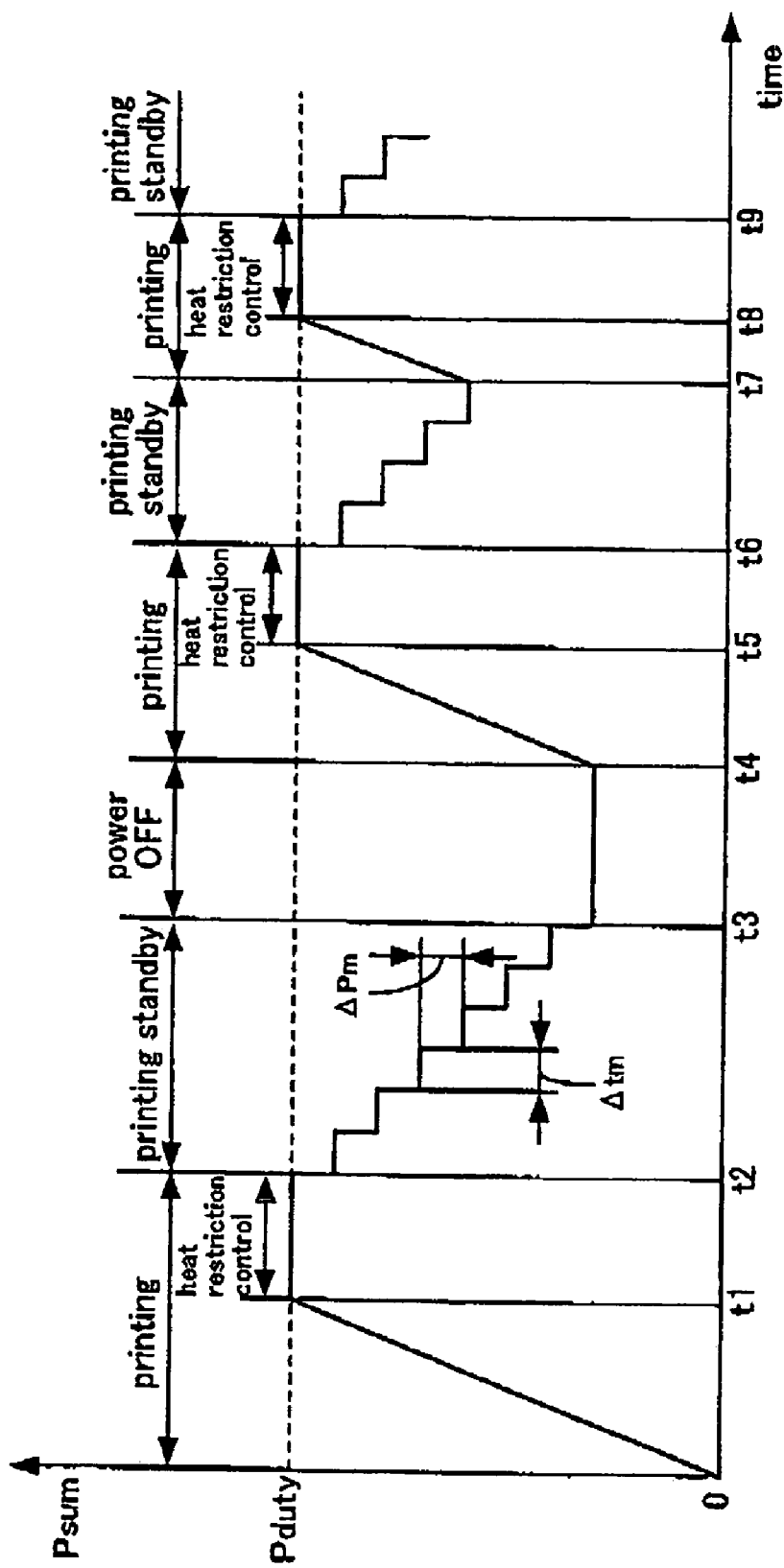
FIG. 13 shows diagrams for illustrating examples of control based on a determination of overheating of the carry motor.

FIG. 13 is a diagram in which an example of the control states when the carry motor 15 is actually driven is described simply. When the inkjet printer 1 starts a printing process, the carry motor 15 is driven to carry the medium S. When the carry motor 15 is driven, the drive amount for each drive (here the drive amount of the carry motor 15 is expressed in a unit of number of steps, which hereinafter is also referred to as "PF steps") is successively added. The controller 126 successively adds the carry amounts of the carry motor 15, these carry amounts being commanded in carry commands sent to the carry controller 130. That is, when a carry command of 200 steps is sent to the carry controller 130 as the carry amount, the controller 126 adds 200 steps. When the controller 126 sends a further carry command of 300 steps as the drive amount to the carry controller 130, 300 steps are added to the existing integrated value (currently "200"). Thus, the integrated value becomes "500." In this manner, the controller 126 successively adds the drive amounts of the carry motor 15 that have been commanded to the carry controller 130. It should be noted that in the present embodiment, the integrated value calculated by the controller 126 is referred to as "Psum."

FIG. 14 shows an example of the addition of drive amounts PFstep (number of drive steps) of the carry motor 15 by the controller 126. As shown in this diagram, when the carry motor 15 is driven 200 steps and is then subsequently driven 150 steps, the integrated value Psum becomes 350. When the carry motor 15 is further driven 250 steps, the integrated value Psum becomes 600. Next, when the carry motor 15 is driven 100 steps, the integrated value Psum becomes 700. And when the carry motor 15 is driven 50 steps, the integrated value Psum becomes 750. In this way, each time the carry motor 15 is driven, the drive amount PFstep thereof is successively added to the integrated value Psum.

When the printing process proceeds, the integrated value Psum calculated by the controller 126 gradually increases. Here, when the integrated value Psum reaches a predetermined value (here referred to as "Pduty") at time t1, the controller 126 determines that the carry motor 15 is in an overheated state and starts heat restriction control on the carry motor 15 using the carry controller 130. As stated earlier, heat restriction control involves making the carry motor 15 wait an additional standby time, as required, every time the carry motor 15 is driven once. In this way, the temperature of the carry motor 15 is inhibited from rising while continuously driving the carry motor 15.

Figure 15A:
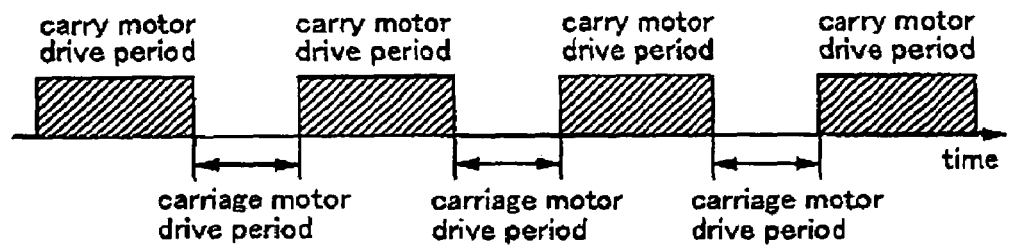
FIG. 15A is a diagram for describing the drive state of the carry motor at a normal time.
Figure 15B:
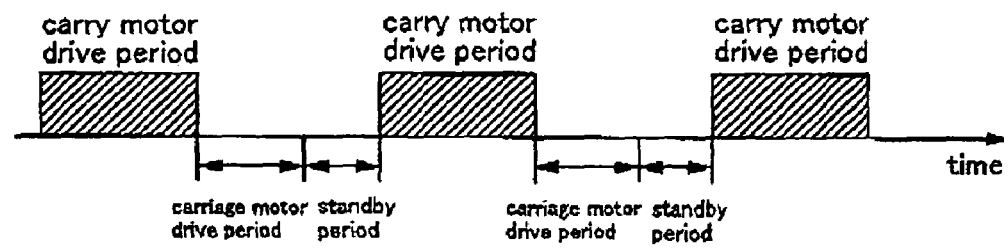
FIG. 15B is a diagram for describing the drive state of the carry motor during heat restriction.

FIGS. 15A and 15B are for describing operational conditions of the carry motor 15 when the carry motor 15 is subjected to heat restriction control and during normal times when heat restriction control is not performed. FIG. 15A shows a normal case in which heat restriction control has not been performed and FIG. 15B shows a case when heat restriction control has been performed.

As shown in FIG. 15A, when heat restriction control is not performed, the carry motor 15 is driven in alternation with the carriage motor 42 during printing. That is, when the carry motor 15 is being driven, the driving of the carriage motor 42 is halted, and when the driving of the carry motor 15 is halted, the carriage motor 42 is driven. When the driving of the carriage motor 42 is finished, the driving of the carry motor 15 starts immediately.

On the other hand, as shown in FIG. 15B, when heat restriction control has been performed, driving of the carry motor 15 does not start immediately after the driving of the carriage motor 42 has finished. That is, even after the period in which the carriage motor 42 is driven is finished, the carry motor 15 is made to pause for a short while with no driving, and driving restarts once a predetermined standby time has elapsed. This is a measure for ensuring that the temperature does not rise excessively when the carry motor 15 is next driven by providing a sufficient cooling period for the carry motor 15 that has fallen into an overheated state. In this way, printing can be carried out continuously by inhibiting the temperature of the carry motor 15 from rising while driving the carry motor 15. Printing is accomplished while thus inhibiting temperature rises of the carry motor 15.

Then, as shown in FIG. 13, after printing has finished at the time t2, when there is no print command from a user for some time and a printing standby condition continues, the controller 126 gradually reduces the integrated value Psum of the drive amount PFstep of the carry motor 15 with the passing of time. Here, the controller 126 carries out a calculation process in which the integrated value Psum is reduced by a predetermined value $\Delta$Pm for every passing of a predetermined time $\Delta$tm. In this way, during the time until there is a new print command from a user, the controller 126 gradually reduces the integrated value Psum by increments of the predetermined value $\Delta$Pm, Here, when there is a command from the user to turn off the power of the inkjet printer 1 at the time t3, then, at the time when the power is turned off, the controller 126 stores the integrated value Psum of that time in an appropriate storage section such as the main memory 127. Then, during the time when the power of the inkjet printer 1 is turned off, the integrated value Psum is stored and held.

Then, when the power to the inkjet printer 1 is turned on again by a user at the time t4, the controller 126 reads the integrated value Psum that is being stored in the main memory 127 or the like. Then, when printing has started again, the drive amount PFstep of the carry motor 15 is successively added in the same manner as described above to the integrated value Psum that has been read out. In this way, the integrated value Psum of the drive amount PFstep of the carry motor 15 again begins to gradually increase as shown in FIG. 13. Then, when the integrated value Psum again reaches the predetermined value Pduty at the time t5, the controller 126 begins to apply heat restriction control on the carry motor 15 using the carry controller 130 and an additional standby time is set as required each time the carry motor 15 is driven one time. In this way, the temperature of the carry motor 15 is inhibited from rising while continuously driving the carry motor 15.

When printing has again finished at the time t6 and when there is no print command from a user for some time after this and a printing standby condition continues, the controller 126 gradually reduces the integrated value Psum with the passing of time. Here also, the integrated value Psum is reduced by the predetermined value $\Delta$Pm every time the predetermined time $\Delta$tm passes, in the same manner as described above.

Then, when again there is print command from a user and printing starts at the time t7, the controller 126 successively adds the drive amount PFstep of the carry motor 15 to the integrated value Psum and the integrated value Psum again begins to increase gradually. After this, when the integrated value Psum again reaches the predetermined value Pduty at the time t8, heat restriction control is again carried out on the carry motor 15 by the controller 126.

<Controller Processes>

Figure 16:
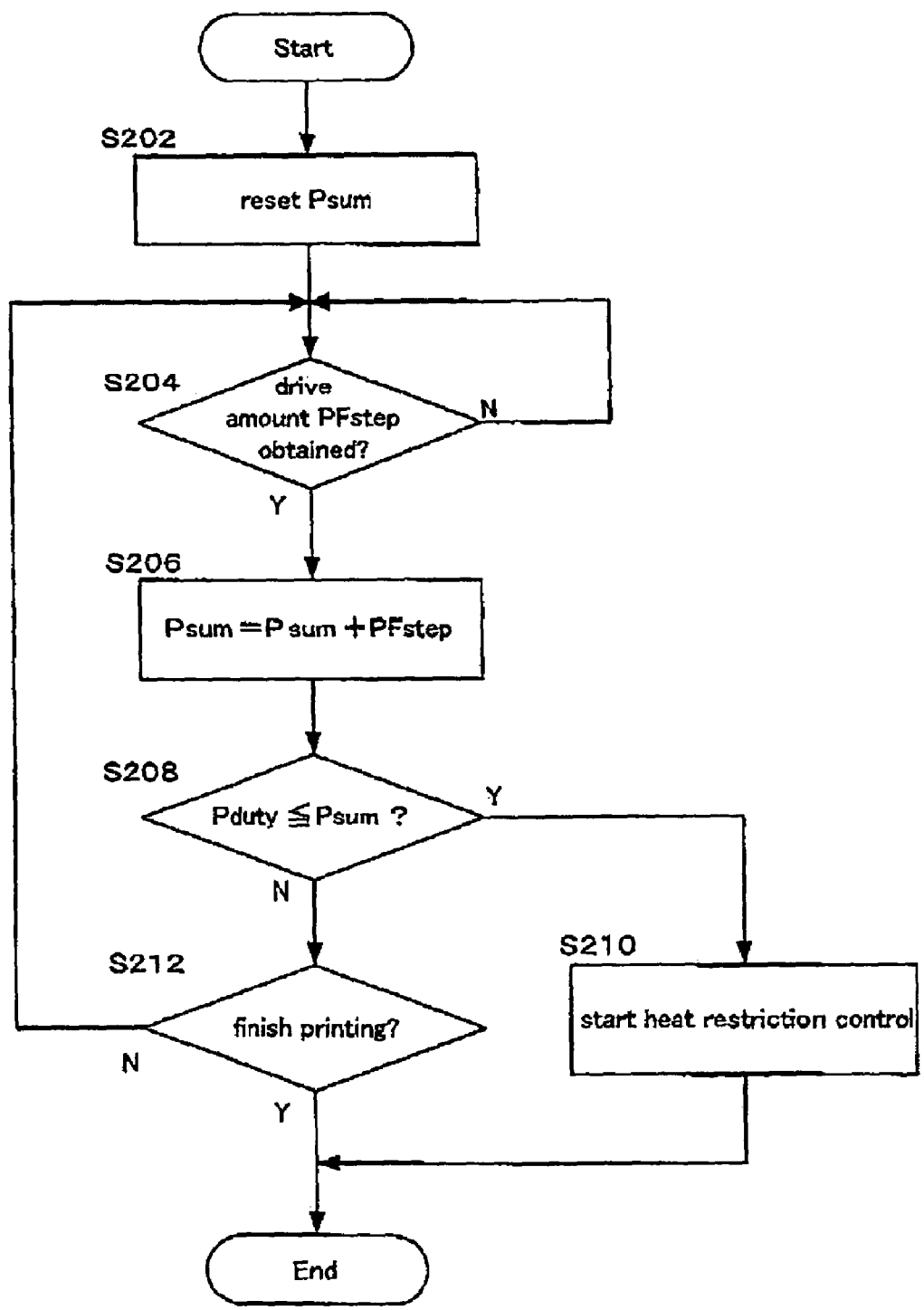
FIG. 16 is a flowchart illustrating an example of a processing procedure of an addition process and a determination process.

FIG. 16 is a flowchart illustrating an addition processing procedure of the controller 126. First, the controller 126 sets an initial value for the integrated value Psum (S202). The initial value may be zero for example, or may be the integrated value Psum stored in the main memory 127 or the like when the power was turned off previously. Next, when sending a carry command to the carry controller 130, the controller 126 checks whether or not information relating to the drive amount PFstep of the carry motor 15 has been obtained (S204). Here, if no information relating to the drive amount PFstep has been obtained, the procedure returns to step S204 and a check is carried out again as to whether or not information relating to the drive amount PFstep has been obtained (S204). This check is carried out until information relating to the drive amount PFstep is obtained.

When information relating to the drive amount PFstep of the carry motor 15 has been obtained, the procedure proceeds to the next step, step S206, and the controller 126 adds the obtained drive amount PFstep to the integrated value Psum (s206). After this adding process is finished, the controller 126 next carries out a check (S208) as to whether or not the new integrated value Psum obtained by the calculation has reached the predetermined value Pduty, which is the reference for determining whether or not there is a condition of overheating. Here, when the new integrated value Psum has reached the predetermined value Pduty, the controller 126 determines that the carry motor 15 is in an overheated state and starts heat restriction control on the carry motor 15 using the carry controller 130 (S210). After this, the controller 126 finishes the calculation processing.

On the other hand, if the new integrated value Psum has not reached the predetermined value Pduty, the controller 126 determines that the carry motor 15 is not yet in an overheated state and returns to step S204 to again try to obtain the drive amount PFstep (S204).

<Setting the Predetermined Value Pduty>

A method for setting the predetermined value Pduty, which is the reference for determining whether or not the carry motor 15 is in an overheated state, is described. Here, a simulation is carried out assuming a case in which the carry motor 15 is actually driven and the predetermined value Pduty is determined based on the results of the simulation. In this simulation, the amount of heat produced is obtained when the carry motor 15, which is the target for determination, is actually driven. Here, a case in which the carry motor 15 is driven under the most severe conditions (worst conditions) is examined. The rise in temperature of the carry motor 15 is calculated from the amount of heat produced by the carry motor 15 in this case and the aggregate drive amount of the carry motor 15 until a critical temperature (hereinafter also referred to as "limit temperature") at which the carry motor 15 can be safely used is examined.

The amount of heat produced by the carry motor 15 is calculated giving consideration to such factors as the size of the load on the carry motor 15, the effective current flowing to the carry motor 15, and temperature characteristics of the coil of the carry motor 15. Furthermore, the most severe conditions are set assuming an extremely short drive time of the carriage motor 42, for example, when the printing width in the carriage movement direction is extremely narrow such as when drawing (printing) a vertical line. As for the aggregate drive amount of the carry motor 15, the drive time of the carry motor 15 taken until the temperature of the carry motor 15 reaches the limit temperature is obtained, and the aggregate drive amount is calculated from that drive time. In the present embodiment, the aggregate drive amount of the carry motor 15 calculated here is called the predetermined value Pduty.

Figure 17:
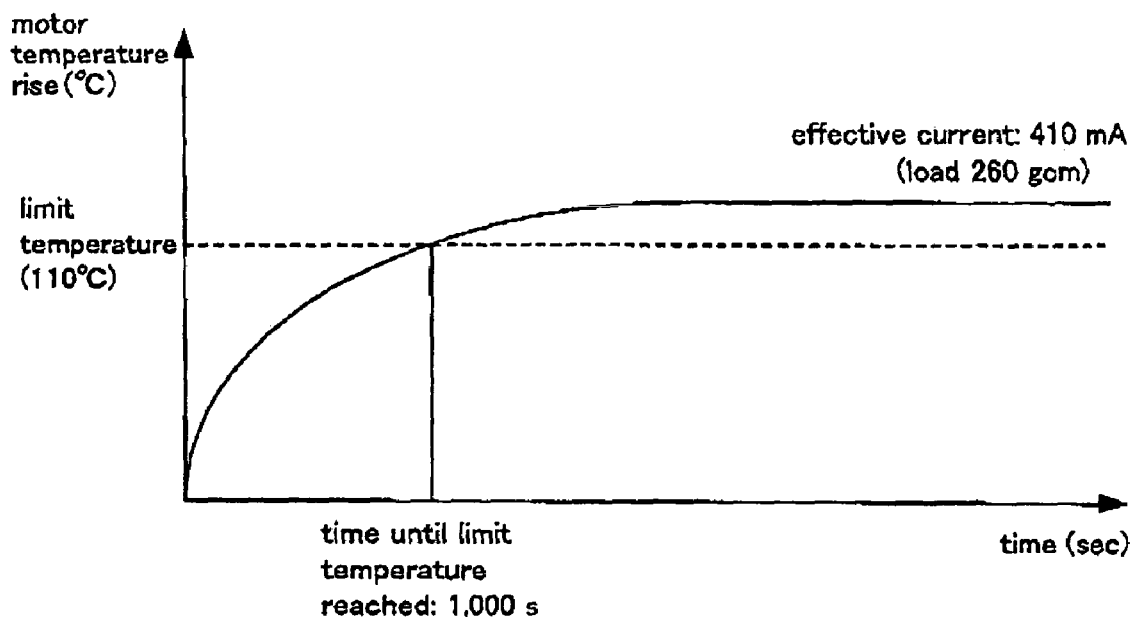
FIG. 17 is an explanatory diagram for describing an example of a method for setting the predetermined value Pduty.

FIG. 17 is for describing an example of a method for obtaining the predetermined value Pduty. The time taken until the limit temperature (110° C.) is reached with an effective current of 410 mA (corresponding to 260 gcm) is assumed to be 1,000 s. When the drive amount of the carry motor 15 required to print one sheet of an A4 size sheet is given as 15,000 steps and the printing time thereof is given as 10 s (printing speed: 6 ppm), the number of sheets that can be printed until the carry motor 15 reaches the limit temperature is 1,000 s/10 s, i.e., approximately 100 sheets. From this, the predetermined value Pduty becomes 15,000×100, giving a value of 1,500,000.

===Point of Difference from Conventional Techniques (1)===

Conventionally, the integrated value Psum has been reduced to match the temperature condition of the carry motor 15 in such ways as by gradually subtracting the integrated value Psum when the carry motor 15 has not been driven for a short while or by resetting the integrated value Psum to zero when the carry motor 15 has not been driven for a long time. However, there has been no measure in place with regard to the integrated value Psum for when the carry motor 15 is stopped for an extremely short time such as when it is stopped for an extremely short time while the carriage motor 42 is being driven.

For this reason, the integrated value Psum has reached the predetermined value Pduty and it has been determined that the carry motor 15 is in an overheated state, even in cases where the carry motor 15 has not fallen into an overheated state. When the carry motor 15 is determined to be in an overheated state, heat restriction control is executed so that additional standby time is created for the carry motor 15 to cool, which has sometimes caused problems such as printing times being lengthened and print processing being slowed.

In order to solve such problems, in the inkjet printer 1 of the present embodiment, a process is performed in which, even for cases where the carry motor 15 is stopped during the period in which the carriage motor 42 is being driven, the integrated value Psum is reduced in response to this stop time. That is, each time the carry motor 15 stops, a value corresponding to that stop time (which corresponds to a subtraction value and hereinafter is also referred to as "Psub") is subtracted from the integrated value Psum. It should be noted that the process at this time of subtracting the value "Psub," which corresponds to the stop time of the carry motor 15, from the integrated value Psum is carried out by the controller 126.

===Process Overview (1)===

Figure 18:
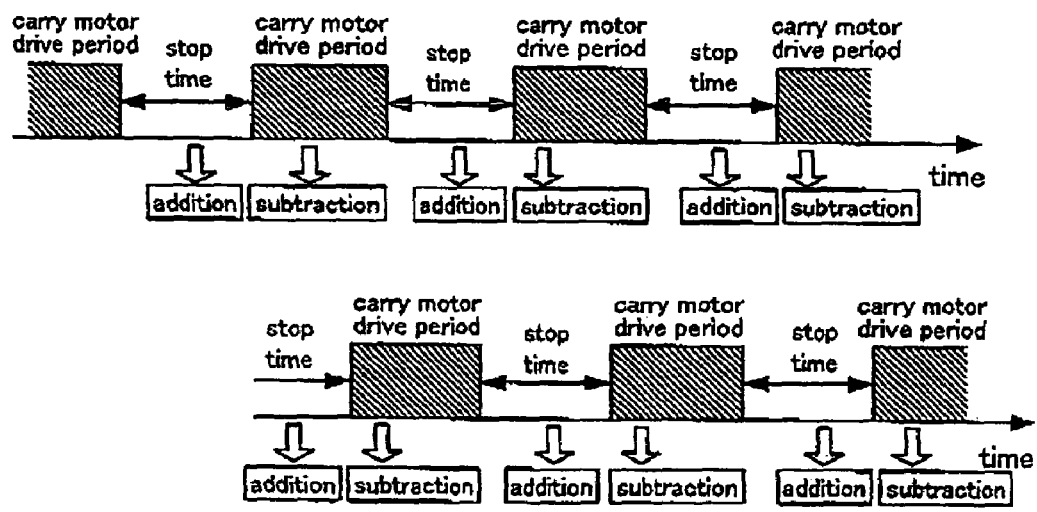
FIG. 18 is an explanatory diagram for describing an overview of principle processes of the present embodiment.

FIG. 18 is for illustrating an overview of this process. Before the carry motor 15 is driven, the controller 126 obtains information of the drive amount PFstep and adds that drive amount PFstep to the integrated value Psum. When the driving of the carry motor 15 is stopped, the controller 126 measures the stop time and subtracts a subtraction value Psub corresponding to the stop time from the integrated value Psum. The controller 126 performs this subtraction process every time the driving of the carry motor 15 is stopped then, after the drive stop period of the carry motor 15 is finished and driving of the carry motor 15 again starts, the controller 126 promptly subtracts the subtraction value Psub from the integrated value Psum.

It should be noted that the timer 144 shown in FIG. 4 is used in measuring the stop time of the carry motor 15. When the driving of the carry motor 15 stops, the controller 126 immediately activates the timer 144 and starts time measurement. Then, when the driving of the carriage motor 42 is stopped and the carry motor 15 again starts to be driven, the controller 126 stops the time measuring of the timer 144 and obtains from the timer 144 the time of the period in which the carry motor 15 was stopped. The controller 126 then subtracts the subtraction value Psub corresponding to the thus-obtained time from the integrated value Psum.

<Subtraction Process of the Controller (1)>

Figure 19:
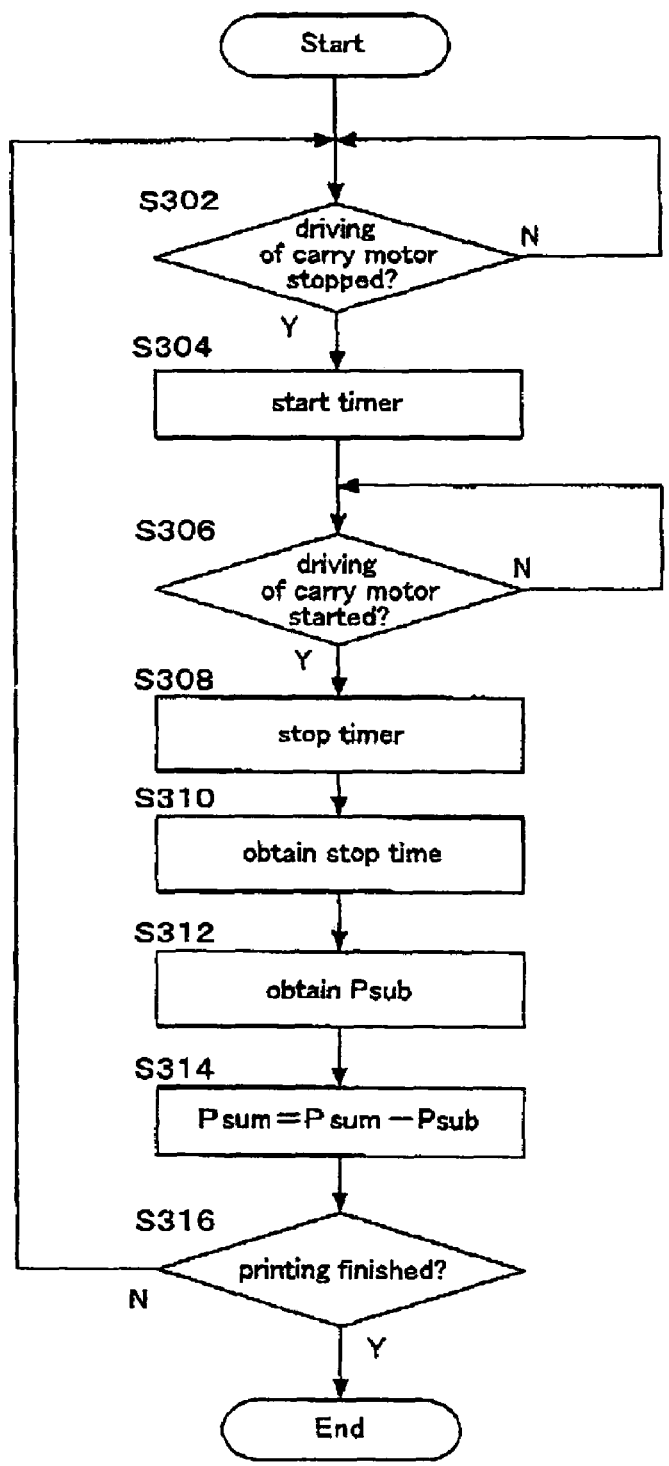
FIG. 19 is a flowchart illustrating an example of a processing procedure of a subtraction process.

FIG. 19 illustrates an example of the processing procedure of the controller 126 at this time. First, the controller 126 checks whether or not the driving of the carry motor 15 is stopped (S302). Here, when the driving of the carry motor 15 is not stopped, the procedure returns to step S302 and a check is again performed as to whether or not the driving of the carry motor 15 is stopped. This check is carried out until the driving of the carry motor 15 is stopped.

When it has been confirmed that driving of the carry motor 15 has been stopped, the controller 126 proceeds to step S304 and activates the timer 144 to immediately start time measurement (S304). Next, the controller 126 checks whether or not driving of the carry motor 15 has started (S306). Here, when driving of the carry motor 15 has not started, the procedure returns to step S306 and a check is again performed as to whether or not driving of the carry motor 15 has started. This check is carried out until driving of the carry motor 15 starts.

When it has been confirmed that driving of the carry motor 15 has started, the controller 126 proceeds to step S308 and stops the time measurement of the timer 144 (S308). In this way, the controller 126 obtains the time in which driving of the carry motor 15 has been stopped (S310).

Next, based on the stop time of the carry motor 15, the controller 126 obtains a subtraction value Psub corresponding to the stop time. Here, the controller 126 may determine the subtraction value Psub through a calculation from the stop time of the carry motor 15, or may obtain the subtraction value Psub from a table in which stop times of the carry motor 15 and subtraction values Psub are correlated.

Next, the controller 126 performs a calculation process (S314) in which the obtained subtraction value Psub is subtracted from the integrated value Psum. In this way, the integrated value Psum can be reduced according to the stop time of the carry motor 15. After the subtraction value Psub has been subtracted, the controller 126 proceeds to step S316 and investigates whether or not the printing process has finished. Here, when the printing process is not finished, the controller 126 returns again to step S302 and a check is again performed as to whether or not driving of the carry motor 15 is stopped (S302). On the other hand, if the printing process has finished, the controller 126 finishes the process of performing subtraction on the integrated value Psum corresponding to the stop time of the carry motor 15.

===Subtraction value Psub (1)===

With regard to the subtraction value Psub, which is subtracted from the integrated value Psum, it may be any value as long as it is a value corresponding to the stop time of the carry motor 15. However, in the present embodiment, in order to subtract the most appropriate subtraction value Psub from the integrated value Psum, consideration is also given to the drive mode of the carry motor 15 apart from the stop time of the carry motor 15, such that a subtraction value Psub corresponding to the drive mode is subtracted from the integrated value Psum.

FIG. 20 shows an example of a table that the controller 126 references to obtain the subtraction value. Psub. This table indicates subtraction values Psub that have been set according to the stop time of the carry motor 15 and the drive mode of the carry motor 15.

The subtraction value Psub is partitioned into three portions corresponding to the stop time Tm of the carry motor 15. That is, the stop time Tm of the carry motor 15 is partitioned into three cases; the when stop time Tm is "less than 100 ms," when it is "not less than 100 ms but less than 140 ms," and when it is "140 ms or more." The subtraction values Psub that are set in each partition are different. It should be noted that printing of "postcard" size papers may be an example for when the stop time is "not less than 100 ms but less than 140 ms". Furthermore, printing of A4 size papers may be an example for when the stop time is "140 ms or more."

Here, moreover, the subtraction values Psub are different for each drive mode of the carry motor 15. There are seven types of drive mode, from "PS0" to "PS6." Each of the drive modes "PS0" to "PS6" is set according to the drive amount PFstep when the carry motor 15 is driven. Here, when the drive amount PFstep of the carry motor 15 is from 1 to 25 steps, "PS6" is set as the drive mode of the carry motor 15. Furthermore, when the drive amount PFstep of the carry motor 15 is from 25 to 50 steps, "PS5" is set as the drive mode of the carry motor 15. When the drive amount PFstep of the carry motor 15 is from 50 to 100 steps, "PS4" is set as the drive mode of the carry motor 15. When the drive amount PFstep of the carry motor 15 is from 100 to 150 steps, "PS3" is set as the drive mode of the carry motor 15. When the drive amount PFstep of the carry motor 15 is from 150 to 200 steps, "PS2" is set as the drive mode of the carry motor 15. When the drive amount PFstep of the carry motor 15 is from 200 to 250 steps, "psi" is set as the drive mode of the carry motor 15. And when the drive amount PFstep of the carry motor 15 is 250 or more steps, "PS0" is set as the drive mode of the carry motor 15.

<Drive Mode>

Figure 21:
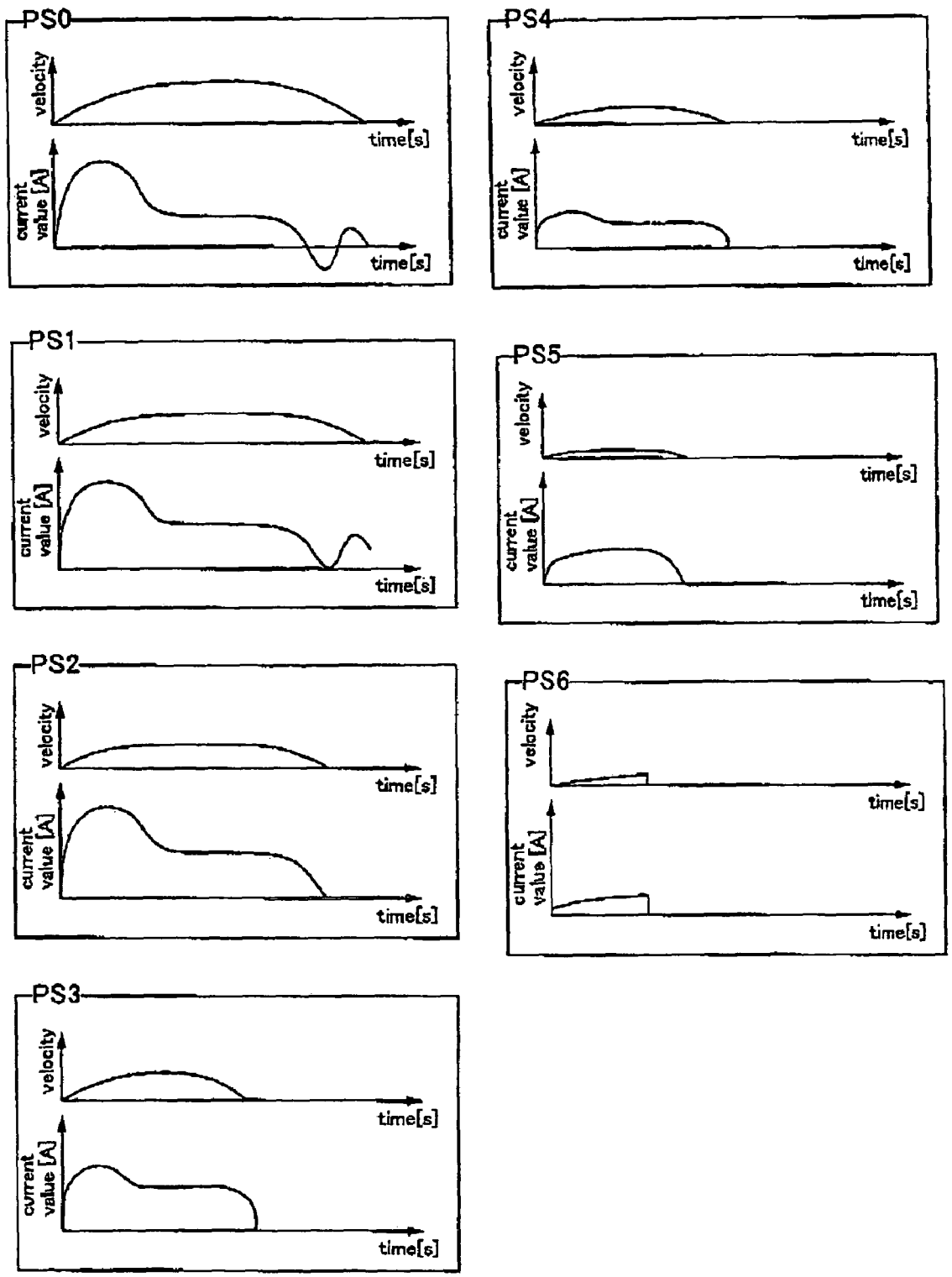
FIG. 21 is a diagram that shows an example of separate control profiles for each of the drive modes.

Each of the drive modes "PS0" to "PS6" has a different profile for controlling the carry motor 15 when respectively driving the carry motor 15. FIG. 21 shows an example of separate control profiles for the drive modes "PS0" to "PS6." In the drive modes "PS0" to "PS6," at least one of the rate of acceleration when accelerating, the velocity at constant speed, and the rate of acceleration when decelerating when respectively driving the carry motor 15, is different.

When the drive mode is "PS0" since the drive amount PFstep is extremely large at "250 steps or more," a large drive current is applied to the carry motor 15 at the time of acceleration in order to drive the carry motor 15 at high speed as shown at the top left in the drawing, such that the velocity of the carry motor 15 is controlled so as to reach a high speed range in a short time. When decelerating, in order to be able to stop the carry motor in a short time from the high speed range, a reverse direction drive current is applied to control the carry motor so as to achieve rapid deceleration.

On the other hand, when the drive mode is "PS1," since the drive amount PFstep is "200 to 250 steps," which is slightly less than the "PS0" mode, there is no need to perform driving at a speed as high as the drive mode "PS0" and the drive current of the carry motor 15 is also smaller.

Similarly for the drive mode "PS2," since the drive amount PFstep becomes smaller at "150 to 200 steps," the drive velocity that is set is also slower and the drive current is also smaller.

Further still, similarly for the other drive modes "PS3" to "PS6," since the drive amounts PFstep gradually become smaller, the drive velocity that is set also becomes gradually slower, and the drive current also becomes gradually smaller.

<Reason for Different Subtraction Values Psub>

Figure 22A:
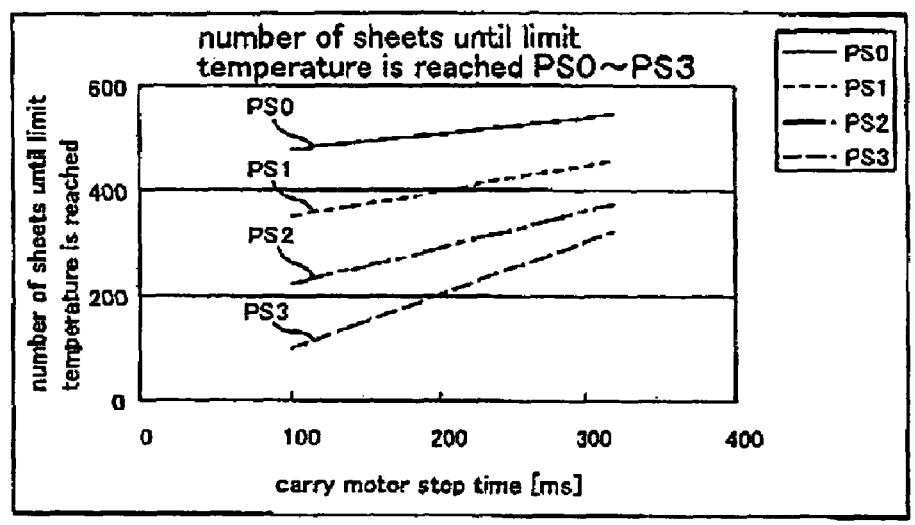
FIG. 22A is a diagram that shows the number of sheets until the limit temperature is reached in the case of the drive modes PS0, PS1, PS2, and PS3.
Figure 22B:
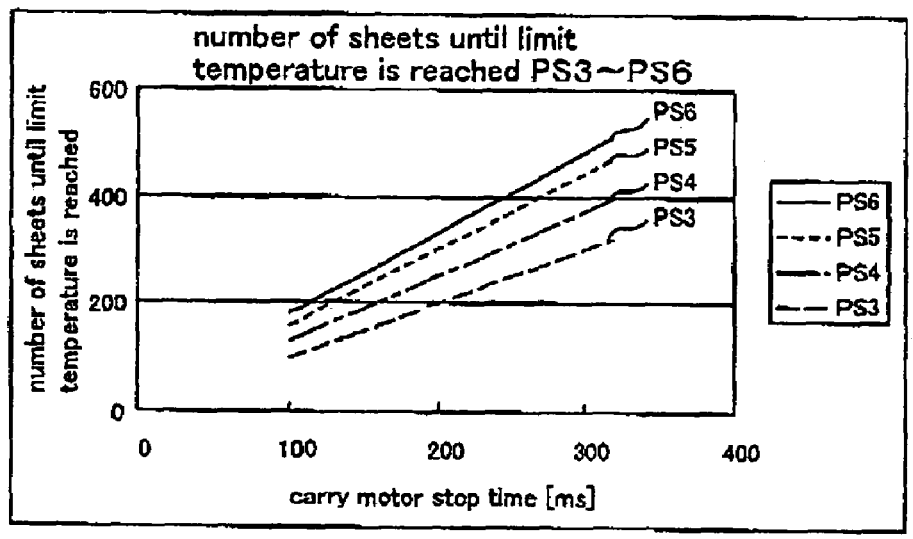
FIG. 22B is a diagram that shows the number of sheets until the limit temperature is reached in the case of the drive modes PS3, PS4, PS5, and PS6.

The subtraction values Psub are different for the drive modes "PS0" to "PS6" for reasons that include the following. FIGS. 22A and 22B are graphs that show an overview of investigating the number of sheets that can be printed until the carry motor 15 reaches the limit temperature (hereinafter called "number of sheets until limit temperature reached") in which respective simulations were carried out separately for each of the drive modes PS0 to PS6. FIG. 22A shows an overview for the drive modes PS0, PS1, PS2, and PS3. FIG. 22B shows an overview for the drive modes PS3, PS4, PS5, and PS6. It should be noted that the numbers of sheets until the limit temperature is reached that are shown here are converted for the case of printing on A4 size sheets. Furthermore, as was described previously, the number of sheets until the limit temperature is reached can be obtained from the printing time of the carry motor 15 until a critical temperature (limit temperature) is reached in which the carry motor 15 can be used safely. Furthermore, in order to facilitate comparison between the drive modes PS0 to PS6, the results for the drive mode PS3 are shown in both FIG. 22A and FIG. 22B.

As shown in FIG. 22A in regard to the drive modes PS0, PS1, PS2, and PS3, the number of sheets until the limit temperature is reached increases for longer stop times of the carry motor 15. On the other hand, among the drive modes PS0 to PS3, the number of sheets until the limit temperature is reached is greatest in the drive mode PS0 and the number of sheets until the limit temperature is reached is smallest for the drive mode PS3. This would appear to be because the drive modes PS0, PS1, and PS2 have a faster drive velocity compared to the drive mode PS3, and therefore, the number of sheets that can be printed until the limit temperature is reached is greater.

On the other hand, as shown in FIG. 22B, in regard to the drive modes PS3, PS4, PS5, and PS6, the number of sheets until the limit temperature is reached increases for longer stop times of the carry motor 15 as is the case for the drive modes PS0, PS1, and PS2. However, among the drive modes PS3 to PS6, the number of sheets until the limit temperature is reached is greatest in the drive mode PS6 and the number of sheets until the limit temperature is reached is smallest for the drive mode PS3. This would appear to be because the number of times the carry motor 15 stops increases for smaller single drive amounts PFstep in the drive modes PS4, PS5, and PS6, and thus the number of sheets that can be printed until the limit temperature is reached is greater.

Furthermore, the fact that the slope in the graph is greater for the drive modes PS4, PS5, and PS6 compared to the drive modes PS0, PS1, PS2, and PS3 would appear to be because the number of times the carry motor 15 stops increases for smaller single drive amounts PFstep, and thus the number of sheets that can be printed until the limit temperature is reached increases as the stop times of the carry motor 15 become longer.

In this way, the number of sheets until the limit temperature is reached is different in each of the drive modes PS0 to PS6. In particular, the number of sheets until the limit temperature is reached is not necessarily greater when there are greater drive amounts PFstep than other drive modes, and it is necessary to separately set the subtraction values Psub for each of the drive modes PS0 to PS6.

<Method for Obtaining the Subtraction Value Psub (1)>

Next, a method for obtaining the subtraction values Psub is described in detail. FIG. 23 shows an example of when the number of sheets until the limit temperature is reached is set separately for stop times in each drive mode. Here, in order to secure very high safety, the number of sheets until the limit temperature is reached is set on the safe side, that is, set lower than actual simulation results. It should be noted that here the previously described method is used in regard to the method for obtaining the number of sheets until the limit temperature is reached.

First, a reference drive condition is determined. Here, as shown in the table, the number of sheets until the limit temperature is reached when the motor stop time Tm is "Tm<100 ms" in the drive mode PS3 is lowest at 100 sheets; therefore, each subtraction value Psub is obtained using this drive condition as a reference.

Here, the subtraction value Psub is obtained for when the motor stop time Tm is "Tm<100 ms" in the drive mode PS0. The number of sheets until the limit temperature is reached is 480 sheets. The drive amount PFstep of the carry motor when printing a single A4 sheet is 580 mm, so that the following is true when converting the number of sheets until the limit temperature is reached into the aggregate number of drive steps of the carry motor 15.

$$480 \text{ (sheets)} \times 580 \text{ mm}/25.4 \text{ (inch conversion)} \times 720 \text{ dpi} = \quad (1)$$

$$7,891,653 \text{ steps}$$

It should be noted that here the conversion for the number of drive steps is carried out assuming printing at a resolution of 720 dpi.

On the other hand, when obtaining the aggregate number of drive steps of the carry motor when the motor stop time Tm is "Tm<100 ms" in the reference drive mode PS3, the following is true.

$$100 \text{ (sheets)} \times 580 \text{ mm}/25.4 \text{ (inch conversion)} \times 720 \text{ dpi} = \quad (2)$$

$$1,644,094 \text{ steps}$$

It should be noted that the value of (2) becomes the predetermined value Pduty.

Obtaining the difference between the value of (1) and the value of (2) gives 6,247,559 steps. Obtaining the rate of increase from this difference when the motor stop time Tm is "Tm<100 ms" in the drive mode PS0 gives 6,247,559/7,891,653, which is a rate of increase of 0.79.

The rate of increase of 0.79 is multiplied by the smallest drive amount of 250 steps in the drive mode PS0. As a result, a value of 0.79×250=197 is obtained. As shown in the Psub table of FIG. 20, the thus-obtained value is set as the subtraction value Psub when the motor stop time Tm is "Tm<100 ms" in the drive mode PS0.

Furthermore, the case of when the motor stop time is "140≦Tm" in the drive mode PS2 is examined. Since the number of sheets until the limit temperature is reached is 374 sheets, the aggregate number of drive steps of the carry motor is as follows:

$$374 \text{ (sheets)} \times 580 \text{ mm}/25.4 \text{ (inch conversion)} \times 720 \text{ dpi} = \quad (3)$$

$$6,148,913 \text{ steps}$$

Obtaining the difference between the value of (3) and the reference value of (2) gives 4,504,819 steps. Determining the rate of increase from this difference gives 4,504,819/6,148,913, thus obtaining a rate of increase 0.73. The rate of increase of 0.73 is multiplied by the smallest drive amount of 150 steps in the drive mode PS2, giving 0.73×150=109, and as shown in the Psub table of FIG. 20, this value is set as the subtraction value Psub when the motor stop time Tm is "140≦Tm" in the drive mode PS2.

In this way, the subtraction values Psub for each of the motor stop times of the drive modes PS0 to PS6 are obtained from the number of sheets until the limit temperature is reached shown in FIG. 23, to complete the Psub table as shown in FIG. 20.

<Procedure for Obtaining the Subtraction Value Psub (1)>

Figure 24:
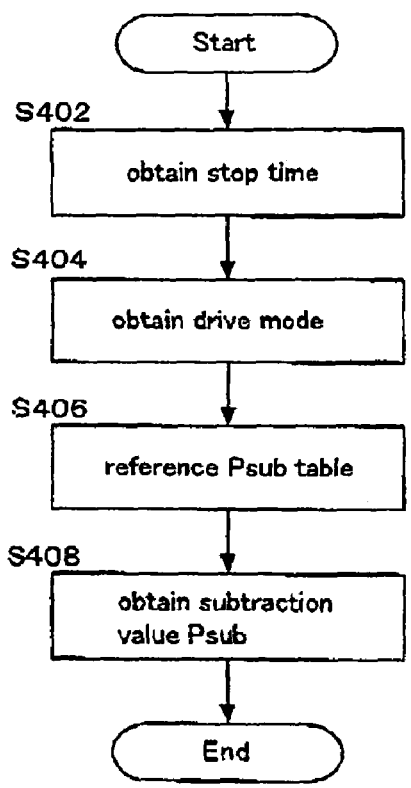
FIG. 24 is a flowchart illustrating an example of a procedure for obtaining the subtraction value.

FIG. 24 is a flowchart illustrating an example of a procedure for obtaining the subtraction value Psub by the controller 126. Here, the controller 126 first obtains the stop time of the carry motor 15 in order to obtain the subtraction value Psub (S402). It should be noted that the method for obtaining the stop time of the carry motor 15 is as has been described previously. After the stop time of the carry motor 15 has been obtained in this manner, next, the controller 126 obtains information relating to the drive mode of the carry motor 15 (S404). Here, the information relating to the drive mode that the controller 126 obtains refers to the drive mode used when driving of the carry motor 15 has started after the completions of the stop time of the carry motor. That is, for example, when the carry motor 15 is driven in the drive mode PS4 after a stop time of 100 ms, the drive mode PS4 is obtained by the controller 126 corresponding to the stop time 10 ms.

After information relating to the drive mode of the carry motor 15 has been obtained in this manner, next, the controller 126 references (S406) the Psub table (see FIG. 20). Here, based on the obtained stop time and the obtained drive mode, the controller 126 obtains from the Psub table a subtraction value Psub that is correlated with these (S408). After this, the controller 126 finishes the process of obtaining the subtraction value Psub.

After this process is finished, the controller 126 performs a calculation in which the subtraction value Psub, which has been obtained as described previously in FIG. 19, is subtracted from the integrated value Psum. It should be noted that the controller 126 obtains the subtraction value Psub each time the stop time of the carry motor 15 has finished and driving of the carry motor 15 is restarted.

<Effect of Subtracting the Subtraction Value Psub (1)>

Figure 25:
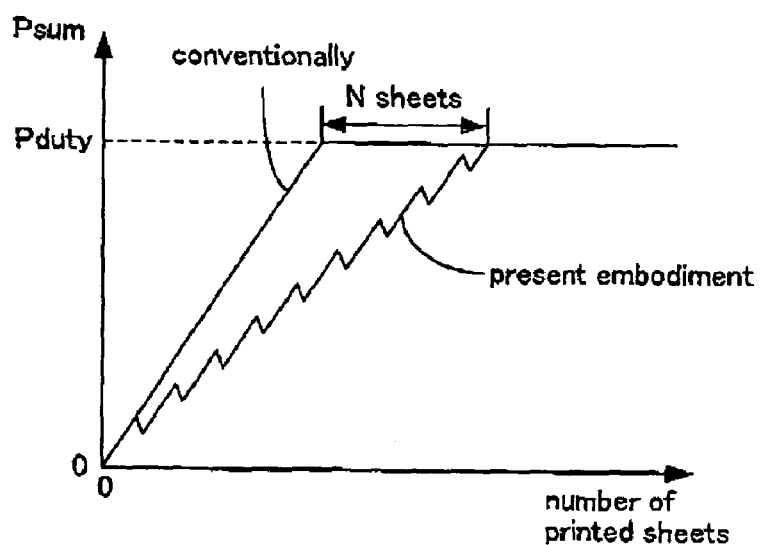
FIG. 25 is a diagram that illustrates a difference in the way the integrated value increases in the case of a conventional technique and in the case of the present embodiment.

FIG. 25 shows how the integrated value Psum increases in the case of a conventional technique and in the case of the present embodiment. In the case of a conventional technique, only the drive amounts PFstep of the carry motor 15 are successively added for the integrated value Psum, and therefore, as shown in the diagram, the integrated value Psum reaches the predetermined value Pduty, which is the reference for determining whether or not there is an overheated state, at a stage when the number of printed sheets is still small. Thus, the carry motor 15 is determined to be in an overheated state at a stage when the temperature of the carry motor 15 has not risen to such an extent, which has resulted in heat restriction control being started for the carry motor 15. In this way, sometimes problems have occurred in which additional standby time is created for the carry motor 15, which results in printing times being lengthened and print processing being slowed down.

In contrast to this, in the case of the present embodiment, the subtraction value Psub is successively subtracted from the integrated value Psum each time the carry motor 15 is driven. Thus, in the case of the present embodiment, the time taken until the integrated value Psum reaches the predetermined value Pduty is delayed compared to the conventional technique as shown in FIG. 25. That is, as long as the temperature of the carry motor 15 does not rise substantially, the integrated value Psum does not reach the predetermined value Pduty. Thus, with the present embodiment, an additional N number of sheets more than with the conventional technique can be printed before executing heat restriction control <Summary (1)>

In the inkjet printer 1 according to the present embodiment, in addition to a calculation in which the integrated value Psum is obtained by successively adding the drive amounts PFstep of the carry motor 15, a calculation is performed in which a subtraction value Psub corresponding to the stop time from the time the carry motor 15 is stopped is subtracted from the integrated value Psum. Therefore an integrated value Psum can be obtained that matches the temperature condition of the carry motor 15. In this way, it is possible to prevent early execution of heat restriction control on the carry motor 15 that occurs when the carry motor 15 is determined to be in an overheated state regardless of the carry motor 15 not being in an overheated state. Moreover, reduced costs can be achieved since it is possible to achieve the same number of sheets until the heating limit temperature is reached even with a small size motor.

Further still, in the present embodiment, since the subtraction value Psub that is subtracted from the integrated value Psum is set giving consideration also to the drive mode of the carry motor 15, a more appropriate subtraction value Psub can be subtracted from the integrated value Psum, which enables an integrated value Psum to be obtained that better matches the temperature condition of the carry motor 15.

Moreover, in the present embodiment, since the drive amount PFstep of the carry motor 15 is added to the integrated value Psum before the carry motor 15 is driven according to that drive amount PFstep, it is possible to forecast a temperature condition of the carry motor 15 in advance, thereby enabling heat restriction control to be implemented on the carry motor 15 at an early stage. This makes it possible to achieve very high safety.

Furthermore, since a Psub table in which the stop time and the drive mode of the carry motor 15 and the subtraction values Psub are associated is provided in the present embodiment, the subtraction value Psub can be obtained simply.

It should be noted that the present embodiment was described using the carry motor 15 as an example of a motor for which an overheated state was to be determined, but in the case of the inkjet printer 1 of the present embodiment, the carriage motor 42 may also be a target for determining whether or not there is an overheated state. In this case, it is preferable that the various calculations, obtaining of the stop times and the like are carried out by the controller 126. Furthermore, it goes without saying that heat restriction control may be executed also on the carriage motor 42.

===Point of Difference from Conventional Techniques (2)===

Here, instead of performing a process of subtracting a value (Psub) corresponding to the stop time of the carry motor 15 from the integrated value Psum when the carry motor 15 stops as in the above-described embodiment, a process of reducing the integrated value Psum according to a drive amount of the carriage motor 42 during that stoppage is executed. That is, each time the carry motor 15 stops and the carriage motor 42 is driven, a value corresponding to that drive amount (which corresponds to a subtraction value and hereinafter is also referred to as "Psub") is subtracted from the integrated value Psum. The process at this time of subtracting the value "Psub," which corresponds to the drive amount of the carriage motor 42, from the integrated value Psum is carried out by the controller 126. It should be noted that the carriage motor 42 corresponds to the "other motor" in the present embodiment.

===Process Overview (2)===

Figure 26:
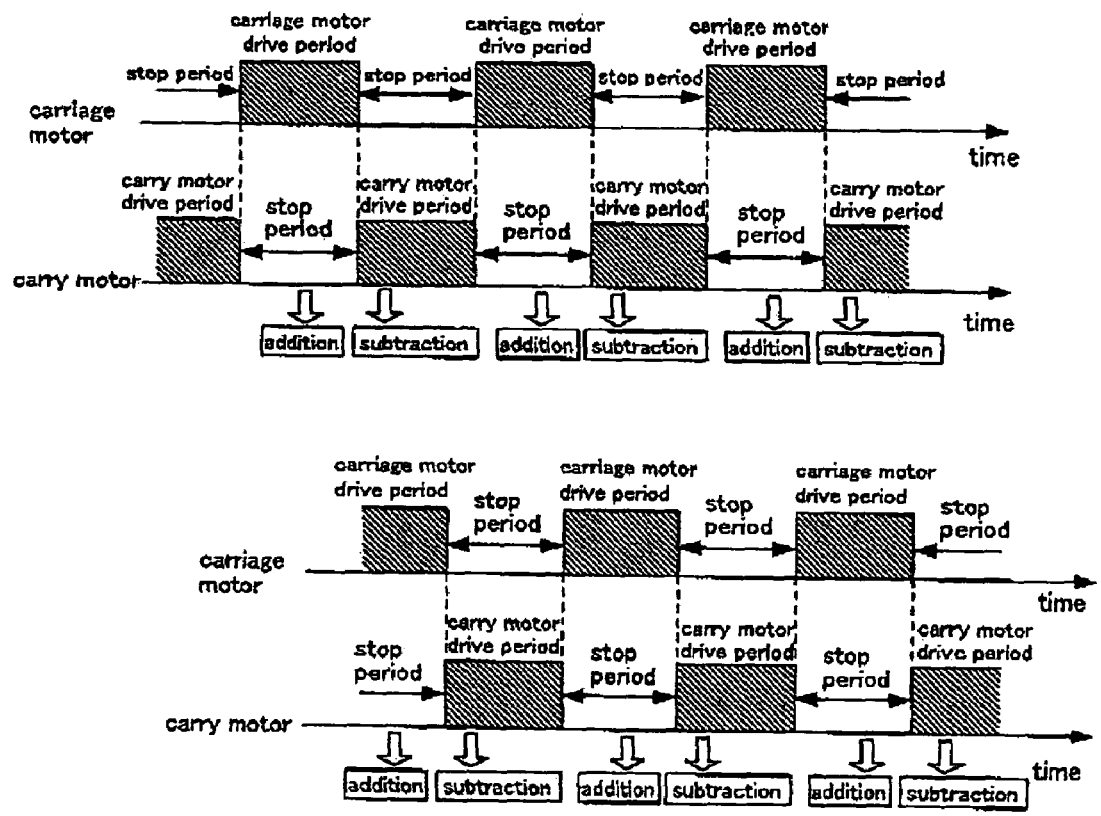
FIG. 26 is an explanatory diagram for describing an overview of another principle process of the present embodiment.

FIG. 26 is for illustrating an overview of this process. Before the carry motor 15 is driven, the controller 126 obtains information of the drive amount PFstep thereof and adds that drive amount PFstep to the integrated value Psum. Furthermore, when the carriage motor 42 is driven, the controller 126 obtains information relating to that drive amount. Then, here, after driving of the carry motor 15 is finished, the controller 126 subtracts a subtraction value Psub, which corresponds to the obtained drive amount of the carriage motor. 42, from the integrated value Psum. The controller 126 performs this subtraction process every time the carriage motor 42 is driven between the drive operations of the carry motor 15.

It should be noted that the timing by which the controller 126 obtains information relating to the drive amount of the carriage motor 42 may be prior to the carriage motor 42 starting driving according to that drive amount, and may be after driving of the carriage motor 42 has started.

<Subtraction Process of the Controller>

Figure 27:
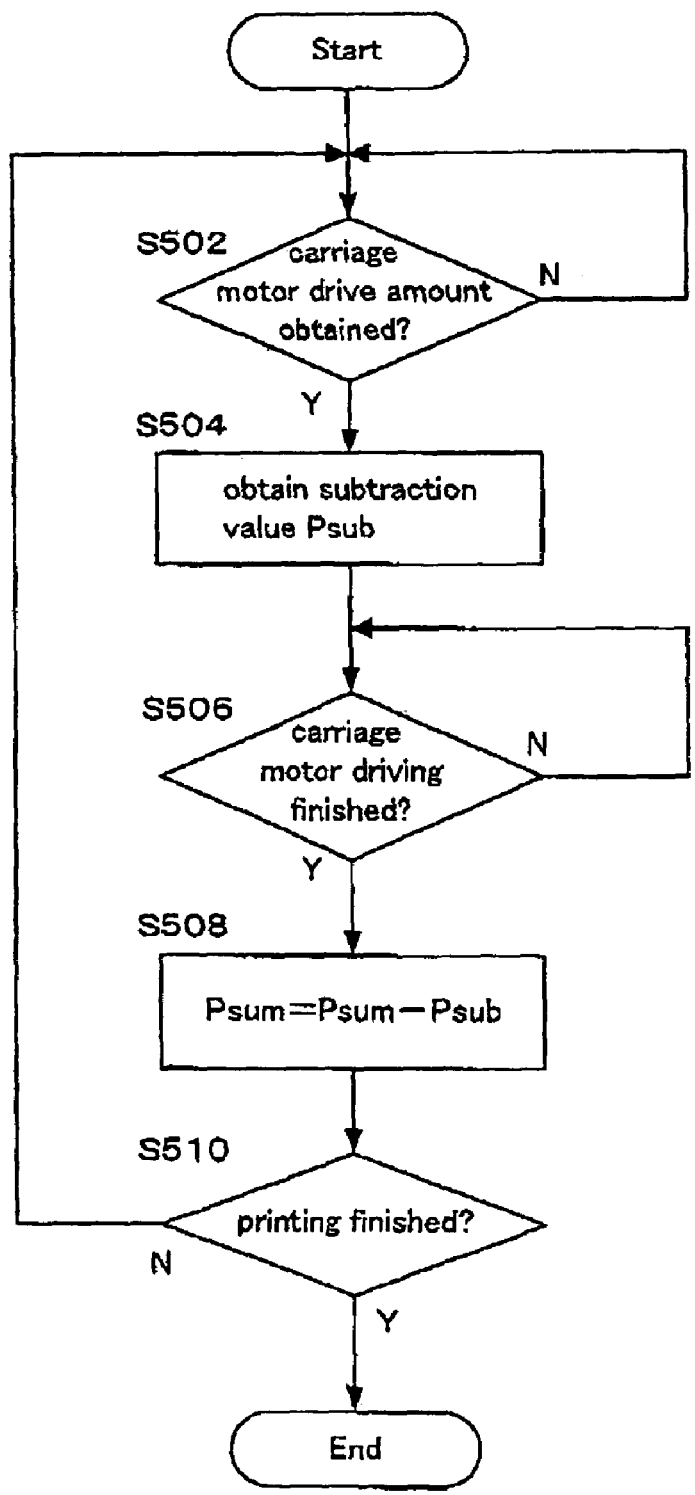
FIG. 27 is a flowchart illustrating an example of a processing procedure of a subtraction process.

FIG. 27 is a flowchart illustrating an example of a subtraction process that the controller 126 carries out at this time. Here, the controller 126 first checks whether or not information relating to the drive amount of the carriage motor 42 has been obtained (S502). Here, when information relating to the drive amount of the carriage motor 42 has not been obtained, the procedure returns to step S502 and a check is again performed as to whether or not information relating to the drive amount of the carriage motor 42 has been obtained. This check is carried out until the controller 126 obtains information relating to the drive amount of the carriage motor 42.

On the other hand, when information relating to the drive amount of the carriage motor 42 has been obtained, the controller 126 proceeds to step S504 and obtains a subtraction value Psub corresponding to the drive amount of the carriage motor 42 based on the obtained information relating to the drive amount of the carriage motor 42 (S504). Here, the subtraction value Psub may be determined from the drive amount of the carriage motor 42 through calculation by the controller 126 or the like, or it may be obtained from a table in which drive amounts of the carriage motor 42 and subtraction values Psub are correlated.

Next, the controller 126 proceeds to step S506 and checks whether or not driving of the carriage motor 42 has finished (S506). Here, when driving of the carriage motor 42 has not finished, the procedure returns to step S506 and a check is again performed as to whether or not driving of the carriage motor 42 has been finished. This check is carried out until driving of the carriage motor 42 is finished.

On the other hand, when driving of the carriage motor 42 has finished, the procedure next proceeds to step 5508 and a calculation process is carried out in which a subtraction value Psub corresponding to the obtained drive amount of the carriage motor 42 is subtracted from the integrated value Psum (S508). In this way, the integrated value Psum can be reduced according to the drive amount of the carriage motor 42. After the subtraction value Psub has been subtracted, the controller 126 proceeds to step S510 and investigates whether or not the printing process has finished. Here, when the printing process has not finished, the controller 126 returns again to step 5502 and a check is again performed as to whether or not information relating to the drive amount of the carriage motor 42 has been obtained (S502). On the other hand, if the printing process has finished, the controller 126 finishes the process of performing subtraction on the integrated value Psum.

<Example of Other Processes>

In the above-described embodiment, after driving of the carry motor 15 is finished, a subtraction value Psub corresponding to the drive amount of the carriage motor 42 is subtracted from the integrated value Psum. This is done in order not to subtract the subtraction value Psub from the integrated value Psum before the drive amount PFstep of the carry motor 15 is added to the integrated value Psum, so that heat restriction control can be implemented at a stage as soon as possible when the carry motor 15 is approaching an overheated state. However, there is no limitation to this. That is, the subtraction value Psub may be subtracted from the integrated value Psum before the drive amount PFstep of the carry motor 15 is added to the integrated value Psum or at a timing substantially the same as when the drive amount PFstep of the carry motor 15 is added to the integrated value Psum.

Figure 28:
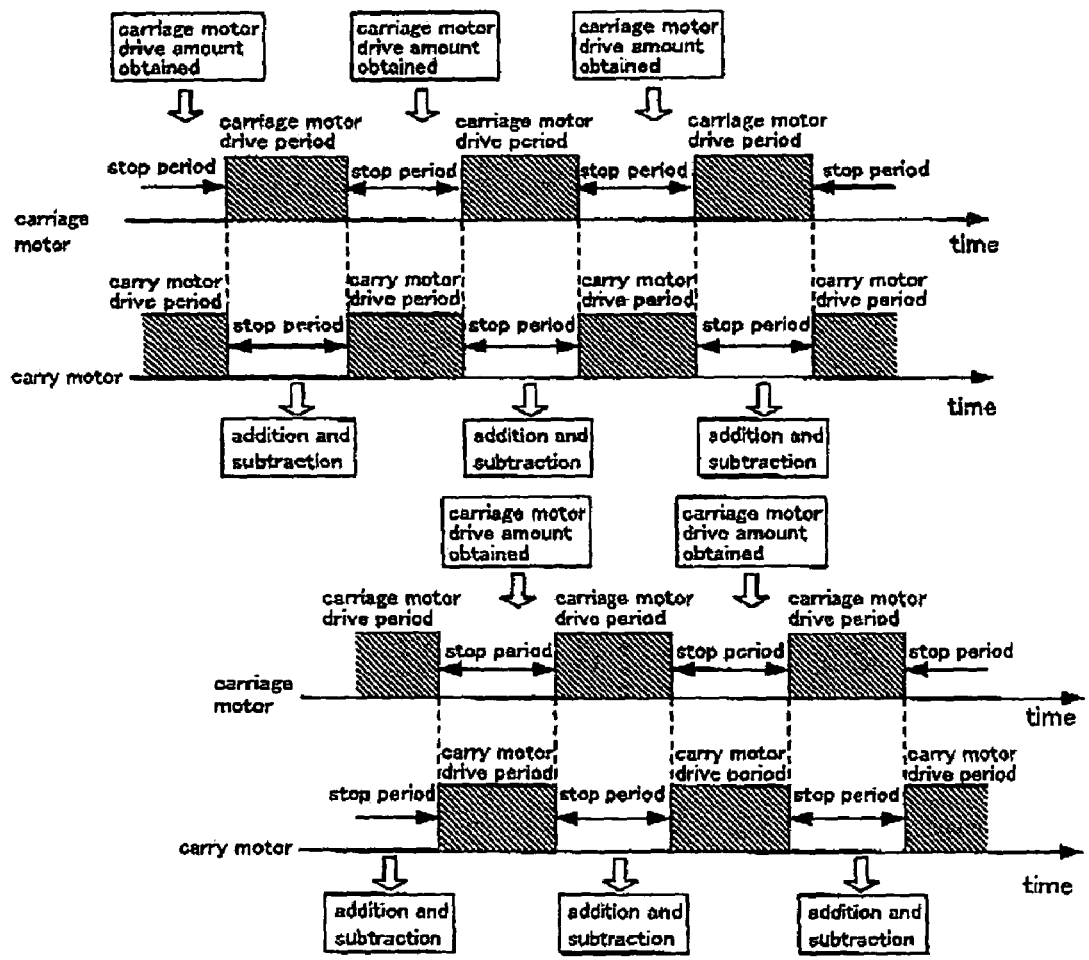
FIG. 28 is an explanatory diagram for describing an overview of a different processing example.

FIG. 28 is for illustrating an overview of processing when the process of adding the drive amount PFstep of the carry motor 15 to the integrated value Psum and the process of subtracting the subtraction value Psub from the integrated value Psum are performed substantially simultaneously. When the carriage motor 42 is driven, the controller 126 obtains information relating to that drive amount. Here, information relating to the drive amount of the carriage motor 42 can be obtained before the carriage motor 42 is driven. After this, based on the drive amount of the carriage motor 42 that has been obtained, the controller 126 obtains a subtraction value Psub that corresponds to that drive amount. Furthermore, before the carry motor 15 is driven, the controller 126 can obtain information of that drive amount PFstep.

Before driving of the carry motor 15 starts, the controller 126 adds the obtained drive amount PFstep of the carry motor 15 to the integrated value Psum and subtracts the obtained subtraction value Psub from the integrated value Psum. Here, the subtraction value Psub has already been obtained based on the drive amount of the carriage motor 42 obtained prior to driving the carriage motor 42.

The controller 126 performs the process of adding the drive amount PFstep of the carry motor 15 to the integrated value Psum and the process of subtracting the subtraction value Psub from the integrated value Psum at substantially the same timing. When the drive amount PFstep of the carry motor 15 is obtained, the controller 126 immediately performs the addition process and the subtraction process. The controller 126 performs the addition process and the subtraction process each time the carry motor 15 is driven.

Figure 29:
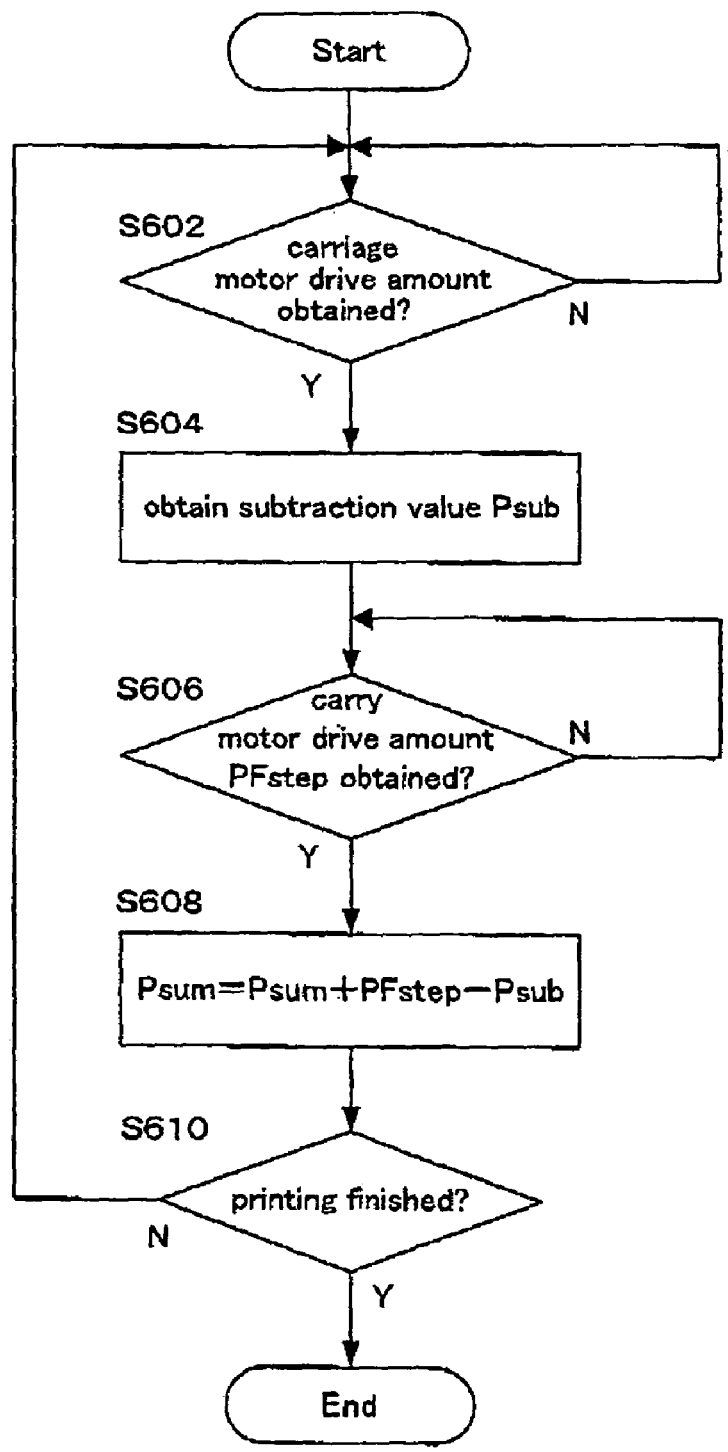
FIG. 29 is a flowchart illustrating an example of a processing procedure of a calculation process in a different processing example.

FIG. 29 is a flowchart illustrating an overview of processing performed by the controller 126 at this time. First, the controller 126 checks whether or not information relating to the drive amount of the carriage motor 42 has been obtained (S602). Here, when information relating to the drive amount of the carriage motor 42 has not been obtained, the procedure returns to step S602 and a check is again performed as to whether or not information relating to the drive amount of the carriage motor 42 has been obtained. This check is carried out until the controller 126 obtains information relating to the drive amount of the carriage motor 42.

On the other hand, when information relating to the drive amount of the carriage motor 42 has been obtained, the controller 126 proceeds to step S604 and obtains a subtraction value Psub corresponding to the drive amount of the carriage motor 42 based on the obtained information relating to the drive amount of the carriage motor 42 (S604).

Next, the controller 126 checks whether or not information relating to the drive amount of the carry motor 15 has been obtained (S606). Here, when information relating to the drive amount of the carry motor 15 has not been obtained, the procedure returns to step S606 and a check is again performed as to whether or not information relating to the drive amount of the carry motor 15 has been obtained. This check is carried out until the controller 126 obtains information relating to the drive amount of the carry motor 15.

When information relating to the drive amount of the carry motor 15 has been obtained, the controller 126 performs the process of adding the drive amount PFstep of the carry motor 15 to the integrated value Psum and the process of subtracting the subtraction value Psub from the integrated value Psum (S608). That is, the controller 126 updates the integrated value Psum using the arithmetic expression "Psum=Psum+PFstep−Psub."

After this arithmetic processing is finished, the controller 126 checks whether or not the printing process is finished (S610). Here, when the printing process has not finished, the controller 126 returns again to step S602 and a check is performed as to whether or not new information relating to the drive amount of the carriage motor 42 has been obtained (S602). On the other hand, if the printing process has finished, the controller 126 finishes the process of carrying out calculation on the integrated value Psum.

<Regarding the Drive Amount of the Carriage Motor>

In regard to cases in which the carriage motor 42 is driven between driving operations of the carry motor 15, in addition to the above-described printing operation, there are also cases when flushing is carried out involving the ejection of ink from the nozzles and cases when nozzle suction is carried out involving suctioning out of ink from the nozzles, in order to eliminate such problems as clogging of the nozzles of the head 21. When these operations are carried out, the carriage 41 must be moved to a predetermined position of a pump device 31 or the like, and therefore the carriage motor 42 is driven.

When carrying out these operations, the carriage motor 42 is driven two times or more while the carry motor 15 is in a drive stop period. That is, while the carry motor 15 is in a drive stop period, driving and stopping of the carriage motor 42 is repeated two times or more.

When driving and stopping of the carriage motor 42 is repeated two times or more in this manner, it is preferable that the drive amount of the carriage motor 42 that is referenced in order for the controller 126 to obtain the subtraction value Psub is the total drive amount of the carriage motor 42. However, to ensure that the carry motor 15 undergoes heat restriction control at an early stage, the controller 126 may obtain any one of the drive amounts as the drive amount of the carriage motor 42.

Figures 30, 31:
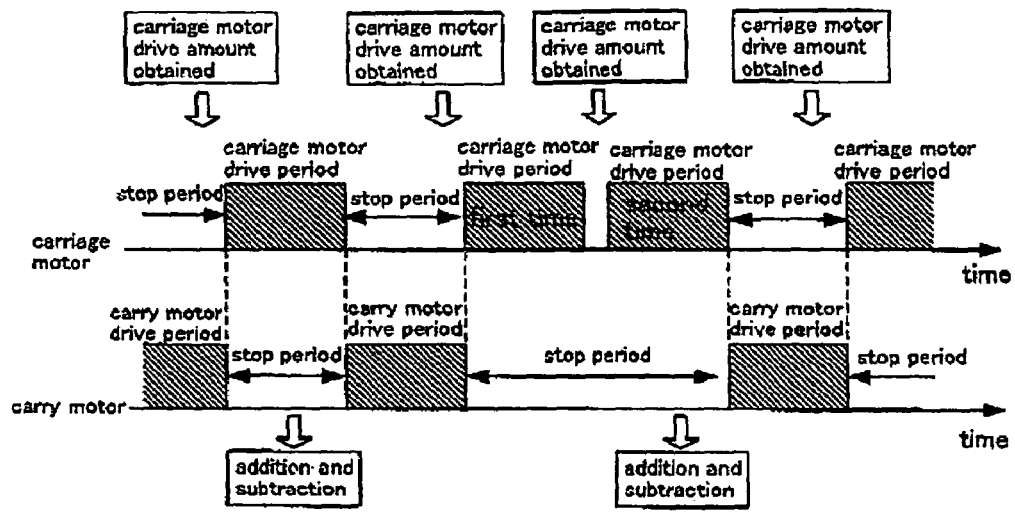
FIG. 30 is a diagram that illustrates an example of driving conditions when driving of an other motor is carried out a plurality of times during the drive stop period of the motor targeted for determination.
FIG. 31 is a diagram that shows an example of a table for obtaining the subtraction value Psub.

FIG. 30 illustrates an example of driving conditions when driving of the carriage motor 42 is carried out a plurality of times during the drive stop period of the carry motor 15 ere, the carriage motor 42 is driven two times while the carry motor 15 is in a drive stop period.

There are two timings during the drive stop period of the carry motor 15 at which the drive amount of the carriage motor 42 is obtained by the controller 126. Namely, these timings are immediately prior to each time the carriage motor 42 is driven. Here, the drive amount of the carriage motor 42 that is referenced in order for the controller 126 to obtain the subtraction value Psub may be the drive amount of either of these times. That is, this may be the drive amount of the first time of driving or may be the drive amount of the second time of driving.

===Subtraction Value Psub (2)===

With regard to the subtraction value Psub, which is subtracted from the integrated value Psum, it may be any value as long as it is a value corresponding to the drive amount of the carriage motor 42. However, in the present embodiment, in order to subtract the most appropriate subtraction value Psub from the integrated value Psum, consideration is also given to the drive mode of the carry motor 15 apart from the drive amount of the carriage motor 42, such that a subtraction value Psub corresponding to the drive mode is subtracted from the integrated value Psum.

FIG. 31 shows an example of a table that the controller 126 references to obtain the subtraction value Psub. This table indicates subtraction values Psub that have been set according to the drive amount of the carriage motor 42 and the drive mode of the carry motor 15.

The subtraction value Psub is partitioned into three portions corresponding to a drive amount CRm of the carriage motor 42. That is, the drive amount CRm of the carriage motor 42 is partitioned into three cases: when the drive amount CRm is "less than 1,114 steps," when it is "not less than 1,114 steps but less than 1,894 steps," and when it is "1,894 steps or more." It should be noted that in the present embodiment, the drive amount of the carriage motor 42 is controlled at 180 dpi, with 1/180 inch being a single step.

Here, a case of the drive amount CRm of the carriage motor 42 being "less than 1,114 steps" corresponds for example to when the stop time Tm of the carry motor 15 is less than 100 ms. Furthermore, a case of the drive amount CRm of the carriage motor 42 being "not less than 1,114 steps but less than 1,894 steps" corresponds for example to when the stop time Tm of the carry motor 15 is not less than 100 ms but less than 140 ms which applies to such cases as when printing is carried out on a sheet approximately of a "postcard" size. Furthermore, a case of the drive amount CRm of the carriage motor 42 being "1,894 steps or more" corresponds for example to when the stop time Tm of the carry motor 15 is 140 ms or more, which applies to such cases as when printing is carried out on a sheet approximately of an A4 size.

The subtraction value Psub is set to respectively different values for different drive amounts CRm of the carriage motor 42. Here, moreover, the subtraction values Psub are set to different values for each drive mode of the carry motor 15. There are seven types of drive mode, from "PS0" to "PS6." Each of the drive modes "PS0" to "PS6" is set according to the drive amount PFstep when the carry motor 15 is driven. It should be noted that the drive modes "PS0" to "PS6" are as illustrated in FIG. 21.

Here, when the drive amount PFstep of the carry motor 15 is from 1 to 25 steps, "PS6" is set as the drive mode of the carry motor 15. Furthermore, when the drive amount PFstep of the carry motor 15 is from 25 to 50 steps, "PS5" is set as the drive mode of the carry motor 15. When the drive amount PFstep of the carry motor 15 is from 50 to 100 steps, "PS4" is set as the drive mode of the carry motor 15. When the drive amount PFstep of the carry motor 15 is from 100 to 150 steps, "PS3" is set as the drive mode of the carry motor 15. When the drive amount PFstep of the carry motor 15 is from 150 to 200 steps, "PS2" is set as the drive mode of the carry motor 15. When the drive amount PFstep of the carry motor 15 is from 200 to 250 steps, "PS1" is set as the drive mode of the carry motor 15. And when the drive amount PFstep of the carry motor 15 is 250 steps or more, "PS0" is set as the drive mode of the carry motor 15.

It should be noted that a reason the subtraction value Psub is different for each of the drive modes "PS0" to "PS6" is as was described before in regard to FIGS. 22A and 22B.

<Method for Obtaining the Subtraction value Psub (2)>

Next, a method for obtaining the subtraction values Psub in this case is described in detail. FIG. 32 shows an example of when the number of sheets until the limit temperature is reached is set separately for drive amounts CRm of the carriage motor 42 in each of the drive modes PS0 to PS6. Here, in order to secure very high safety, the number of sheets until the limit temperature is reached is set on the safe side, that is, set lower than actual simulation results. It should be noted that here the previously described method is used in regard to the method for obtaining the number of sheets until the limit temperature is reached.

First, a reference drive condition is determined. Here, as shown in the table, the number of sheets until the limit temperature is reached for when the drive amount CRm of the carriage motor 42 is "CRm<1,114 steps" in the drive mode PS3 is lowest at 100 sheets; therefore, each subtraction value Psub is obtained using this drive condition as a reference.

Here, the subtraction value Psub is obtained for when the drive amount CRm of the carriage motor 42 is "CRm<1,114 steps" in the drive mode PS0. The number of sheets until the limit temperature is reached is 480 sheets. The drive amount PFstep of the carry motor 15 when printing a single A4 sheet is 580 mm, so that the following is true when converting the number of sheets until the limit temperature is reached into the aggregate number of drive steps of the carry motor 15.

$$480 \text{ (sheets)} \times 580 \text{ mm}/25.4 \text{ (inch conversion)} \times 720 \text{ dpi} = \quad (1)$$
$$7{,}891{,}653 \text{ steps}$$

It should be noted that here the conversion for the number of drive steps is carried out assuming printing at a resolution of 720 dpi.

On the other hand, when obtaining the aggregate number of drive steps of the carry motor 15 when the drive amount CRm of the carriage motor 42 is "CRm<1,114 steps" in the reference drive mode PS3, the following is true.

$$100 \text{ (sheets)} \times 580 \text{ mm}/25.4 \text{ (inch conversion)} \times 720 \text{ dpi} = \quad (2)$$
$$1{,}644{,}094 \text{ steps}$$

It should be noted that the value of (2) becomes the predetermined value Pduty.

Obtaining the difference between the value of (1) and the value of (2) gives 6,247,559 steps obtaining the rate of increase from this difference when the drive amount CRm of the carriage motor 42 is "CRm<1,114 steps" in the drive mode PS0 gives 6,247,559/7,891,653, which is a rate of increase of 0.79.

The rate of increase of 0.79 is multiplied by the smallest drive amount of 250 steps in the drive mode PS0. As a result, a value of 0.79×250=197 is obtained. As shown in the Psub table of FIG. 31, the thus-obtained value is set as the subtraction value Psub for when the drive amount CRm of the carriage motor 42 is "CRm<1,114 steps" in the drive mode PS0.

Furthermore, the case of when the drive amount CRm of the carriage motor 42 is "1,894 steps≦CRm" in the drive mode PS2 is examined. Since the number of sheets until the limit temperature is reached is 374 sheets, the aggregate number of drive steps of the carry motor 15 is as follows:

$$374 \text{ (sheets)} \times 580 \text{ mm}/25.4 \text{ (inch conversion)} \times 720 \text{ dpi} = \quad (3)$$
$$6{,}148{,}913 \text{ steps}$$

Obtaining the difference between the value of (3) and the reference value of (2) gives 4,504,819 steps. Determining the rate of increase from this difference gives 4,504,819/6,148,913, thus obtaining a rate of increase 0.73. The rate of increase of 0.73 is multiplied by the smallest drive amount of 150 steps in the drive mode PS2, giving 0.73×150=109, and as shown in the Psub table of FIG. 31, this value is set as the subtraction value Psub when the drive amount CRm of the carriage motor 42 is "1,894 steps≦CRm" in the drive mode PS2.

In this way, the subtraction values Psub for each drive amount of the carriage motor 42 in each of the drive modes is obtained from the number of sheets until the limit temperature is reached shown in FIG. 32, thus enabling completion of the Psub table as shown in FIG. 31.

<Procedure for Obtaining the Subtraction Value Psub (2)>
FIG. 33 is a flowchart illustrating an example of a procedure of the controller 126 for obtaining the subtraction value Psub. The controller 126 first obtains the drive amount CRm of the carriage motor 42 in order to obtain the subtraction value Psub (S702). Next, the controller 126 obtains information relating to the drive mode of the carry motor 15 (S704). Here, the information relating to the drive mode that the controller 126 obtains refers to information relating to the drive mode of the carry motor 15 used when driving of the carry motor 15 has started after the stop time of the carry motor 15 has finished. That is, for example, when the carry motor 15 is driven in the drive mode PS4 after the carriage motor 42 has been driven by a drive amount of 1,500 steps, the drive mode PS4 is obtained by the controller 126 corresponding to the drive amount of the carriage motor 42 of 1,500 steps.

After information relating to the drive mode of the carry motor 15 has been obtained in this manner, next, the controller 126 references (S706) the Psub table (see FIG. 31). Here, based on the obtained drive amount of the carriage motor 42 and the obtained drive mode of the carry motor 15, the controller 126 obtains from the Psub table a subtraction value Psub that is correlated with these (S708). After this, the controller 126 finishes the process of obtaining the subtraction value Psub.

After this process is finished, the controller 126 performs a calculation in which the subtraction value Psub, which has been obtained as described previously in FIGS. 26 and 28, is subtracted from the integrated value Psum. It should be noted that the controller 126 obtains the subtraction value Psub each time the drive amount of the carriage motor 42 and information relating to the drive mode of the carry motor 15 are obtained.

<Effect of Subtracting the Subtraction Value Psub (2)>
An effect of subtracting the subtraction value Psub is the same as was described previously in FIG. 25. Namely, in the case of a conventional technique, only the drive amounts PFstep of the carry motor 15 are successively added for the integrated value Psum, and therefore, as shown in FIG. 25, the integrated value Psum reaches the predetermined value Pduty, which is the reference for determining whether or not there is an overheated state, at a stage when the number of printed sheets is still small. Thus, the carry motor 15 is determined to be in an overheated state at a stage when the temperature of the carry motor 15 has not risen to such an extent, which has resulted in heat restriction control being started for the carry motor 15. In this way, sometimes problems occur in which additional standby time is created for the carry motor 15, and printing times are lengthened, thus slowing print processing.

In contrast to this, in the case of the present embodiment, the subtraction value Psub is successively subtracted from the integrated value Psum each time the carry motor 15 is driven. Thus, in the case of the present embodiment, the time taken until the integrated value Psum reaches the predetermined value Pduty is delayed compared to the conventional technique as shown in FIG. 25. That is, as long as the temperature of the carry motor 15 does not rise substantially, the integrated value Psum does not reach the predetermined value Pduty. Thus, with the present embodiment, an additional N number of sheets more than with the conventional technique can be printed before executing heat restriction control.

<Summary (2)>
In the inkjet printer 1 according to the present embodiment, in addition to a calculation in which the integrated value Psum is obtained by successively adding the drive amounts PFstep of the carry motor 15, a calculation is performed in which a subtraction value Psub corresponding to the drive amount of the carriage motor 42 is subtracted from the integrated value Psum. Therefore an integrated value Psum can be obtained that matches the temperature condition of the carry motor 15. In this way, it is possible to prevent early execution of heat restriction control on the carry motor 15 that occurs when the carry motor 15 is determined to be in an overheated state regardless of the carry motor 15 not being in an overheated state. Moreover, reduced costs can be achieved since it is possible to achieve the same number of sheets until the heating limit temperature is reached even with a small size motor.

Further still, in the present embodiment, since the subtraction value Psub that is a subtracted from the integrated value Psum is set giving consideration to the drive mode of the carry motor 15, a more appropriate subtraction value Psub can be subtracted from the integrated value Psum, which enables an integrated value Psum to be obtained that better matches the temperature condition of the carry motor 15.

Moreover, in the present embodiment, since the drive amount PFstep of the carry motor 15 is added to the integrated value Psum before the carry motor 15 is driven according to that drive amount PFstep, it is possible to forecast a temperature condition of the carry motor 15 in advance, thereby enabling heat restriction control to be implemented on the carry motor 15 at an early stage. This makes it possible to achieve very high safety.

Furthermore, since a Psub table in which the stop time and the drive mode of the carry motor 15 and the subtraction values Psub are correlated is provided in the present embodiment, the subtraction value Psub can be obtained simply.

It should be noted that the present embodiment was described using the carry motor 15 as an example of a motor for which an overheated state was to be determined, but in the case of the inkjet printer 1 of the present embodiment, the carriage motor 42 may also be a target for determining whether or not there is an overheated state. In this case, the controller 126 carries out the various calculations, obtaining of information, and the like. Moreover, in this case, a subtraction value corresponding to the drive amount of the carry motor 15 may be obtained using the carry motor 15 as the "other motor." Furthermore, it goes without saying that heat restriction control may be executed also on the carriage motor 42.

===Other Embodiments===

In the foregoing, an apparatus for determining motor overheating based on an embodiment of the present invention was described using an example of this device being fitted in a printing apparatus. However, the foregoing embodiment is for the purpose of elucidating the present invention and is not to be interpreted as limiting the present invention. The invention can of course be altered and improved without departing from the gist thereof and includes equivalents. In particular, the embodiments mentioned below are also included in the invention.

In this embodiment, some or all of the configurations achieved by hardware may be replaced by software, and conversely, some of the configurations that are achieved by software can be replaced by hardware.

Furthermore, part of the processes carried out on the printing apparatus side may be carried out on the computer 140 side, and it is also possible that a special-purpose processing device is interposed between the printing apparatus and the computer 140 such that some of the processes are carried out by the processing device.

<Regarding the Printing Apparatus>

In the foregoing embodiment, the above-described inkjet printer 1 was described as an example of a printing apparatus fitted with an apparatus for determining motor overheating, but a printing apparatus fitted with an apparatus for determining motor overheating is not limited to this printing apparatus. The printing apparatus of the present invention includes any apparatus as long as it is an apparatus provided with a printing function, including inkjet printers that eject ink using other techniques, as well as printer that do not eject ink, for example, dot impact printers, thermal transfer printers, and laser beam type printers for example.

<Regarding the Motor (Motor Targeted for Determination)>

In the foregoing embodiment, a motor (the carry motor 15) fitted in a printing apparatus was used as an example to describe a motor for which determination of overheating is carried out, but there is no limitation to this motor as the determination-target motor. That is, any motor fitted in an apparatus even other than a printing apparatus may be targeted for determination of overheating.

<Regarding Other Motors>

In the foregoing embodiment, a motor (the carriage motor 42) fitted in a printing apparatus was used as an example to describe the "other motor," but there is no limitation to a motor fitted in a printing apparatus. That is, the "other motor" may be any motor as long as it is a motor driven in alternation with a motor corresponding to a "determination-target motor" (the carry motor 15 in the foregoing embodiment).

<Regarding the Apparatus for Determining Overheating>

In the foregoing embodiment, an example of installation in an apparatus provided with a motor such as a printing apparatus was used to describe the apparatus for determining motor overheating, but the apparatus for determining motor overheating is not limited to this example. That is, the apparatus for determining motor overheating may exist as a standalone device independent from a device provided with a motor, and may also of course exist as a standalone device independent from a motor.

<Regarding Motor Drive Amounts>

In the foregoing embodiment, a number of steps was used as an example to express the drive amount of the motor, but there is no limitation to this, and other units may be used for expression, such as millimeters (mm), centimeters (cm), and micrometers (μm) for example.

<Regarding Stop Times Between Motor Drive Operations>

In the foregoing embodiment, the stop time between the drive operations of the motor was described using an example of a period in which an other motor (here, the carriage motor) was being driven, but there is no limitation to this. That is, as long as there is a period in which a motor is stopped between drive operations, the presence or absence of driving of another motor is of no concern.

<Regarding the Information Obtaining Section>

In the foregoing embodiment, the controller 126 was used as an example to illustrate the information obtaining section, but there is no limitation to this, and any information obtaining section may be used as long as it obtains information about the drive amount of a motor (a determination-target motor), information about stop times between motor drive operations, or information about the drive amount of another motor. For example, an information obtaining sec- <Regarding the Calculating Section>

In the foregoing embodiment, the controller 126 was used as an example to illustrate the calculating section, but there is no limitation to this, and a calculating section is inclusive of any device that can execute a calculation of calculating an integrated value of drive amounts of a motor (a determination-target motor), or a calculation of subtracting a subtraction value from the integrated value.

<Regarding Subtraction Values Corresponding to Stoppage Times>

In the foregoing embodiment, the "subtraction value corresponding to the stop time" (Psub) was set partitioned into the following three cases for the stop time of the motor (the carry motor 15): when stop time was "less than 100 ms," when it was "not less than 100 ms but less than 140 ms," and when it was "140 ms or more." However, there is not limitation to this partitioning, and this may be set to obtain a subtraction value that increases or decreases according to variation in the stop time of the motor, for example.

<Regarding Subtraction Values Corresponding to Drive Amounts of Other Motor>

In the foregoing embodiment, the "subtraction value corresponding to the drive amount of an other motor" (Psub) was described using an example in which the drive amount of the carriage motor 42 was partitioned into the following three portions: when the drive amount was "less than 1,114 steps," when it was "not less than 1,114 steps but less than 1,894 steps," and when it was "1,894 steps or more." However, there is not limitation to this partitioning, and this may be set to a subtraction value that increases or decreases as appropriate according to variation in the drive amount of the carriage motor 42, for example.

<Regarding the Predetermined Value>

In the foregoing embodiment, the predetermined value was set as the predetermined value Pduty of a drive amount of a motor when the motor (the carry motor 15) was driven under the severest conditions (worst conditions), but there is no limitation to this, and a value may be set that is smaller than the value when driving is performed under the severest conditions, for example.

Furthermore, it is not absolutely necessary to set the predetermined value as a fixed value as described in the foregoing embodiment. That is, in the case of the above-described printing apparatus for example, the predetermined value Pduty may vary in response to printing conditions and printing method or the like. Additionally, the predetermined value (Pduty) may vary as appropriate in response to various conditions.

<Regarding the Timer>

In the foregoing embodiment, an example was described of a structure in which the timer 144 was provided separately from the controller 126, but there is no limitation to this. That is, the timer may be provided inside the controller 126 for example. In this case, the motor stop times may be measured using the timer provided inside the controller 126.

<Regarding Drive Modes>

In the foregoing embodiment, the drive modes were described using drive modes in which at least one of the rate of acceleration when the motor is accelerating, the velocity at constant speed, and the rate of acceleration when decelerating varied according to the drive amount of the motor (the carry motor 15), but the drive modes are not limited to this. That is, the drive modes may vary due to various factors such as drive method and the like. Furthermore, the drive modes may vary according to print conditions or print circumstances or the like.

In particular, in cases where there is variation in the temperature at which the motor can be used safely or in the number of sheets that can be printed until the limit temperature is reached depending on the drive mode, then setting a subtraction value Psub for each drive mode allows extremely effective functioning.

<Regarding the Motor Control Device>

In the foregoing embodiment, the motor control apparatus was described using a controller provided in a printing apparatus and a carry controller as examples, but there is no limitation to these, and the device may be configured in other forms. Furthermore, the motor control method is not limited to the above-described control method.

<Regarding the Medium>

The medium S may be any of plain paper, matte paper, cut paper, glossy paper, roll paper, print paper, photo paper, and roll-type photo paper or the like. In addition to these, the medium S may be a film material such as OHP film and glossy film, a cloth material, or a metal plate material or the like. In other words, any medium may be used, as long as ink can be ejected onto it.

What is claimed is:

1. An apparatus for determining overheating of a motor, comprising:
    an information obtaining section that obtains information about a drive amount of a motor and information about a stop time between drive operations of said motor;
    a calculating section that executes a calculation of calculating an integrated value by successively adding up the drive amount of said motor based on said information about the drive amount obtained by said information obtaining section, and a calculation of subtracting, from said integrated value, a subtraction value corresponding to the stop time that is obtained based on said information about the stop time obtained by said information obtaining section; and
    a determining section that determines that said motor is in an overheated state when the subtracted integrated value obtained by said calculating section reaches a predetermined value.

2. An apparatus for determining overheating of a motor according to claim 1,
    further comprising a timer for measuring the stop time between the drive operations of said motor.

3. An apparatus for determining overheating of a motor according to claim 1,
    wherein said information about the drive amount of said motor is obtained by said information obtaining section every time said motor is driven.

4. An apparatus for determining overheating of a motor according to claim 1,
    wherein said information about the drive amount of said motor is obtained by said information obtaining section before said motor is driven based on that drive amount.

5. An apparatus for determining overheating of a motor according to claim 1,
    wherein said calculating section executes a calculation of subtracting a predetermined value from said integrated value every time a predetermined time passes from when driving of said motor is stopped.

6. An apparatus for determining overheating of a motor according to claim 1,
wherein, when it is determined by said determining section that said motor is in an overheated state, driving of said motor is restricted.

7. An apparatus for determining overheating of a motor according to claim 1,
further comprising a table in which the stop time between the drive operations of said motor and said subtraction value are correlated.

8. An apparatus for determining overheating of a motor according to claim 1,
wherein said information obtaining section obtains information about a drive mode of said motor; and
wherein said subtraction value is obtained based on said information about the drive mode and said information about the stop time which have been obtained by said information obtaining section.

9. An apparatus for determining overheating of a motor according to claim 8,
wherein, depending on said drive mode, at least either one of a rate of acceleration when said motor is accelerating, a velocity during constant-speed operation of said motor, and a rate of acceleration when said motor is decelerating, is different.

10. A method for determining overheating of a motor, comprising:
a step of obtaining information about a drive amount of a motor;
a step of obtaining information about a stop time between drive operations of said motor;
a step of calculating an integrated value by successively adding up the drive amount of said motor based on said information about the drive amount that has been obtained;
a step of subtracting, from said integrated value, a subtraction value corresponding to the stop time that is obtained based on said information about the stop time obtained by said information obtaining section; and
a step of determining that said motor is in an overheated state when the subtracted integrated value obtained by said calculating section reaches a predetermined value.

11. A program product comprising a program code stored on a computer-readable medium for causing an apparatus for determining overheating of a motor to operate, wherein said program code comprises:
a code for obtaining information about a drive amount of a motor;
a code for obtaining information about a stop time between drive operations of said motor;
a code for calculating an integrated value by successively adding up the drive amount of said motor based on said information about the drive amount that has been obtained;
a code for subtracting, from said integrated value, a subtraction value corresponding to the stop time that is obtained based on said information about the stop time obtained by said information obtaining section; and
a code for determining that said motor is in an overheated state when the subtracted integrated value obtained by said calculating section reaches a predetermined value.

12. A motor control apparatus comprising:
an information obtaining section that obtains information about a stop time between drive operations of a motor;
a calculating section that executes a calculation of calculating an integrated value by successively adding up a drive amount of said motor, and a calculation of subtracting, from said integrated value, a subtraction value corresponding to the stop time that is obtained based on said information about the stop time obtained by said information obtaining section;
a determining section that determines that said motor is in an overheated state when the subtracted integrated value obtained by said calculating section reaches a predetermined value; and
a controller that controls driving of said motor and that restricts the driving of said motor when it is determined by said determining section that said motor is in an overheated state.

13. A motor control method comprising:
a step of calculating an integrated value by successively adding up a drive amount of a motor;
a step of obtaining information about a stop time between drive operations of said motor;
a step of subtracting, from said integrated value, a subtraction value corresponding to the stop time that is obtained based on said information about the stop time that has been obtained;
a step of determining that said motor is in an overheated state when the integrated value after subtraction reaches a predetermined value; and
a step of restricting driving of said motor when it is determined that said motor is in an overheated state.

14. A printing apparatus comprising:
a printing section that prints on a medium;
a motor;
an information obtaining section that obtains information about a drive amount of said motor and information about a stop time between drive operations of said motor;
a calculating section that executes a calculation of calculating an integrated value by successively adding up the drive amount of said motor based on said information about the drive amount obtained by said information obtaining section, and a calculation of subtracting, from said integrated value, a subtraction value corresponding to the stop time that is obtained based on said information about the stop time obtained by said information obtaining section; and
a determining section that determines that said motor is in an overheated state when the subtracted integrated value obtained by said calculating section reaches a predetermined value.

15. A printing apparatus according to claim 14,
wherein said motor is a motor for carrying the medium to be printed by said printing section, or a motor for moving, relatively with respect to said medium, the printing section that prints on the medium.

16. An apparatus for determining overheating of a motor, comprising:
an information obtaining section that obtains information about a drive amount of a determination-target motor targeted for determination and information about a drive amount of an other motor that is driven in alternation with said determination-target motor;
a calculating section that executes a calculation of calculating an integrated value by successively adding up the drive amount of said determination-target motor based on said information about the drive amount of said determination-target motor obtained by said information obtaining section, and a calculation of subtracting, from said integrated value, a subtraction value corresponding to the drive amount of said other motor that is obtained based on said information about the drive amount of said other motor obtained by said information obtaining section; and a determining section that determines that said determination-target motor is in an overheated state when the subtracted integrated value obtained by said calculating section reaches a predetermined value.

17. An apparatus for determining overheating of a motor according to claim 16,
wherein said information about the drive amount of said determination-target motor is obtained by said information obtaining section every time said determination-target motor is driven.

18. An apparatus for determining overheating of a motor according to claim 16,
wherein said information about the drive amount of said determination-target motor is obtained by said information obtaining section before said determination-target motor is driven based on that drive amount.

19. An apparatus for determining overheating of a motor according to claim 16,
wherein said calculating section executes a calculation of subtracting a predetermined value from said integrated value every time a predetermined time passes from when driving of said determination-target motor is stopped.

20. An apparatus for determining overheating of a motor according to claim 16,
wherein, when it is determined by said determining section that said determination-target motor is in an overheated state, driving of said determination-target motor is restricted.

21. An apparatus for determining overheating of a motor according to claim 16,
further comprising a table in which the drive amount of said other motor and said subtraction value are correlated.

22. An apparatus for determining overheating of a motor according to claim 16,
wherein said information obtaining section obtains information about a drive mode of said determination-target motor; and
wherein said subtraction value is obtained based on said information about the drive mode and said information about the drive amount of said other motor which have been obtained by said information obtaining section.

23. An apparatus for determining overheating of a motor according to claim 22,
wherein, depending on said drive mode, at least either one of a rate of acceleration when said determination-target motor is accelerating, a velocity during constant-speed operation of said determination-target motor, and a rate of acceleration when said determination-target motor is decelerating, is different.

24. A method for determining overheating of a motor, comprising:
a step of obtaining information about a drive amount of a determination-target motor targeted for determination;
a step of obtaining information about a drive amount of an other motor that is driven in alternation with said determination-target motor;
a step of calculating an integrated value by successively adding up the drive amount of said determination-target motor based on said information about the drive amount of said determination-target motor that has been obtained;

a step of subtracting, from said integrated value, a subtraction value corresponding to the drive amount of said other motor that is obtained based on said information about the drive amount of said other motor that has been obtained; and
a step of determining that said determination-target motor is in an overheated state when the integrated value after subtraction reaches a predetermined value.

25. A program product comprising a program code stored on a computer-readable medium for causing an apparatus for determining overheating of a motor to operate, wherein said program code comprises:
a code for obtaining information about a drive amount of a determination-target motor targeted for determination;
a code for obtaining information about a drive amount of an other motor that is driven in alternation with said determination-target motor;
a code for calculating an integrated value by successively adding up the drive amount of said determination-target motor based on said information about the drive amount of said determination-target motor that has been obtained;
a code for subtracting, from said integrated value, a subtraction value corresponding to the drive amount of said other motor that is obtained based on said information about the drive amount of said other motor that has been obtained; and
a code for determining that said determination-target motor is in an overheated state when the integrated value after subtraction reaches a predetermined value.

26. A motor control apparatus comprising:
an information obtaining section that obtains information about a drive amount of a control-target motor targeted for control and information about a drive amount of an other motor that is driven in alternation with said control-target motor;
a calculating section that executes a calculation of calculating an integrated value by successively adding up the drive amount of said control-target motor based on said information about the drive amount of said control-target motor obtained by said information obtaining section, and a calculation of subtracting, from said integrated value, a subtraction value corresponding to the drive amount of said other motor that is obtained based on said information about the drive amount of said other motor obtained by said information obtaining section;
a determining section that determines that said control-target motor is in an overheated state when the subtracted integrated value obtained by said calculating section reaches a predetermined value; and
a controller that controls driving of said control-target motor and that restricts the driving of said control-target motor when it is determined by said determining section that said control-target motor is in an overheated state.

27. A motor control method comprising:
a step of obtaining information about a drive amount of a control-target motor targeted for control;
a step of obtaining information about a drive amount of an other motor that is driven in alternation with said control-target motor;
a step of calculating an integrated value by successively adding up the drive amount of said control-target motor based on said information about the drive amount of said control-target motor that has been obtained;

a step of subtracting, from said integrated value, a subtraction value corresponding to the drive amount of said other motor that is obtained based on said information about the drive amount of said other motor that has been obtained;

a step of determining that said control-target motor is in an overheated state when the integrated value after subtraction reaches a predetermined value; and a step of restricting driving of said control-target motor when it is determined that said control-target motor is in an overheated state.

28. A printing apparatus comprising:

a printing section that prints on a medium;

two motors that are driven in alternation;

an information obtaining section that respectively obtains information about a drive amount of each of said motors;

a calculating section that executes a calculation of calculating an integrated value by successively adding up the drive amount of one of said motors based on said information about the drive amount of said one motor obtained by said information obtaining section, and a calculation of subtracting, from said integrated value, a subtraction value corresponding to the drive amount of the other of said motors that is obtained based on said information about the drive amount of said other motor obtained by said information obtaining section; and a determining section that determines that said one motor is in an overheated state when the subtracted integrated value obtained by said calculating section reaches a predetermined value.

29. A printing apparatus according to claim 28, wherein said motors are a motor for carrying the medium to be printed by said printing section, and a motor for moving, relatively with respect to said medium, the printing section that prints on the medium.

* * * * *

UNITED STATES PATENT AND TRADEMARK OFFICE
CERTIFICATE OF CORRECTION

PATENT NO. : 7,222,050 B2 Page 1 of 1
APPLICATION NO. : 11/181195
DATED : May 22, 2007
INVENTOR(S) : Tomoyoshi Kakegawa et al.

It is certified that error appears in the above-identified patent and that said Letters Patent is hereby corrected as shown below:

In Claim 10, Col. 47, line 39, please change "section" to --step--;

line 42, please change "section" to --step--.

In Claim 11, Col. 47, line 58, please change "section" to --code--;

line 61, please change "section" to --code--.

Signed and Sealed this

Fourteenth Day of August, 2007

JON W. DUDAS
*Director of the United States Patent and Trademark Office*